US012750242B2

(12) United States Patent
Pfaff et al.

(10) Patent No.: US 12,750,242 B2
(45) **Date of Patent: *Sep. 29, 2026**

(54) TRUSTWORTHINESS OF VIDEO DATA STREAMS

(71) Applicant: Fraunhofer-Gesellschaft zur Foerderung der angewandten Forschung e.V., Munich (DE)

(72) Inventors: Jonathan Pfaff, Berlin (DE); Tobias Hinz, Berlin (DE); Karsten Sühring, Berlin (DE); Heiko Schwarz, Berlin (DE); Detlev Marpe, Berlin (DE); Thomas Wiegand, Berlin (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 19/343,314

(22) Filed: Sep. 29, 2025

(65) Prior Publication Data

US 2026/0032001 A1 Jan. 29, 2026

Related U.S. Application Data

(63) Continuation of application No. 19/097,774, filed on Apr. 1, 2025.

(30) Foreign Application Priority Data

Apr. 2, 2024 (EP) .................................... 24168161

(51) Int. Cl.
*H04L 9/40* (2022.01)
*H04L 9/32* (2006.01)

(52) U.S. Cl.
CPC .......... *H04L 9/3247* (2013.01); *H04L 9/3236* (2013.01)

(58) Field of Classification Search
CPC ............................ H04L 9/3247; H04L 9/3236
See application file for complete search history.

(56) References Cited

U.S. PATENT DOCUMENTS 5,646,997 A 7/1997 Barton
5,680,461 A 10/1997 Mcmanis
(Continued)

FOREIGN PATENT DOCUMENTS

CN 107871063 A 4/2018
EA 009450 B1 12/2007
(Continued)

OTHER PUBLICATIONS

"Advanced video coding for generic audiovisual services", Recommendation ITU-T H.264 (V15) (Aug. 2024), Series H: Audiovisual and multimedia systems, Infrastructure of audiovisual services, Coding of moving video (854 pages).
(Continued)

*Primary Examiner* — Ghodrat Jamshidi
(74) *Attorney, Agent, or Firm* — ASHURST PERKINS COIE US LLP; Michael A. Glenn

(57) ABSTRACT

A method for checking a video data stream having a video encoded thereinto on trustworthiness comprises: subjecting a predetermined portion of the video data stream, or data derived therefrom, to a hash function to obtain a hash value; deriving a digital signature from the video data stream; and checking whether the hash value fits to the digital signature to determine whether the video data stream is trustworthy.

18 Claims, 21 Drawing Sheets

(56) References Cited

U.S. PATENT DOCUMENTS

| | | | |
|---|---|---|---|
| 6,674,770 B1 | 1/2004 | Jarfjord | |
| 6,959,384 B1 | 10/2005 | Serret-Avila et al. | |
| 7,917,763 B2 | 3/2011 | Kulessa et al. | |
| 8,214,632 B2 | 7/2012 | Choi et al. | |
| 8,256,015 B2 | 8/2012 | Gentry et al. | |
| 8,645,145 B2 | 2/2014 | Subbaraman et al. | |
| 9,154,785 B2 | 10/2015 | Wang | |
| 9,699,467 B2 * | 7/2017 | Kirchhoffer | H04N 19/18 |
| 9,832,022 B1 | 11/2017 | Pedersen | |
| 10,263,783 B2 | 4/2019 | Jens-Matthias et al. | |
| 11,057,215 B1 | 7/2021 | Miller | |
| 11,321,878 B2 | 5/2022 | Graziosi et al. | |
| 11,449,584 B1 | 9/2022 | Pamucci | |
| 11,770,260 B1 | 9/2023 | Pamucci | |
| 11,871,057 B2 | 1/2024 | Jeremy et al. | |
| 11,902,559 B2 | 2/2024 | Levy et al. | |
| 12,445,307 B1 | 10/2025 | Suter et al. | |
| 12,489,925 B2 | 12/2025 | Pfaff et al. | |
| 2004/0054912 A1 | 3/2004 | Adent et al. | |
| 2006/0047967 A1 | 3/2006 | Akhan et al. | |
| 2009/0136145 A1 | 5/2009 | Morimoto et al. | |
| 2010/0177891 A1 | 7/2010 | Keidar et al. | |
| 2011/0043387 A1 * | 2/2011 | Abali | H03M 7/3088 341/51 |
| 2011/0179279 A1 | 7/2011 | Greevenbosch et al. | |
| 2011/0276804 A1 * | 11/2011 | Anzai | H04L 63/1441 713/168 |
| 2012/0183052 A1 | 7/2012 | Lou et al. | |
| 2012/0287989 A1 | 11/2012 | Budagavi et al. | |
| 2013/0111212 A1 | 5/2013 | Baltes et al. | |
| 2013/0128958 A1 | 5/2013 | Gamei et al. | |
| 2013/0259228 A1 | 10/2013 | Ren et al. | |
| 2014/0016708 A1 | 1/2014 | Wang | |
| 2014/0092993 A1 | 4/2014 | Wang | |
| 2014/0156997 A1 | 6/2014 | Gopalakrishna Rao et al. | |
| 2014/0282696 A1 | 9/2014 | Mao et al. | |
| 2016/0080742 A1 | 3/2016 | Kirchhoffer et al. | |
| 2017/0141925 A1 | 5/2017 | Camenisch et al. | |
| 2017/0230339 A1 | 8/2017 | Xie et al. | |
| 2017/0278212 A1 | 9/2017 | Fry | |
| 2018/0089029 A1 * | 3/2018 | Resch | H04L 9/3247 |
| 2018/0218753 A1 | 8/2018 | Hodge et al. | |
| 2018/0262763 A1 | 9/2018 | Seregin et al. | |
| 2019/0028441 A1 | 1/2019 | Thakkar et al. | |
| 2020/0077117 A1 | 3/2020 | Karczewicz et al. | |
| 2020/0267404 A1 | 8/2020 | Levy et al. | |
| 2020/0296423 A1 | 9/2020 | Chao et al. | |
| 2020/0372184 A1 | 11/2020 | Meirosu | |
| 2020/0409571 A1 | 12/2020 | Saad et al. | |
| 2021/0211685 A1 | 7/2021 | Egilmez et al. | |
| 2021/0337235 A1 | 10/2021 | Choi et al. | |
| 2022/0038719 A1 | 2/2022 | Leleannec et al. | |
| 2022/0045863 A1 * | 2/2022 | Bai | H04L 9/3239 |
| 2022/0217411 A1 | 7/2022 | Wang | |
| 2022/0368534 A1 | 11/2022 | Lundberg et al. | |
| 2022/0400300 A1 | 12/2022 | Blythe et al. | |
| 2023/0020655 A1 | 1/2023 | Xu et al. | |
| 2023/0079866 A1 | 3/2023 | Choi et al. | |
| 2023/0208614 A1 | 6/2023 | Völcker et al. | |
| 2023/0246834 A1 | 8/2023 | Xu et al. | |
| 2023/0325473 A1 | 10/2023 | Buffard et al. | |
| 2023/0345013 A1 | 10/2023 | Li et al. | |
| 2023/0388504 A1 | 11/2023 | Reddy et al. | |
| 2024/0048394 A1 | 2/2024 | Bjorn et al. | |
| 2024/0119132 A1 * | 4/2024 | Wieker | G06V 40/1365 |
| 2024/0235847 A1 * | 7/2024 | Jacobson | H04L 9/3247 |
| 2024/0305822 A1 * | 9/2024 | Nguyen | H04N 19/91 |
| 2024/0422141 A1 | 12/2024 | Shade et al. | |

FOREIGN PATENT DOCUMENTS

| | | | |
|---|---|---|---|
| EP | 3737109 A1 | 11/2020 | |
| EP | 4239520 A1 | 9/2023 | |
| JP | H09270788 A | 10/1997 | |
| JP | 2008047983 A | 2/2008 | |
| JP | 2018201202 A * | 12/2018 | H04N 19/50 |
| JP | 2022174726 A | 11/2022 | |
| JP | 2024020162 A | 2/2024 | |
| KR | 20240017745 A | 2/2024 | |
| RU | 2452007 C2 | 5/2012 | |
| RU | 2015117520 A | 11/2016 | |
| RU | 2618942 C2 | 5/2017 | |
| RU | 2619194 C2 | 5/2017 | |
| RU | 2820747 C1 | 7/2024 | |
| WO | 2014058600 A1 | 4/2014 | |
| WO | 2015028098 A1 | 3/2015 | |
| WO | 2021061393 A1 | 4/2021 | |
| WO | 2021183645 A1 | 9/2021 | |
| WO | 2023004159 A1 | 1/2023 | |

OTHER PUBLICATIONS

"Anonymous_Context-adaptive variable-length coding", Wikipedia, Jan. 23, 2024 (Jan. 23, 2024) (3 pages)., XP093280326; retrieved from the Internet: URL:https://en.wikipedia.org/w/index.php?title=Context-adaptive_variable-length_coding&oldid=1198184200.

"Digital Signature Standard", (DSS) FIPS 186-5, Feb. 3, 2023, Information Technology Laboratory, National Institute of Standards and Technology (86 pages).

"High efficiency video coding", Recommendation ITU-T H.265 (V10) (Jul. 2024) Series H: Audiovisual and multimedia systems Infrastructure of audiovisual services, Coding of moving video (728 pages).

"Open System Communications and Security", ITU-T X.509, Series X: , Directory, "Information technology_Open Systems Interconnection—The Directory: Public-key and attribute certificate frameworks", (Oct. 2019) (236 pages).

"Secure Hash Standard", FIPS PUB 180-4, Aug. 2015, Federal Information Processing Standards Publication, Information Technology Laboratory, National Institute of Standards and Technology (36 pages).

"Versatile video coding", Recommendation ITU-T H.266 (V3) (Sep. 2023) Series H: Audiovisual and multimedia systems—Infrastructure of audiovisual services, Coding of moving video (538 pages).

Berners-Lee, et al., "Uniform Resource Identifier (URI): Generic Syntax", Network Working Group, Jan. 2005 (61 pages).

Karwowski, Damian, "Advanced Adaptation Algorithms of Arithmetic Coding in Hybrid Video Compression", PhD diss., Doctoral Dissertation, Poznań University of Technology 2008. <URL: https://www.multimedia.edu.pl/publications/Advanced-Adaptation-Algorithms-of-Arithmetic-Coding-in-Hybrid-Video-Compression-Full-text-eng.pdf>.

Mokhtarian, et al., "End-To-End Secure Delivery of Sclable Video Streams", Proceedings of the 18th International Workshop on Network and Operating Systems Support for Digital Audio and Video, NOSSDAV '09, ACM Press, New York, New York, USA, Jun. 3, 2009 (Jun. 3, 2009), pp. 79-84, XP058175356.

Sze, et al., "Entropy Coding in HEVC", Springer-Verlag: MIT Libraries, Marpe et al; (Year: 2014).

Xu, et al., "AHG9: Digital signature SEI message", 20. Jvet Meeting; Oct. 7, 2020-Oct. 16, 2020; Teleconference; (The Joint Video Exploration Team of ISO/IEC JTC1/SC29/WG11 and ITU-T SG.16), No. JVET-T0090, Oct. 1, 2020, XP030289905; retrieved from the Internet: URL:http://phenix.int-evry.fr/jvet/doc_end_user/documents/20_Teleconference/wg11/JVET-T0090-v1.zip JVET-T0090.docx, [retrieved on Oct. 1, 2020] (5 pages).

ITU-T, Advanced video coding for generic audiovisual services, H.264, Aug. 2021—844 pages.

Jizheng Xu et al., AHG9: Digital signature SEI message, JVET-T0090, Oct. 7, 2020—5 pages.

Arai, Kenjiro, "Countermeasures against Caller ID Spoofing in IMS Networks", IEICE Technical Report, vol. 116, No. 484, Feb. 23, 2017, The Institute of Electronics, Information and Communication Engineers (IEICE), pp. 547-550, ISSN: 0913-5685. (Reference indicating well-known art).

(56) References Cited

OTHER PUBLICATIONS

Internet Security Systems, Inc., (., "Microsoft Windows 2000 Technical Reference: Security Guide", Top Studio Co., Ltd. (Translator), First Editon, Apr. 2, 2001, Nikkei BP Soft Press, pp. 181-191, ISBN: 4-89100-167-4. (Reference indicating common technical knowledge).

Okubo, Sakae(. , "Impress Standard Textbook Series: Revised 3rd Edition H.264/AVC Textbook", 1st Edition, Jan. 1, 2009, Impress R&D, pp. 86-88, 150-153, 337-342, ISBN: 978-4-8443-2664-9. (Reference indicating well-known art).

Ono, et al., "Ubiquitous Technology: High Efficiency Video Coding—MPEG-4 and H.264", 1st Edition, Apr. 20, 2005, Ohmsha, Ltd., pp. 40, 41, 50-55, 129-136, ISBN: 4-274-20060-4. (Reference indicating well-known art).

Une, et al., "Recent Theoretical Research Trends in Digital Signatures", Imes Discussion Paper Series (Institute for Monetary and Economic Studies Discussion Paper Series (1999)), [online], Institute for Monetary and Economic Studies, Bank of Japan, Discussion Paper No. 99-J-42, Dec. 17, 1999, [retrieved on Jul. 14, 2010], Retrieved from htp://www.imes.boj.or.jp/jdps99/99-J-42.pdf, pp. 1-5, 12-15 (Reference indicating well-known art).

Tetsuto Yoshikawa, "Chapter 4 Core Technologies for Intranets: Trends in Security", Oct. 1, 1996, Open Design, No. 16, pp. 52-69, CQ Publishing, ISBN:4-7898-1808- X (right column, p. 69, lines 6 and 15)—partial English translation attached—24 pp.

Walter J. Glenn et al., "Microsoft Exchange 2000 Server Official Manual, vol. 2", Translated by Cosmo Planet, Inc., Apr. 2, 2001, Nikkei BP Press, p. 204, ISBN:4-89100- 211-5, lines 9-12 in Section 21.4.3—partial English translation attached—11 pp.

Warwick Ford et al., "Secure Electronic Commerce: Building the Infrastructure for Digital Signature and Encryption", Translated by Shinichiro Yamada, Dec 24, 1997, Prentice Hall Japan, pp. 272-277, ISBN:4-89471-027-7 (p. 274, lines 13-17, 23-28)—partial English translation attached—23 pp.

* cited by examiner

Fig. 13
twci_hash_method_type
CurrDigest
RefDigest

TRUSTWORTHINESS OF VIDEO DATA STREAMS

CROSS-REFERENCE TO RELATED APPLICATIONS

This application is a continuation of U.S. patent application Ser. No. 19/097,774, filed Apr. 1, 2025, which claims priority from European Patent Application No. 24168161.8, which was filed on Apr. 2, 2024, and is incorporated herein in its entirety by reference.

Embodiments of the invention relate to an apparatus, e.g., a video decoder, for checking a video data stream on trustworthiness, an apparatus, e.g., a video encoder, for rendering a video data stream having a video encoded thereinto checkable on trustworthiness, a method for checking a video data stream on trustworthiness, a method for rendering a video data stream having a video encoded thereinto checkable on trustworthiness, a video, and/or a video data stream.

Today, the generation, distribution and consumption of video content plays an important role in people's life. International standards such as the ITU-T recommendations H.264, H.265 and H.266 enable a worldwide reliable and interoperable exchange of such content. Thus, they form a key technology for modern interconnected societies.

The recent rapid developments in artificial intelligence (AI) allow new methods of artificial video content generation. In this way, new data formats and innovative ways of user experiences can be achieved. However, at the same time, AI-based methods also bear the risk of being used in a deceiving and potentially harmful way. Examples of such a misuse are deep fakes which generate a false perception about the provenance or the authorship of a multimedia content. This may lead to fatal consequences such as infringements of copyrights or personal rights, fraud by tampered evidence or an undermining of people's trust in the integrity of public institutions.

Thus, there is a need for a concept for checking a video data stream on trustworthiness, providing a good tradeoff between security level, implementation effort, and signaling overhead.

SUMMARY

An embodiment may have an apparatus for checking a video data stream having a video encoded thereinto on trustworthiness, wherein the apparatus is configured for subjecting a predetermined portion of the video data stream, or data derived therefrom, to a hash function to obtain a hash value; deriving a digital signature from the video data stream; and checking whether the hash value fits to the digital signature to determine whether the video data stream is trustworthy, wherein the video data stream has the video encoded thereinto by encoding the video into the video data stream by block based predictive coding and transform based residual coding by encoding the prediction residual data of the residual block into the video data stream by use of context-adaptive binary arithmetic coding by encoding a significance map which indicates positions of non-zero transform coefficients in a transform block representing the residual block by, in a forward scan traversing transform coefficients of the transform block, encoding a significance flag which indicates whether a non-zero transform coefficient is positioned at a current position, and, if so, and if the current position is not the last in the forward scan, encoding a last-significance flag which indicates whether the non-zero transform coefficient positioned at the current position is the last non-zero transform coefficient in the forward scan order, and encoding the non-zero transform coefficients' values sequentially in a reverse scan order, reversing the forward scan order.

Another embodiment may have an apparatus for rendering a video data stream having a video encoded thereinto checkable on trustworthiness, wherein the apparatus is configured for subjecting a predetermined portion of the video data stream, or data derived therefrom, to a hash function to obtain a hash value; computing a digital signature based on the hash value so as to digitally sign the hash value, and inserting the digital signature into the video data stream, thereby allowing determining whether the video data stream is trustworthy by checking whether the hash value fits to the digital signature, wherein the video data stream has the video encoded thereinto by encoding the video into the video data stream by block based predictive coding and transform based residual coding by encoding the prediction residual data of the residual block into the video data stream by use of context-adaptive binary arithmetic coding by encoding a significance map which indicates positions of non-zero transform coefficients in a transform block representing the residual block by, in a forward scan traversing transform coefficients of the transform block, encoding a significance flag which indicates whether a non-zero transform coefficient is positioned at a current position, and, if so, and if the current position is not the last in the forward scan, encoding a last-significance flag which indicates whether the non-zero transform coefficient positioned at the current position is the last non-zero transform coefficient in the forward scan order, and encoding the non-zero transform coefficients' values sequentially in a reverse scan order, reversing the forward scan order.

According to another embodiment, a method for checking a video data stream having a video encoded thereinto on trustworthiness may have the steps of: subjecting a predetermined portion of the video data stream, or data derived therefrom, to a hash function to obtain a hash value; deriving a digital signature from the video data stream; and checking whether the hash value fits to the digital signature to determine whether the video data stream is trustworthy, wherein the video data stream has the video encoded thereinto by encoding the video into the video data stream by block based predictive coding and transform based residual coding by encoding the prediction residual data of the residual block into the video data stream by use of context-adaptive binary arithmetic coding by encoding a significance map which indicates positions of non-zero transform coefficients in a transform block representing the residual block by, in a forward scan traversing transform coefficients of the transform block, encoding a significance flag which indicates whether a non-zero transform coefficient is positioned at a current position, and, if so, and if the current position is not the last in the forward scan, encoding a last-significance flag which indicates whether the non-zero transform coefficient positioned at the current position is the last non-zero transform coefficient in the forward scan order, and encoding the non-zero transform coefficients' values sequentially in a reverse scan order, reversing the forward scan order.

Another embodiment may have a non-transitory digital storage medium having stored thereon a video data stream, wherein the video data stream has a video encoded thereinto by a method for rendering a video data stream having a video encoded thereinto checkable on trustworthiness, the method having the steps of: subjecting a predetermined portion of the video data stream, or data derived therefrom, to a hash function to obtain a hash value; computing a digital signature based on the hash value so as to digitally sign the hash value, and inserting the digital signature into the video data stream, thereby allowing determining whether the video data stream is trustworthy by checking whether the hash value fits to the digital signature, wherein the video data stream has the video encoded thereinto by encoding the video into the video data stream by block based predictive coding and transform based residual coding by encoding the prediction residual data of the residual block into the video data stream by use of context-adaptive binary arithmetic coding by encoding a significance map which indicates positions of non-zero transform coefficients in a transform block representing the residual block by, in a forward scan traversing transform coefficients of the transform block, encoding a significance flag which indicates whether a non-zero transform coefficient is positioned at a current position, and, if so, and if the current position is not the last in the forward scan, encoding a last-significance flag which indicates whether the non-zero transform coefficient positioned at the current position is the last non-zero transform coefficient in the forward scan order, and encoding the non-zero transform coefficients' values sequentially in a reverse scan order, reversing the forward scan order.

Embodiments of the invention rely on the idea of rendering a video data stream checkable on trustworthiness by hashing a predetermined portion of the video data stream, and computing a digital signature based on the obtained hash value. The digital signature is transmitted in the video data stream. The video data stream may then be checked on trustworthiness by subjecting the predetermined portion of the video data stream to the hash function to obtain a hash value, and checking the hash value against the digital signature. Basing the trustworthiness check on the predetermined portion allows for a flexible but robust design of the trustworthiness check, by allowing, for example, including or excluding certain parts of the data stream into the predetermined portion, and thus the trustworthiness check, and/or maintaining certain functionalities such as random access, e.g., by selecting the predetermined portion in accordance with randomly accessible sections, e.g., coded video sequences, CVS, of the data stream. Furthermore, hashing the predetermined portion provides the advantage of reducing the data size of the digital signature, so that the signaling overhead for transmitting the digital signature is kept low.

For example, a basic principle that embodiments of this invention build on is the principle of digitally signing a compressed video bitstream.

An embodiment of the invention provides an apparatus for checking a video data stream having a video encoded thereinto on trustworthiness. The apparatus is configured for: subjecting a predetermined portion of the video data stream, or data derived therefrom, to a hash function to obtain a hash value; deriving a digital signature from the video data stream; and checking whether the hash value fits to the digital signature to determine whether the video data stream is trustworthy.

A further embodiment of the invention provides a decoder for decoding a video from a video data stream. The decoder is configured for decoding a digital signature from the video data stream. The decoder is further configured for subjecting the digital signature to a check of the video data stream on trustworthiness by: subjecting a predetermined portion of the video data stream, or data derived therefrom, to a hash function to obtain a hash value; and checking whether the hash value fits to the digital signature to determine whether the video data stream is trustworthy.

A further embodiment of the invention provides an apparatus for rendering a video data stream having a video encoded thereinto on checkable on trustworthiness. The apparatus is configured for: subjecting a predetermined portion of the video data stream, or data derived therefrom, to a hash function to obtain a hash value; computing a digital signature based on the hash value so as to digitally sign the hash function; and inserting the digital signature into the video data stream, thereby allowing determining whether the video data stream is trustworthy by checking whether the hash value fits to the digital signature.

A further embodiment of the invention provides a method for checking a video data stream having a video encoded thereinto on trustworthiness. The method comprises: subjecting a predetermined portion of the video data stream, or data derived therefrom, to a hash function to obtain a hash value; deriving a digital signature from the video data stream; and checking whether the hash value fits to the digital signature to determine whether the video data stream is trustworthy.

A further embodiment of the invention provides a method for decoding a video from a video data stream. The method comprises decoding a digital signature from the video data stream. The method further comprises subjecting the digital signature to a check of the video data stream on trustworthiness by: subjecting a predetermined portion of the video data stream, or data derived therefrom, to a hash function to obtain a hash value; and checking whether the hash value fits to the digital signature to determine whether the video data stream is trustworthy.

A further embodiment of the invention provides a method for rendering a video data stream having a video encoded thereinto on checkable on trustworthiness. The method comprises: subjecting a predetermined portion of the video data stream, or data derived therefrom, to a hash function to obtain a hash value; computing a digital signature based on the hash value so as to digitally sign the hash function; and inserting the digital signature into the video data stream, thereby allowing determining whether the video data stream is trustworthy by checking whether the hash value fits to the digital signature.

A further embodiment of the invention provides a video data stream having a video encoded thereinto, the video data stream being rendered checkable on trustworthiness using the above describe method. In particular, the video data stream comprises a digital signature for a predetermined portion of the video data stream.

The abovementioned video coding standards do not support any method by which a standard compliant decoder can determine whether a standard conformant compressed bitstream was really generated by a trustworthy source or whether it was generated by someone who only falsely claims to be such a source, for example by using a deepfake. Since these standards may already be widely deployed on devices worldwide, often with dedicated hardware supporting their efficient usage, embodiments of this invention provide a technical solution by which they can be amended so that a trustworthy data exchange is enabled, while, at the same time, the already deployed mechanisms of standard compliant decoding of bitstreams remain unchanged. Embodiments of the invention provide methods that guarantee robustness and flexibility towards future developments within the field of security relevant hashing and signature algorithms and to easily and individually enable a data transmission from content providers to content consumers that is based on a mutual understanding of trustworthiness between both parties. Embodiments follow any general design principles of the underlying specification texts of the corresponding standards in order to allow an easy implementation and deployment of the proposed technologies. Moreover, embodiments provide a solution for a trustworthy data exchange that can be combined and used in accordance with the core features and functionalities of the underlying video coding standards when used in practical applications.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
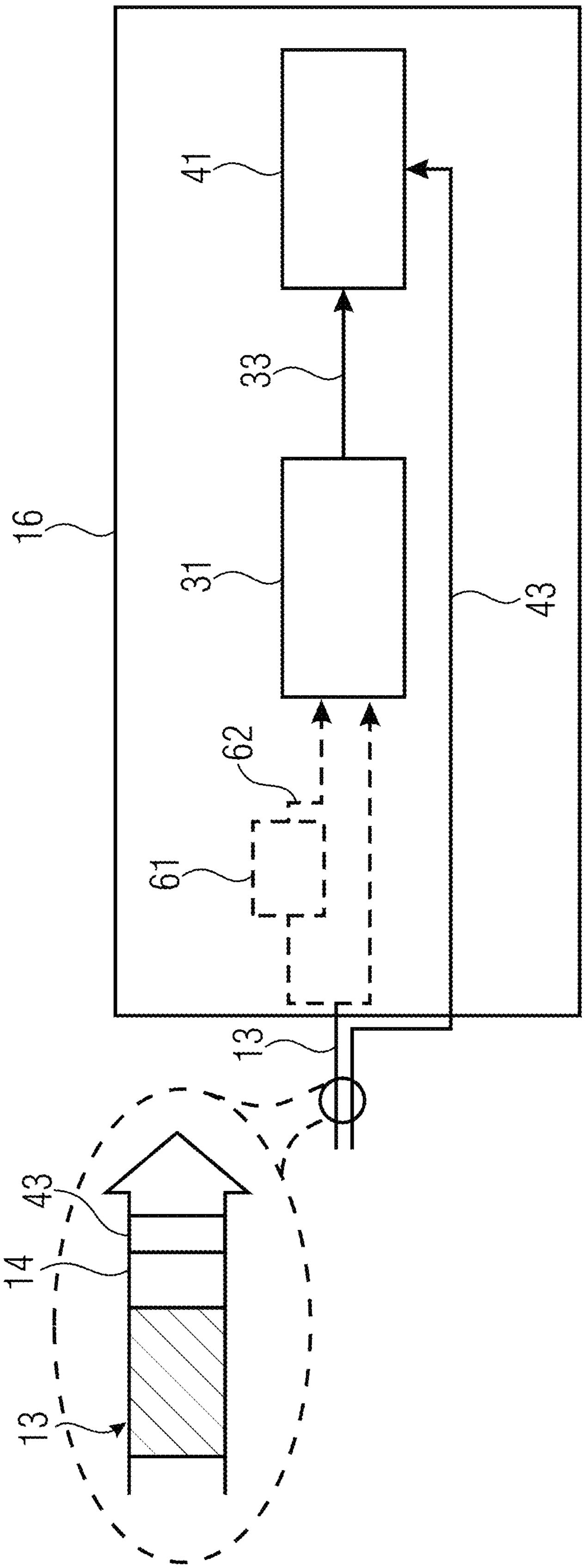
FIG. 1 illustrates an apparatus for checking a data stream on trustworthiness according to an embodiment.

Before embodiments of the present invention will subsequently be described on the basis of the accompanying drawings, it should be noted that elements and structures with the same effect are provided with the same reference numerals so that their description can be applied to each other or as interchangeable. In addition, features of the different embodiments described herein may be combined with each other, unless specifically noted otherwise.

FIG. 1 illustrates an apparatus 16 for checking a data stream 14 on trustworthiness according to an embodiment. The data stream 14 has a video encoded thereinto, e.g., data stream 14 is a video data stream. Apparatus 16 subjects a predetermined portion 13 of the data stream 14 to a hash function 31 to obtain a hash value 33, or alternatively, apparatus 16 subjects data 62 derived from the predetermined portion 13 to a hash function 31 to obtain a hash value 33. The latter option is exemplarily visualized in FIG. 1 by the optional block 61, which may derive the data 62, which is to be subjected to the hash function 31, from the predetermined portion 13. Apparatus 16 derives a digital signature 43 from the data stream 14. Furthermore, apparatus 16 comprises a verification block 41, which checks whether the hash value 33 fits to the digital signature 43 to determine whether the data stream is trustworthy. For example, if the digital signature 43 fits to the hash value 33, the data stream, or the predetermined portion thereof, is considered trustworthy.

For example, trustworthiness may mean that the content and/or the content provider of the data stream or of the predetermined portion are successfully verified as being authentic.

Figure 2:
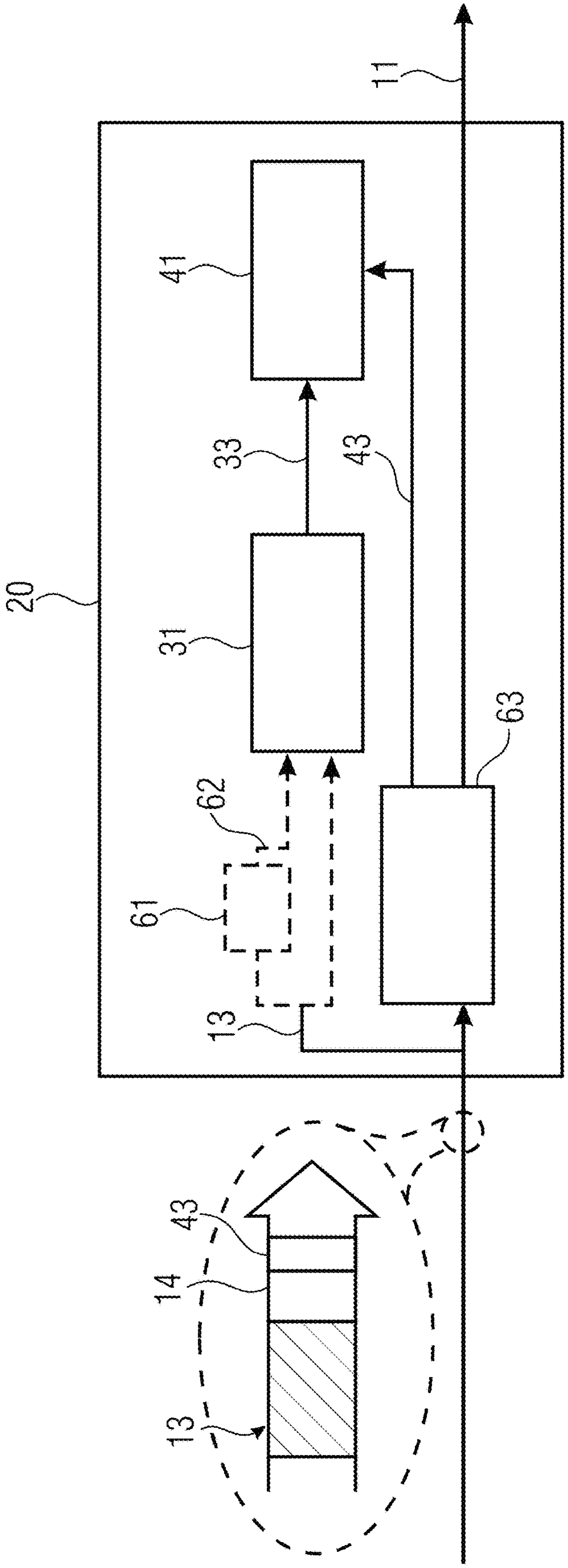
FIG. 2 illustrates a decoder according to an embodiment.

FIG. 2 illustrates a decoder 20 for decoding a video 11 from a data stream 14 according to an embodiment. Decoder 20 includes the functionality of apparatus 16 of FIG. 1. Decoder 20 comprises a decoding module 63 which decodes the digital signature 43 from the data stream 14, and decoder 20 subjects the digital signature 43 to a trustworthiness check as described with respect to apparatus 16 of FIG. 1. In other words, according to an embodiment, apparatus 16 of FIG. 1 may be a decoder, e.g., as shown in FIG. 2.

According to an embodiment, decoding module 63 decodes the video 11 from the data stream 14.

According to an embodiment, decoder 20 reconstructs the video 11 with respect to the predetermined portion 13 to obtain a reconstructed portion of the video. In other words, for example, decoder 20 reconstructs a portion of the video represented by the predetermined portion 13 to obtain the reconstructed portion of the video. According to this embodiment, decoder 20 subjects the reconstructed portion to the hash function 31. For example, the reconstruction may be may be represented by block 61 of FIG. 2, and in this case, blocks 61 and 63 may be combined. In other words, the data 62 derived from the predetermined portion 13 may be the reconstructed portion of the video, or even data derived therefrom.

In the following, further details of apparatus 16 will be described, which may optionally also apply to decoder 20 of FIG. 2.

For example, the predetermined portion 22 may be a contiguous portion of the data stream 14. Alternatively, the predetermined portion may be composed of a plurality of sub-portions or sections of the data stream, which may be interspersed with, or interspersed in between, further portions of the data stream, which are not part of the predetermined portion. For example, the predetermined portion 13 may be referred to as chunk.

In subjecting the predetermined portion 13 to the hashing function 31, apparatus 16 may subject the predetermined portion to the hashing function 31 in form or raw data from the data stream. That may mean, for example, that the data is parsed from the data stream 14 and subjected to the hashing function without further decoding.

According to an embodiment, the hash value 33 depends on every bit of the predetermined portion 13 of the data stream.

According to an embodiment, the hash value 33 depends on every bit of the predetermined portion of the data stream in an entropy coded domain.

According to an embodiment, the predetermined portion 13 of the data stream 14 extends over more than one access unit of the data stream so that the hash value depends on bits of the more than one access unit. For example, an access unit may refer to a portion of the data stream having encoded thereinto one, e.g., exactly one, time frame of the video.

According to an embodiment, the predetermined portion 33 is composed of one or more video coding layer portions of the data stream which have encoded thereinto motion vectors and intra prediction modes for prediction blocks and transform coefficients for residual blocks.

Figure 3:
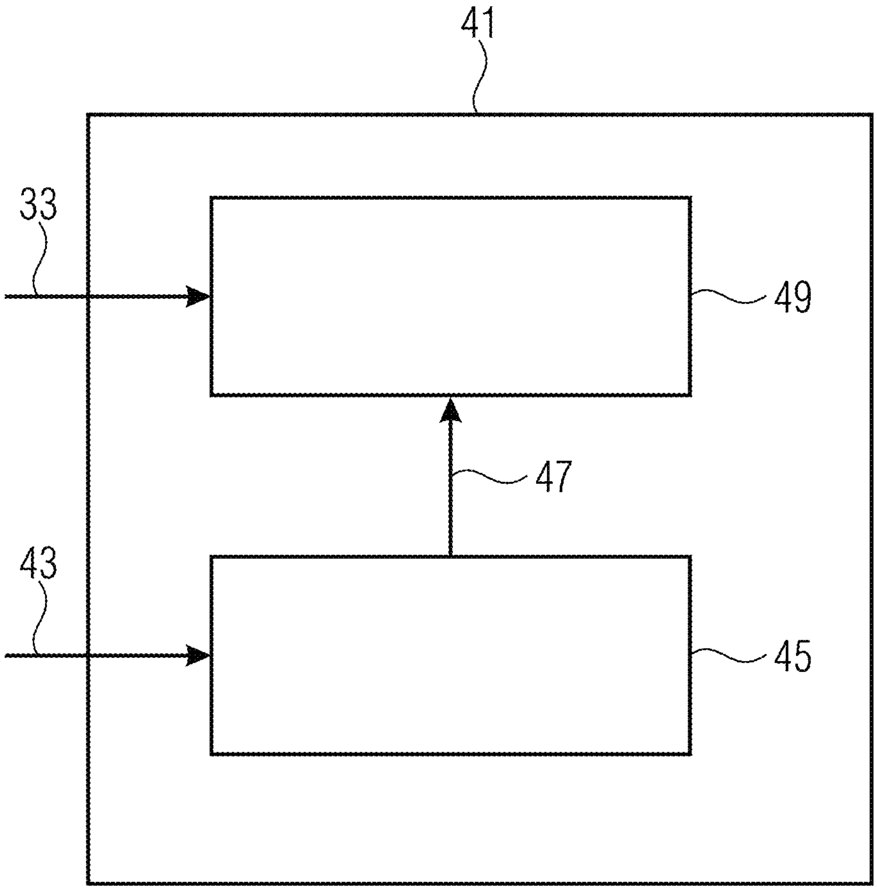
FIG. 3 illustrates a verification module according to an embodiment.

FIG. 3 illustrates the verification module 41 according to an exemplary embodiment. According to this embodiment, the verification module 41 comprises a decrypting bock 45, which decrypts the digital signature 43 to obtain a check value 47, and verification module 41 further comprises a verification block 49, which checks, whether the hash value 33 fits, e.g., matches, the check value 47.

For example, the generation of the digital signature 43 may be performed on encoder side by forming a check value and signing it using the private key. For example, the singing may include a further hashing, i.e., hashing the check value using a further hash function to obtain a further hash value and signing the further hash value. In this example, it may be impossible to reconstruct the check value from the digital signature 43 on decoder side, but instead, it can only be checked, if a check value formed using the hash value 33 fits to the digital signature. In this case, the verification by verification module 41 may include a hashing of the check value using the further hash function to obtain a further hash value, and checking, if the further hash value fits to the digital signature, e.g., by decrypting the digital signature using the public key and checking if the resulting decrypted further hash value equals the further hash value.

In other words, according to an embodiment, the checking whether the hash value 33 fits or matches the check value 47 may include forming a verification string using the hash value 33, e.g., by concatenating the hash value 33 with further information, such as a further hash value or a hash function identifier as will be described below, and hashing the verification string, e.g., using a further hash function. Verification module 41 may then check, whether the hashed verification string equals the check value 47 decrypted from the digital signature. On encoder side, according to this embodiment, the digital signature may be generated by forming the verification string as on decoder side, hashing it using the further hash function, and signing the hashed verification string to obtain the digital signature 43.

According to alternative embodiments, the check value 47 may correspond to the hash value 33 or to the concatenation of the hash value 33 with further information, such as a further hash value or a hash function identifier. In other words, the decryption of the digital signature in this case may yield the hash value 33 as part of the check value 47 (or the entire check value 47). In this case, due to the omittance of a further hashing, the digital signature may be larger.

For example, if one or the other of the above alternatives is employed may depend on the selected hash function.

For example, verification block 49 may check whether the hash value 33 equals the check value 47 or a portion thereof to determine whether the hash value 33 fits the check value 47. In other words, from another viewpoint, the check value 47 may be the entire value yielded from decrypting the digital signature, or a portion thereof, and the verification block 49 may check if the hash value 33 matches, or equals, the check value.

In other words, as to the meaning of fitting to the digital signature, for example, according to an embodiment, the digital signature is fitted to by a predetermined value, e.g., the hash value, in case of an equality of the predetermined value with the check value obtained by decrypting the digital signature 42. Alternatively, the digital signature 42 is fitted to by a predetermined value, e.g., the hash value, in case of an equality of the predetermined value with a predetermined portion of the check value, which predetermined portion of the check value is associated with the predetermined value.

According to an embodiment, the verification module 41 performs the checking by use of an asymmetric decryption scheme using a public key.

Figure 4:
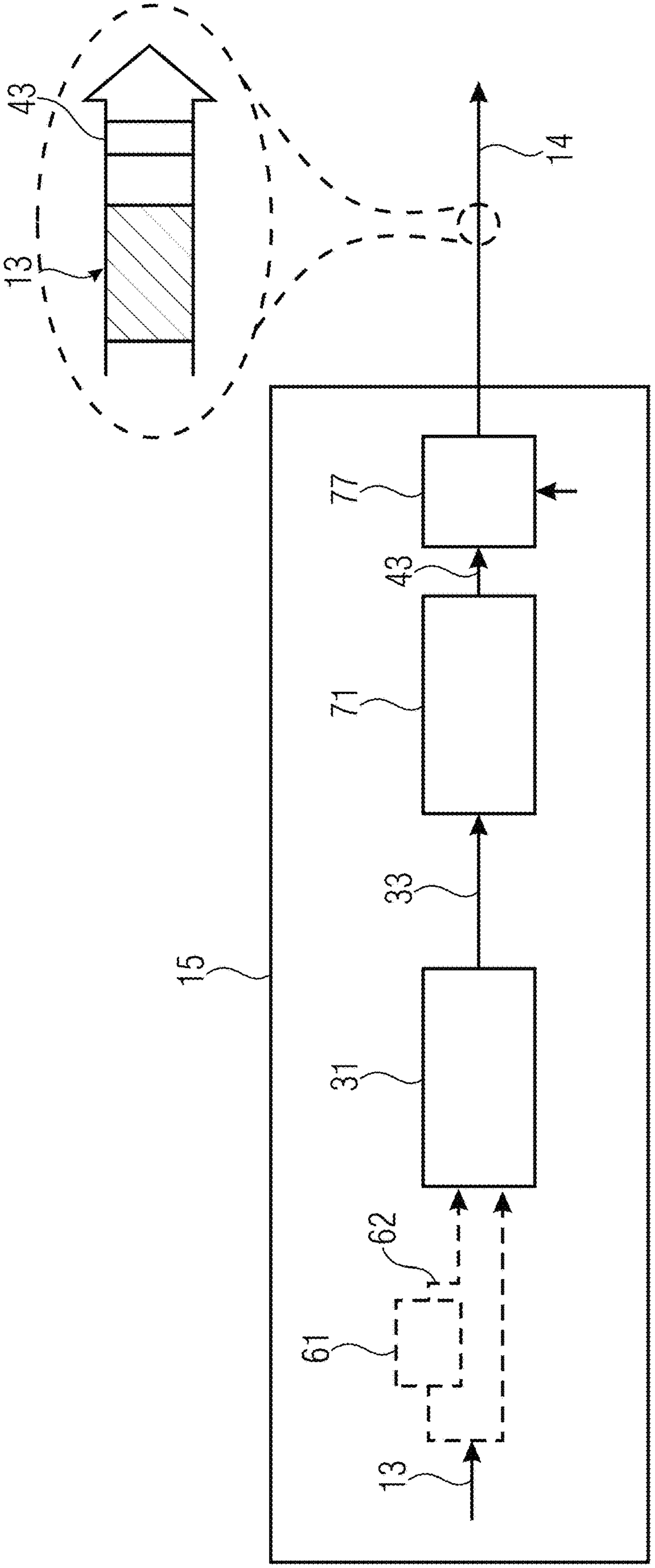
FIG. 4 illustrates an apparatus for rendering a data stream checkable on trustworthiness according to an embodiment.

FIG. 4 illustrates apparatus 15 according to an embodiment, apparatus 15 being for rendering a data stream 14, e.g., a video data stream 14 having a video encoded thereinto, checkable on trustworthiness. Apparatus 15 is configured for subjecting a predetermined portion 13 of the data stream, or data 62 derived therefrom, to a hash function 31 to obtain a hash value 33. In this respect, the description of apparatus 16 of FIG. 1 applies in an equivalent manner, e.g. with respect to the optional block 61. Apparatus 15 comprises a signing module 71, configured for computing the digital signature 43 based on the hash value 33 so as to digitally sign the hash value 33. Apparatus 15 further comprises an inserter 77, configured for inserting 77 the digital signature 43 into the data stream 14, thereby allowing determining whether the data stream is trustworthy by checking whether the hash value 33 fits to the digital signature 43.

It is noted that any description of apparatus 16 may optionally equivalently apply to apparatus 15 in the sense that any information derived from data stream 14 by apparatus 16 may be inserted into data stream 14 by apparatus 15. For example, with respect to the description of how apparatus 16 locates the predetermined portion 13 using SEI messages as markers, apparatus 15 may insert these messages accordingly into the data stream 14.

According to an embodiment, apparatus 15 reconstructs the video 11 with respect to the predetermined portion 13 to obtain a reconstructed portion of the video. In other words, for example, decoder 20 reconstructs a portion of the video represented by the predetermined portion 13 to obtain the reconstructed portion of the video. According to this embodiment, encoder 20 subjects the reconstructed portion to the hash function 31.

According to an embodiment, the apparatus 15 is an encoder configured for encoding the video into the data stream, and encoding the digital signature into the data stream.

According to an embodiment, signing module 71 computes the digital signature 43 based on the hash value 33 by forming the check value 47 based on the hash value 33, and encrypting the check value 47 to obtain the digital signature 43. In other words, signing module 71 may be the counterpart of verification module 41 of FIG. 3.

For example, in encrypting the check value 47, signing module 71 may use a private key of a pair of public and private key of an asymmetric encryption scheme, or use the private key and the public key. Verification block 49 may use the public key in decrypting the digital signature.

In the following, further aspects, details, and features of embodiments are described, which may optionally be implemented individually or in any combinations in any of the previously described embodiments of apparatus 15 and apparatus 16.

According to an embodiment, apparatus 16 is configured for providing the hash value for being subject, along with a further hash value obtained by subjecting a portion of a media stream accompanying the data stream, or further data derived therefrom, to the hash function or a different hash function, to a trustworthiness check of the data stream combined with the media stream.

In other words, for example, the actual check, e.g., the hashing and/or the verification of the hash value versus the digital signature may be performed by an even further entity instead of apparatus 16 or decoder 20 itself. For example, apparatus 16 may provide either the predetermined portion 13 or the hash value 33 along with the digital signature, and optionally further information retrieved from the data stream 14 concerning the verification, e.g., any of the information described as being derived from the supplemental information messages as disclosed herein, to another entity, which may perform the check.

Figure 5:
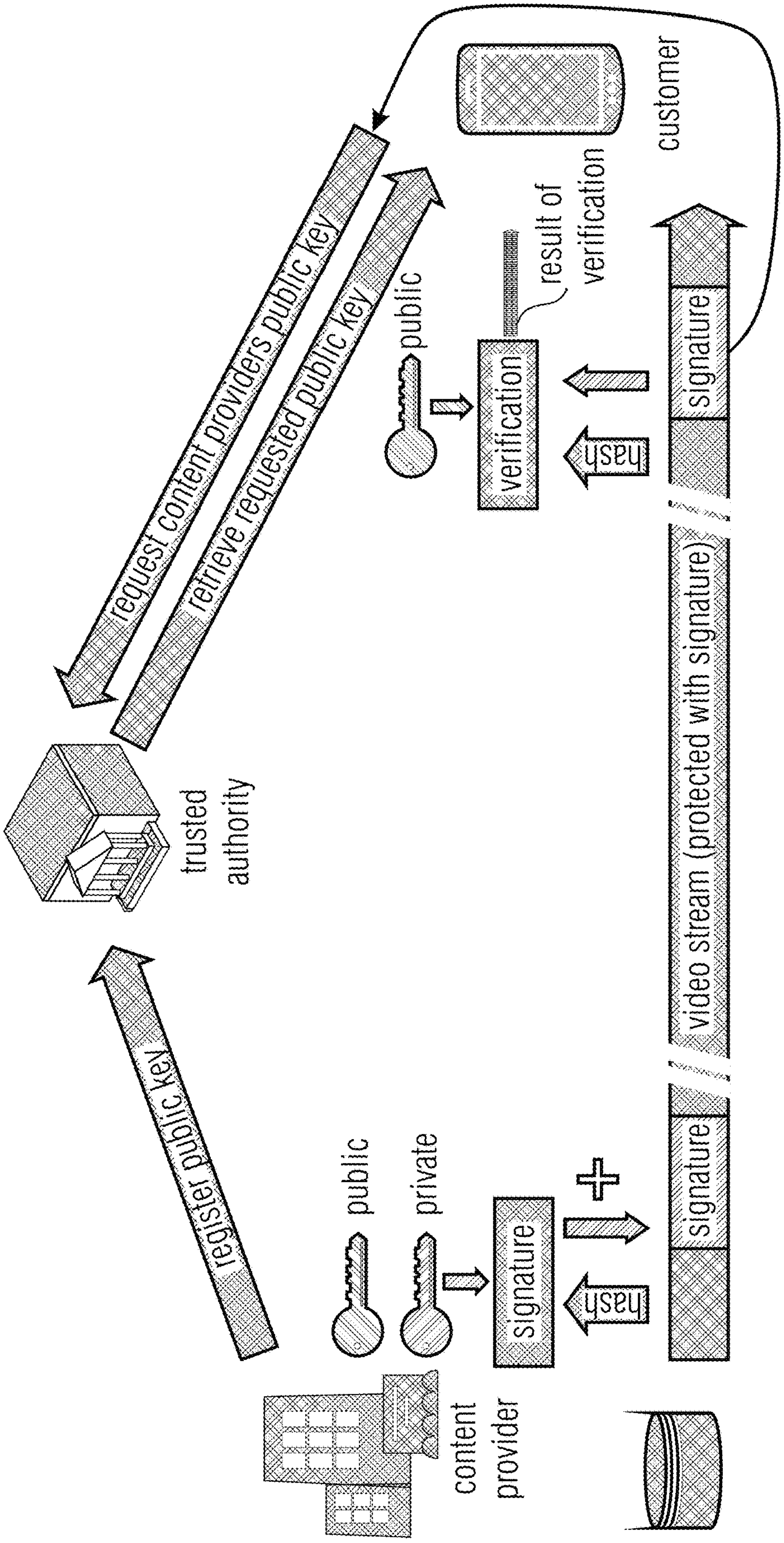
FIG. 5 shows an overview of a trustworthiness verification process according to an embodiment.

FIG. 5 illustrates an overview of a trustworthiness verification process according to an embodiment. According to this embodiment, the encoder, e.g., apparatus 15, is in possession of a private (and a public) key for a fixed signature algorithm. The decoder, e.g., decoder 20, only possesses the public, but not the private key. According to an embodiment, the bitstream, e.g., the data stream 14, itself may include a pointer to the public key, however, the public key itself may not be obtained solely from the bitstream but has to be obtained by invoking a trusted and independent method. For example, the bitstream can contain information that identifies the encoder as a certain entity, or as belonging to a certain entity. Given this information, the decoder can retrieve the public key corresponding to this entity from a third party trust center (for example by downloading it from a trusted and secure URL like PKI). Moreover, a fixed cryptographic hash function is agreed on by encoder and decoder. Here, either the hash function is fixed in advance or it is obtained in the same way as the public key from the bitstream and the third party trust center or it is obtained from the bitstream, where it might also be part of a digital signature. Then, a unique range of bytes is determined from the bitstream for which the cryptographic hash value is to be computed by the decoder using the given hash function. Finally, a digital signature that can be regarded as the claimed digital signature of the computed hash value for the given range of bytes is transmitted in the bitstream. For checking trustworthiness, the decoder processes this digital signature using the given public key. Then, if the result of this process is found to be the digital signature of the computed hash-value of the byte range, the decoder can regard this byte range as information that trustworthily belongs to the entity associated to the given public key while in the opposite case, it should regard it as a fake.

In the following, individual aspects of embodiments of the disclosed concept are described, the details of features of which may optionally combined with any of the embodiments described with respect to FIG. 1 to FIG. 5.

Figure 6A:
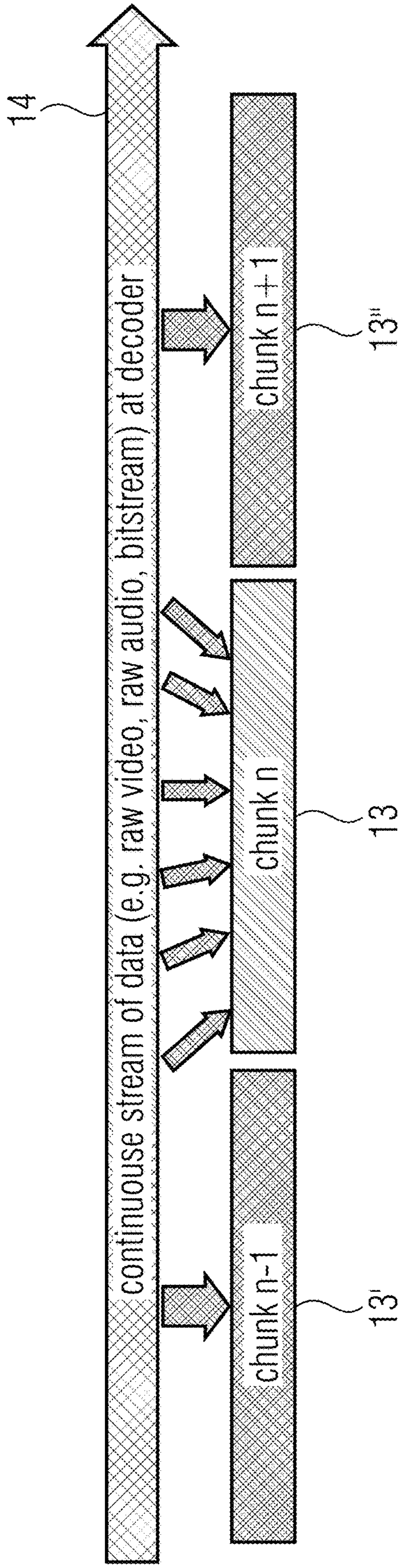
FIG. 6A illustrates a data selection of a signature process according to an embodiment.
Figure 6B:
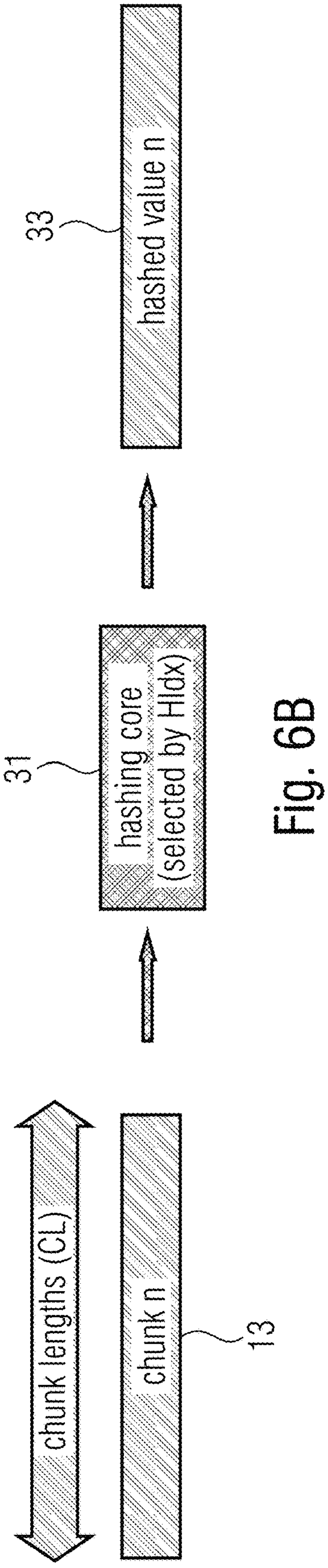
FIG. 6B illustrates a content hashing of a signature process according to an embodiment.
Figure 6C:
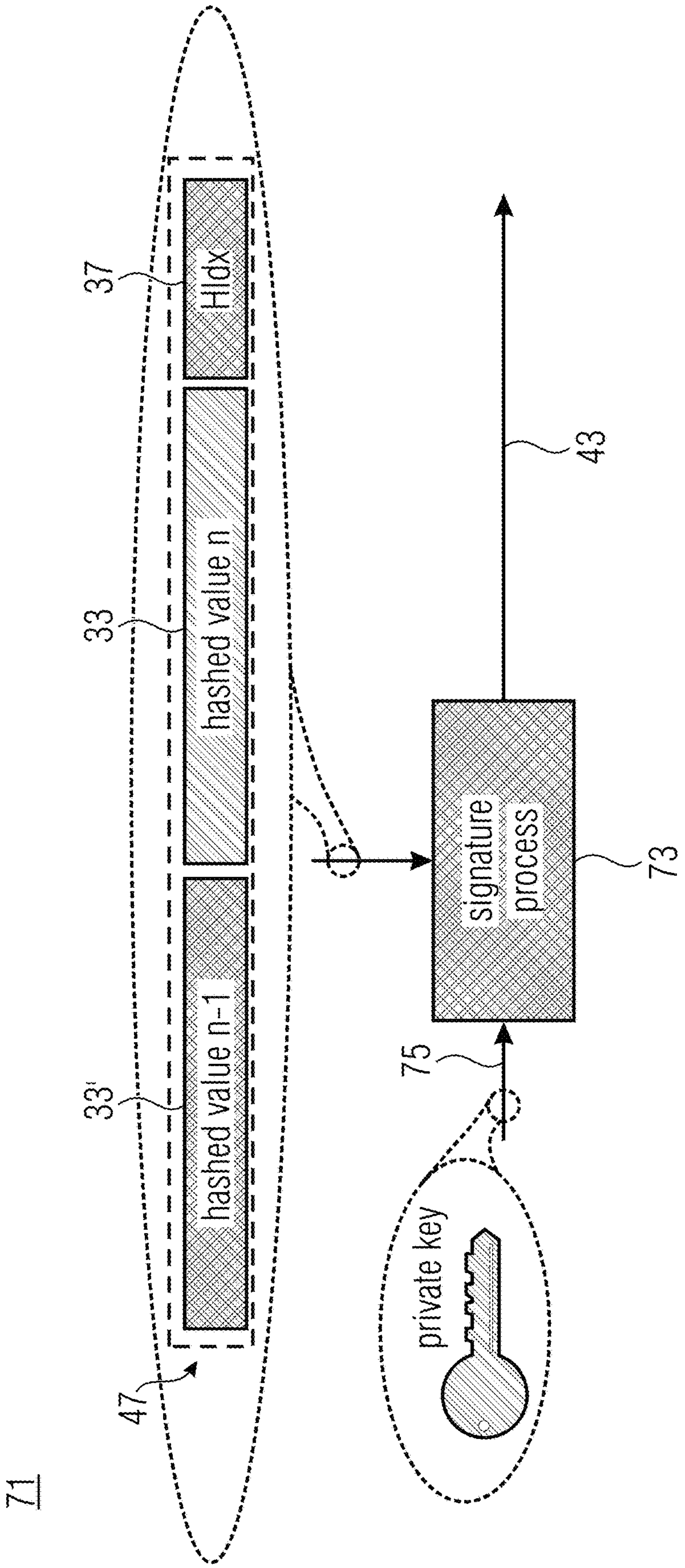
FIG. 6C illustrates a signature generation of a signature process according to an embodiment.

To start with, a signature process according to an embodiment is described with respect to FIG. 6A to FIG. 6C, which may be implemented by examples of apparatus 15.

FIG. 6A illustrates a chunk composition according to an embodiment. For example, apparatus 15 may compose the predetermined portion 13 from a plurality of portions or sections of data stream 14. For example, as illustrated in FIG. 6A, chunk 13 is part of a plurality of chunks, and the predetermined portion 13 may be referred to as current chunk.

For example, an order may be defined among the chunks. In other words, the chunks may form a sequence, and chunk 13 may have a preceding chunk 13' and/or a succeeding chunk 13".

For example, each of the chunks is rendered checkable on trustworthiness. For example, the data stream 14 comprises a respective digital signatures for each of the chunks. In other words, the data stream 14 may be checkable on trustworthiness in units of the chunks.

FIG. 6B illustrates a chunk hashing according to an embodiment. As illustrated in FIG. 6B chunk 13 may be subjected to the hashing function 31, e.g., referred to as hashing core, to derive the hash value 33. Optionally, the hashing function may be selected using an index, e.g., HIdx, as will be described in more detail below.

FIG. 6C illustrates a signature generation 71 according to an embodiment, e.g., as it may optionally be performed by signing module 71 of FIG. 4. According to this embodiment, singing module 71 forms a check value 47 by concatenating a previous hash value 33' for the previous chunk 13' with the hash value 33 of the current chunk 13 and a hash function identifier 37, which indicates the hash function that has been used for deriving the hash value 33. Optionally, if there is no previous chunk 13', e.g., if the predetermined portion 13 is the first portion of a coded video sequence, the previous hash value 13' may assume a predetermined value, e.g. as will be described in more detail below. According to the embodiment of FIG. 6C, the signing module comprises a signing block 73, which uses a private key of a pair of public and private keys of an asymmetric encryption scheme to sign the check value 47 to derive the digital signature 43.

In the following, a verification process according to an embodiment is described, as it may be implemented by examples of apparatus 16.

For example, for verification, apparatus 16 may perform the chunk composition of FIG. 6A. For example, apparatus 16 may derive the composition of the chunk 13 from the data stream. In other words, data stream 14 may comprise an indication or information revealing the composition of the chunks. Details will be described below.

Furthermore, apparatus 16 may perform the chunk hashing of FIG. 6B. For example, the indication of the hashing function may be transmitted in the data stream 14

Figure 7:
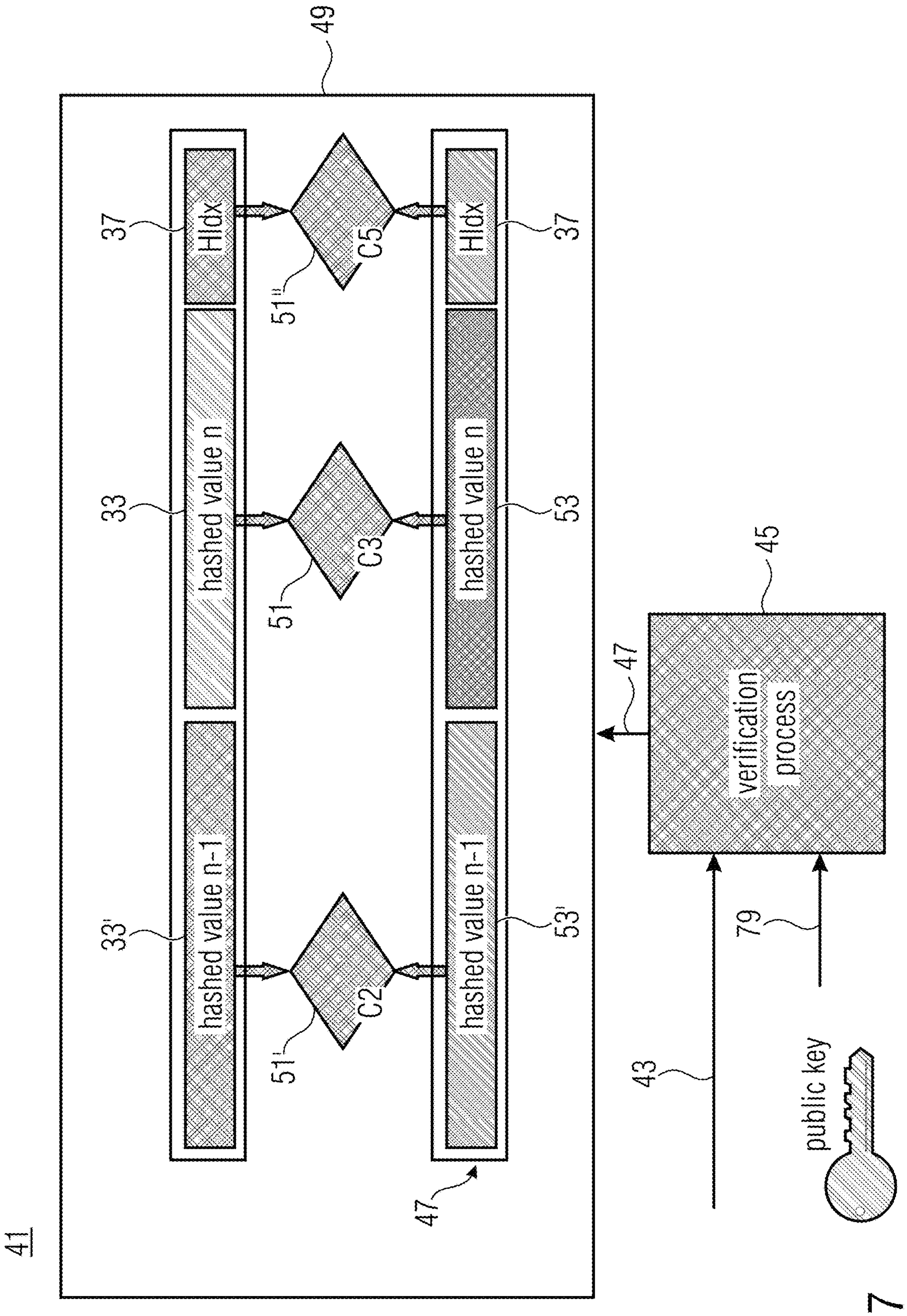
FIG. 7 shows a signature verification of a verification process according to an embodiment.

FIG. 7 illustrates a signature verification 41 according to an embodiment, e.g., as it may be optionally performed by verification module 41. According to this embodiment, the decryption block 45 decrypts the digital signature 43 derived from the data stream 14 using the public key 79 of the pair of public and private keys of the asymmetric encryption scheme to derive the check value 47. According to this embodiment, the check value 47 comprises a first portion 53, a second portion 53' and, optionally, the indication 37 of the hash function. The first portion 53 is associated with the hash value 33 of chunk 13, and the second portion 53' is associated with the hash value 33' of the previous chunk 13', e.g., in that associated values are to be checked against each other in order to verify the authenticity. According to this embodiment, the verification block 49 checks, see block 51, if the first portion 53 equals the hash value 33. For example, if this is the case, it may be concluded that the predetermined portion is authentic. Additionally, verification block 49 checks, see block 51', if the second portion 53' equals the previous hash value 33'. For example, if this is the case, it may be concluded that no additional data has been inserted in between the chunks 13', 13. Additionally, verification block 49 checks, see block 51", if the index of the hash function equals the index of the hash function used for deriving the hash value. For example, if this is the case, it can be guaranteed that the verification scheme was not circumvented, as it will be described in more detail below.

It is noted that in other embodiments, less or additional pieces of information may be part of the check value.

In more general terms, as described with respect to FIG. 6C and FIG. 7, the verification process may include an identifier of the hash function. For example, the identifier may indicate a type and/or a parametrization of the hash function 31.

In other words, according to an embodiment, verification module 41 is configured for checking the data stream on trustworthiness further by checking, if the hash function is correct by checking whether a parametrization of, or an identifier of the hash function fits to the digital signature.

In the following, individual aspects of embodiments of the disclosed concept are described, the details of features of which may optionally combined with any of the embodiments described with respect to FIG. 1 to FIG. 7.

Robustness Towards Future Security Risks by Enabling Assignment of Digital Signature Methods and Hash Functions Via Trust Centers The ability of the above process to guarantee trustworthiness depends on the following properties of the signature algorithm and the hashing algorithm.

First, it has to be impossible to compute the private key given the public key only since everybody in possession of the private key can generate a video content that is regarded as belonging trustworthily to the entity that is associated to the given public key. Second, it is needed that the used cryptographic hash function is robust towards collision attacks, since otherwise, the above byte range could be manipulated while it still matches the encoded and digitally signed hash-value.

It can be observed that there are continuous efforts around the world to break the security of signature algorithms or of hashing functions, while, simultaneously, new algorithms are proposed which can be regarded as secure, at least for a certain time-range. In order to take this observation into account, one aspect of this invention is to propose that the signature algorithm and/or the hashing function are retrieved from an external trust center by using an index that is signaled in the bitstream and that points to a specific entity that the content is to be trustworthily assigned to. The latter entity can then flexibly upgrade the signature algorithm and/or the hashing function to be used by decoders who want to verify that the given bitstream trustworthily belongs to it. For a corresponding security upgrade of the bitstream, the content providing entity would only need to update the digital signatures of the hash values but could leave all other parts of the bitstream untouched.

In more general terms, referring to the description of apparatus 16 with respect to FIG. 1 to FIG. 7, according to an embodiment, apparatus 16 derives the asymmetric decryption scheme using a first information derived from the data stream 14.

According to an embodiment, the first information comprises a decryption scheme indicator, e.g., an indicator identifying a decryption scheme.

According to an alternative embodiment, the first information comprises a first pointer to a first location, e.g., a network location, from which the asymmetric decryption scheme may be determined. For example, the first information may be a URI pointing to a network location, from which a certificate may be retrieved.

According to an even alternative embodiment, the first information comprises an identifier of the entity having encoded the video into the data stream.

According to an embodiment, apparatus 16 derives the public key using a second information derived from the data stream.

According to an embodiment, the second information comprises a second pointer to a second location from which the public key may be retrieved. For example, the second information, may comprise an identifier of the public key, e.g., among a plurality of keys derivable from a network location, e.g., the network location, to which the pointer of the first information points.

According to an alternative embodiment, the second information comprises an identifier of the entity having encoded the video into the data stream.

According to an embodiment, apparatus 16 is configured for deriving the public key by deriving a first syntax element, e.g., twci_use_key_register_idx_flag, and a second syntax element, e.g., twci_key_source_uri, from the data stream 14, wherein the second syntax element is indicative of a pointer to a location, e.g., a URI, from which the public key is derivable. According to this embodiment, wherein the apparatus 16 is configured for, if the first syntax element has a first state, inferring that the location identifies exactly one public key, and deriving the exactly one public key from the location, and if the first syntax element has the second state, inferring that the location is indicative of a list of keys, and deriving a third syntax element, e.g., twci_key_register_idx, from the data stream, the third syntax element indicating a pointer to an entry in the list of keys, and deriving the public key from the entry in the list of keys indicated by the pointer.

For example, the location, to which the pointer points, may hold one or more certificates. For example, a certificate may include one or more keys. A certificate may additionally indicate one or more decryption schemes, e.g., hash functions, for the one or more keys. For example, a certificate may optionally be associated with a specific content provider.

According to an embodiment, the location, to which the pointer points, holds one certificate comprising exactly one key, so that the information of the second syntax element might be sufficient for retrieving the public key.

According to another embodiment, the location, to which the pointer points, holds one o certificate including one or more keys. In this case, the third syntax element may point to the key within the certificate to be used for the trustworthiness check.

According to another embodiment, the location, to which the pointer points, holds one or more certificates, each of which includes exactly one key. In this case, the third syntax element may point to the certificate, from which the public key, and optionally, the decryption scheme, are to be derived. A combination with the previous embodiment is also possible, in that the third syntax element indicates a certificate out of one or more certificates, and within the indicated certificate, a key out of one or more key of the indicated certificate.

According to an embodiment, apparatus 16 derives the hash function 31 using a third information derived from the data stream.

According to an embodiment, the third information comprises a hash function indicator or a third pointer to a third location from which the hash function may be determined.

According to an alternative embodiment, the third information comprises an identifier of the entity having encoded the video into the data stream.

Robustness Towards Future Collision Attacks on the Hash Function by Digitally Signing the Supported Hash Function As another solution to the problem of potentially successful future collision attacks against the hash function, it is also proposed that the bitstream may contain an index to a specific hash function, where, for security reasons, this index is also part of the message whose digital signature is part of the bitstream and can thus also be trustworthily verified. For a check of trustworthiness, the decoder would then do a joint signature verification of the received digital signature against the pair of the hash value and the hash function index.

Embodiments exploiting a joint signature verification are described above with respect to FIG. 6C and FIG. 7.

Chunkwise Digital Signatures for Compression Efficient Usage of Digital Signatures for Video Content While it enables the trustworthy exchange of digital video content using widely deployed video coding standards, the above method also puts an additional rate burden on any bitstream it is applied to, since extra information, in particular the digital signature, has to be transmitted. For example, if the digital signing is performed based on the RSA-2048 algorithm, the digital signature needs a size of 400 bytes in the bitstream.

Thus, instead of transmitting a new digital signature for each subportion of the bitstream that belongs for example to one coded slice or picture (i.g. a Video Coding Layer NAL unit), it might be more rate-efficient to transmit a single digital signature by which the trustworthiness of several coded slices or pictures is guaranteed jointly by the above method. However, it is a core functionality of widely deployed video coding standards such as H.264 or H.265 that for a single bitstream, different decoders may only have some of the coded slices or pictures of the bitstream at their disposal. Then, any decoder that cannot access all coded slices or pictures would be excluded from applying the above-mentioned method for the verification of trustworthiness if only a single hash value, computed for the whole bitstream, would be sufficient for trustworthiness verification. As a further observation, it is pointed out that, on the one hand, there is in general a very large number of ways by which subsets of the set of all coded slices or pictures may be combined into sub-bitstreams by decoders while, on the other hand, there might be efficient methods for encoders to decide, based on the given content and the given total bitstream, which subsets can be expected to occur in a given situation. Thus, a flexible syntax that allows the flexible assignment of coded slices or pictures to one out of possibly multiple sets of coded slices or pictures for the purpose of trustworthiness verification by the above method is suggested. In this application, any such set of coded slices or pictures for which a joint trustworthiness verification can be performed by the above method will be referred to as chunk of data. Thus, in the present setting, such a chunk of data is characterized by the property that all of its bytes are used for the computation of a hash value and that a digitally signed value is transmitted for this chunk which, for the sake of trustworthiness verification, has to be verified against the computed hash value using the public key.

Integrity of the Bitstream Across Multiple Chunks

To guarantee that decoders can verify the continuity between the single chunks they use and to prevent attacks by removal, insertion or shuffling data chunks in the protected bitstream, it is proposed in this invention that the hash value of a preceding chunk is also incorporated in the digital signature of a current chunk as described in FIGS. 6C and 7. Thus, for the current chunk, the digital signature of a combination of the hash value of the current chunk and the claimed hash value of the preceding chunk have to be part of the bitstream. Then, for trustworthiness verification of the consistency of the current chunk with the preceding chunk, the computed hash value of the preceding and of the current chunk are jointly verified against this digital signature by using the public key. It is pointed out that the hash value of the current chunk and the hash value of the preceding chunk have to be jointly signed for the current chunk so that only an entity that is in possession of the private key can generate their simultaneous occurrence as a digital signature for the current chunk. A very important application scenario for such a guarantee of temporal integrity is the fact that also video bitstreams which are made trustworthy by the above method should allow random access capability for their decoding. However, if a bitstream would already be deemed trustworthy by only checking the temporal subsegments between random access points individually and independently from each other, one could easily generate fake content by patching together temporal subsegments from different bitstreams that were originally generated from completely different video sequences. It is pointed out that the proposed solution of guaranteeing joint trustworthiness of multiple chunks or random access segments still guarantees random access capability: A decoder who switches into the decoding at a given random access segment but who disregards any previous parts of the bitstream can simply disregard the hash value that identifies these previous parts of the bitstream and can solely focus on the verification of that part of the bitstream which it has received.

In more general terms, what is described in this section, and making reference to FIG. 6C and FIG. 7, are embodiments, according to which the checking the data stream 14 on trustworthiness may be performed sequentially with respect to a plurality of portions, or chunks, of the data stream 14. In the following, generalizing embodiments of this disclosure are described.

For example, the portion of the plurality of portions may be portions of subsequent segments of the data stream 14. In other words, two portions of the sequentially checked plurality of portions may be portions out of subsequent segments of the data stream, e.g., as it is indicated in FIG. 6A. Additionally or alternatively, the portions of the plurality of portions may be portions out of the same temporal segment of the data stream 14, that is, e.g., sub-portions of the portions may be interleaved within the data stream, e.g., as will be described with respect to FIG. 11A and FIG. 11B.

In other words, each of the portions may be associated with one out of the one or more substreams with respect to which the trustworthiness check may be performed as will be described below.

For example, the sequential checking may be performed by sequentially checking subsequent segments of the data stream 14, and within one segment, sequentially checking the substreams according to an order defined among the substreams.

For example, the segments of the data stream 14 may be defined, or indicated, as described with respect to FIG. 9A to 10B below.

Thus, for example, in the following embodiments, the previous portion 13' may be understood as the previous portion in the sequential checking, be it a portion of a lower ranked substream of the same segment of the data stream 14, or a portion of the previous segment of the data stream 14.

According to an embodiment, verification module 41 checks, whether the hash value 33 and a further hash value 33' obtained by subjecting a previous portion 13' of the plurality of portions, or further data derived therefrom, to the hash function 31, fit to the digital signature 43, for example as described with respect to FIG. 6C and FIG. 7. For example, the further data may be derived from the previous portion 13' as described with respect to the predetermined portion 13.

According to this embodiment, the hash value 33 and the further hash value 33' may be checked against respective associated portions, e.g. sub-strings, of the check value 47, e.g., as described with respect to FIG. 7.

Alternatively, the hash value 33 and the further hash value 33' may be combined, e.g., concatenated, and the resulting combined hash value may be checked against the check value 47, or a portion, e.g., a sub-string, thereof. In other words, according to an embodiment, apparatus 16 may subject the hash value 33 and the further hash value 33' to a combination to obtain a combined hash value and checking whether the combined hash value fits to the digital signature 43.

Figure 8:
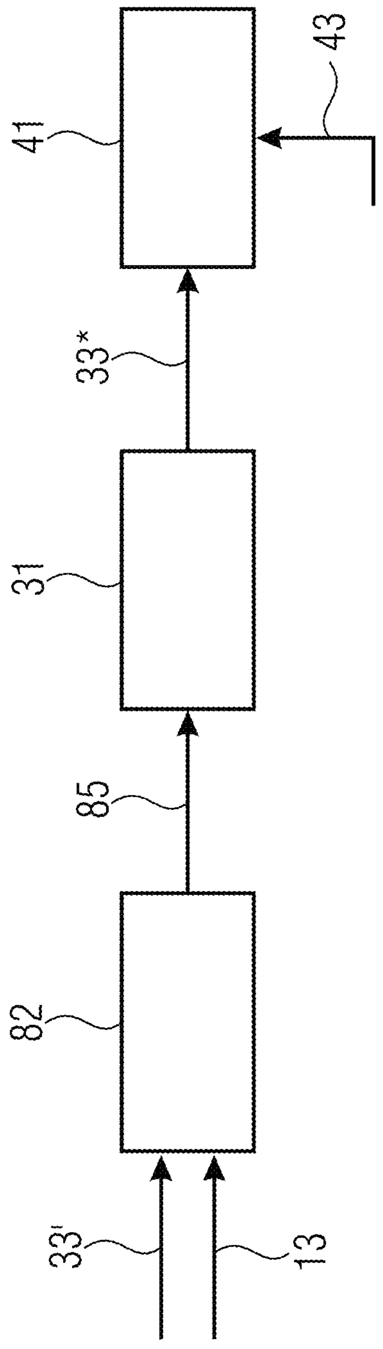
FIG. 8 illustrates forming a hash value according to an embodiment.

FIG. 8 illustrates an alternative embodiment for forming a hash value to be used as input for verification module 41. According to this embodiment, apparatus 16 comprises a combiner 82, which forms a combination 85, e.g., a concatenation, of the predetermined portion 13 and the previous hash value 33'. This combination 85 is subject to the hash function 31, resulting in a combined hash value 33*, which is subject to verification by verification module 41. For example, according to this embodiment, the verification module 41 may check the combined hash value 33* against a combined check value, e.g. a value or a string resulting from the decrypting 45 of the signature 43, or a portion thereof, e.g., check whether the combined hash value 33* equals the value or string resulting from the decrypting 45 of the signature 43, or a portion thereof. In an alternative of this embodiment, instead of the predetermined portion 13, the data 62 derived therefrom as described with respect to FIG. 1 may be used as input to combiner 82.

In more general terms, according to an embodiment, the verification module 41 checks, whether a combined hash value 33* derived by hashing the predetermined portion 13, or data 62 derived therefrom, and a further hash value 33' obtained by subjecting a previous portion 13' of the data stream, or further data derived therefrom, to the hash function 31, fits to the digital signature 43. In other words, according to this embodiment, the hash value obtained for the previous portion may be combined, e.g., concatenated, with the predetermined portion 13, or the data 62 derived therefrom, and the obtained combination may be subjected to the hash function 31 to derive the hash value for the predetermined portion.

According to an embodiment, apparatus 16 may subject the predetermined portion 13 and the further hash value 33' obtained by subjecting a previous portion 13' of the data stream 14, or further data derived therefrom, to the hash function 31, to a combination to obtain a combined hash value and checking whether the combined hash value fits to the digital signature.

Note again, that the manner of deriving the hash value to be subject to verification 41 may be performed in an equivalent manner on encoder and decoder sides, e.g., by apparatus 15 and apparatus 16.

The following description discloses embodiments for the case that the data stream 14 does not include a previous portion of the predetermined portion 13, e.g., the case that data stream 14 has been accessed at the predetermined portion by random access.

According to an embodiment, two different digital signatures are transmitted in the data stream 14 for the predetermined portion 13. According to this embodiment, apparatus 16 performs the checking the data stream on trustworthiness sequentially with respect to a plurality of portions of the data stream.

According to an embodiment, if the data stream comprises a previous portion with respect to the predetermined portion, the apparatus 16 is configured for performing the checking on trustworthiness with respect to a first one of the two different digital signature. For example, in this case, the checking is performed according to any of the embodiments described above, e.g., the ones of FIG. 7 or FIG. 8. If the data stream comprises no previous portion with respect to the predetermined portion, apparatus 16 checks whether the hash value 33 fits to a second one of the two different digital signatures to determine whether the data stream is trustworthy.

According to a further embodiment, the apparatus 16 is configured for, if the data stream comprises a previous portion with respect to the predetermined portion, checking whether the hash value 33 and a further hash value 33' obtained by subjecting a previous portion 13' of the data stream, or further data derived therefrom, to the hash function 31, fit to the digital signature 43, or whether the hash value 33 and an even further hash value transmitted in the data stream for the predetermined portion fit (e.g. in concatenated form or in a further hashed domain) to the digital signature and the even further hash value equals a further hash value 33' obtained by subjecting a previous portion 13' of the data stream, or further data derived therefrom, to the hash function 31. Additionally, according to this embodiment, if the data stream comprises a previous portion 13' with respect to the predetermined portion 13, apparatus 16 checks whether a combined hash value derived by hashing the predetermined portion 13 on the one hand and a further hash value 33' obtained by subjecting a previous portion 13' of the data stream, or further data derived therefrom, to the hash function, on the other hand fits to the first one of the two different digital signatures, or whether a combined hash value derived by hashing the hash value and an even further hash value transmitted in the data stream for the predetermined portion fit (e.g. in concatenated form or in a further hashed domain) to the digital signature and the even further hash value equals a further hash value obtained by subjecting a previous portion of the data stream, or further data derived therefrom, to the hash function. According to this embodiment, if the data stream comprises no previous portion with respect to the predetermined portion 13 apparatus 16 checks whether the hash value fits to the digital signature to determine whether the data stream is trustworthy.

For example, if the data stream comprises no previous portion with respect to the predetermined portion, apparatus 16 may check whether the hash value fits to the digital signature to determine whether the data stream is trustworthy by checking whether the hash value and the even further hash value transmitted in the data stream for the predetermined portion fit (e.g. in concatenated form or in a further hashed domain) to the digital signature.

Special Handling for First Chunks of a Bitstream in Order to Generate Secure Padding within Signatures According to an embodiment, at the beginning of a video, where there is no preceding chunk, the proposed structure of the digital signature would need that some padding values are inserted at the positions reserved for the hash-value of the previous chunk. For security against attacks that try to generate fake content matching such padding values only, it is proposed that these padding values are specified and that no bitstream or chunk whose actual computed hash value matches such a padded hash value has to be accepted as trustworthy. If the event occurs that an encoder generates a chunk which it wants to mark as trustworthy but whose hash value should, by coincidence, match the reserved padding hash value, the encoder can simply add a so called stuffing byte to its bitstream, which, on the one hand, does not alter the reconstructed content obtained from the bitstream but which, on the other hand, by the design properties of typical hash functions, would yield a completely different hash value than the hash value reserved for padding.

Support of Delayed Temporal Consistency Verification Also for Signature Algorithms with Small Signatures In order to save further bitrate when transmitting digital signatures, one may select a signature algorithm which needs less bytes for its signatures, for example the elliptic-curve based ECDSA P-256. However, when doing so, it might be the case that the value that is needed to be signed by the proposed technology, which occurs by concatenating at least two hash values, might need too many bytes for the used signature algorithm. For that purpose, the encoder can hash this value previous to the signature generation using the private key. Accordingly, for verification, the decoder first computes the hashed value out of the bitstream, then forms the concatenation with the hashed value of the previous chunk and possibly the index for the cryptographic hash function, then computes the second hashed value of the combination and compares this value with the transmitted digital signature by using its public key.

It is pointed out that for this mechanism, the abovementioned trustworthy random access capabilities still hold with the difference that any decoder who starts decoding the bitstream at a segment which is not the starting segment cannot directly verify the trustworthiness of this segment but can do so only when he verifies the joint trustworthiness of the next segment together with the first segment.

Thus, as to the meaning of fitting the digital signature in general term, for example, according to an embodiment, the digital signature is fitted to by a predetermined value in case of an equality with the check value in a further hashed domain, reached by a further hash function applied onto the predetermined value or a concatenation of value including the predetermined value.

Exclusion of Transmitted Postprocessing Tools to Guarantee Trustworthiness

The application of the present trustworthiness verification algorithm focuses on those portions of the bitstream which contain Video Coding Layer NAL-units belonging directly to coded sample values (such as coded slices or pictures). The reason for this is that other parts of the bitstream may often be transmitted out of band. However, while this does not cause huge problems for trustworthiness if such other information is just comprised by information like sequence or picture parameter sets, it might become highly problematic for the targeted application if this information is for example an SEI message that suggest an application of post-processing tools. An example for the latter kind of information would be the neural network based post-filter SEI message, by which parameters of a post-filter can be transmitted. With the help of this SEI message, it could be possible to significantly alter the displayed content in comparison to an originally intended content that was assumed when generating the trustworthy bitstream by the above method.

For these reasons, as one possible solution it is proposed that the proposed trustworthiness verification is completely exclusive with some SEI message like the neural network based post-filter, which means that for the case that the bitstream indicates that the present trustworthiness verification is to be applied, the neural network based post-filter SEI message of this bitstream has to indicate that no neural network based post filter is to be used.

Alternatively, it is proposed that the specification text should include a note that the whole verification process generated by the proposed TWC-SEIs only intends to guarantee trustworthiness of the decoded pictures (and not the output pictures after the application of possible post-processing tools).

As another possible solution, it is proposed that, instead of portions of the bitstreams, chunks of whole reconstructed pictures or slices shall be used for computing the hash-values in the above suggested process. Then, any post-processing applied to such a chunk of reconstructed video sample values and not intended by the original generator of the content would result in marking this chunk as being not trustworthy.

Enabling of the Proposed Trustworthiness Verification Process by Supplemental Enhancement Information Messages Three Supplemental Enhancement Information (SEI) messages are proposed to be added to the SEI-specification texts of H.264, H.265 and H.266 by which the above trustworthiness verification process can be obtained: A Trustworthy Content Start SEI message (TWC-Start SEI), a Trustworthy Content Selection SEI message (TWC-Select SEI) and a Trustworthy Content Verification SEI message (TWC-Verify SEI), see FIGS. 10A to 12.

The TWC-Start SEI first contains the syntax element twci_hash_method_type which references the specific hash function to be used for generating hash values out of the bytes of Video Coding Layer (VCL) NAL-Units. Then, the number of different chunks or substreams for which the hash values are to be computed is expressed by the syntax element twci_num_verification_substreams_minus1. Finally, a URI from which the public key can be retrieved, possible in combination with an index to a specific key listed at that URI, is coded the by syntax elements twci_key_source_uri, twci_use_key_register_idx_flag and twci_key_register_idx. Here, the envisioned application for the case that twci_use_key_register_idx_flag is true, is the situation in which the URI represents a large trust center at which possibly multiple content providers can register keys.

If the Trustworthy Content Selection SEI message is signaled, the hash value for the substream corresponding to twcs_verification_substream_id is to be updated using the hash-function specified in the preceding TWC-Start SEI message. If no TWC-Start SEI message was sent, the bitstream shall also not contain any Trustworthy Content Selection SEI message. If a TWC-Start SEI message was sent but no Trustworthy Content Selection SEI message is sent for a given access unit, the verification substream corresponding to the index 0 is to be updated using the hash-function specified in the preceding TWC-Start SEI message.

If the TWC-Verification SEI message is sent in an access unit, it contains the digital signature of the assumed hash value corresponding to the verification substream to which the Video Coding Layer of the access unit belongs to. Thus, if the access unit also contains a Trustworthy Content Selection SEI message, this is the verification substream specified by this SEI message. If it does not contain a Trustworthy Content Selection SEI message, this is the zeroth verification substream. Then, this digital signature is to be regarded as the joint signature of the verification substream, the previous (in bitstream order) verification substream and the hash function index as described above. Here, if the verification substream index is equal to k with k>0, the previous verification substream is the verification substream k−1. If the verification substream index is equal to 0, the previous substream is the last previous substream with index 0.

For the TWC-Verification SEI message, one has to differentiate two cases. For the case that the underlying specification allows that SEI-messages can only be sent at the beginning of an access unit (prefix SEIs only), in particular before a VCL NAL unit is sent, the TWC-Verify SEI is also sent before any VCL-NAL unit is sent for the current access unit. This would be the case of the H.264 specification. Moreover, the TWC-Verify SEI indicates that the bytes of the VCL NAL units that belong to the current access unit have to still be used for the on-the-fly computation of the hash value that is to be conducted for all VCL-NAL units belonging to the same chunk as the current VCL-NAL unit according to the corresponding TWC-Selection SEI. Next, the TWC-Verify SEI contains the digital signature which serves for verifying (by invoking the public key) the trustworthiness of the present chunk of VCL-NAL units together with the preceding chunk of VCL-NAL units and, optionally, together with the hash-function index, according to the previously described process and as depicted in FIG. 5 to FIG. 7.

For the case that the underlying specification allows that SEI messages can also be sent within an access unit after VCL-NAL units (suffix SEIs), the TWC-Verify SEI is transmitted as a suffix SEI. This would be the case for the H.265 and H.266 specifications. Then, the TWC-Verify SEI again contains the same type of digital signature as before, applied for all preceding VCL-NAL units belonging to the same chunk as the VCL-NAL unit of the current access unit.

The reason for the proposed differentiation in the positioning of the TWC-Verify SEI is as follows. First, conceptually, it seems to be more appropriate to position the TWC-Verify SEI behind all bytes which are to be used for the computation of the hash value that shall be verified by means of the TWC-Verify SEI: Otherwise, an encoder that generates the trustworthy content has to switch back and forth in the bitstream during encoding, i.e., it has to first finish the computation of the hash value and then switch back to the position of a prefix SEI in order to insert the digital signature of the hash-value (using its private key) to the TWC-Verify SEI. Thus, whenever suffix SEIs are already supported, it seems natural to position the TWC-Verify SEI as a suffix SEI as well. On the other hand, in order to adapt to the general design philosophy of the underlying standard and specification text for enabling a rapid and simple deployment of the proposed technology, if the standard does not already support suffix SEIs, it does not seem reasonable to insert the then completely new mechanism of a suffix SEI for the sake of trustworthiness verification since the security quality of the latter verification procedure, which is the main target of the proposed technology, is not impacted by the question of whether the TWC-Verify SEI is positioned as a prefix or as a suffix SEI.

Features, functionalities and advantages that have been described so far in this section will now be described again in more general terms along with further details and variants. Any of the features, functionalities and advantages described before may optionally be combined with any of the embodiments described in the following individually or in combination. The details and features described in the following may be combined with any of the embodiments described above, e.g. the embodiments described with respect to FIG. 1 to FIG. 8.

For example, the data stream 14 comprises, or is composed of a sequence of packets, e.g., network abstraction layer units, NAL units. The sequence of packets may include packets that carry coded video data, which may be referred to as coded video packets, or, as in the above-mentioned video codecs, coded video layer, CVL, NAL units. Additionally, the sequence of packets may include packets carrying supplemental information messages, e.g., information indicating coding parameters for the decoding process and/or coding options for decoding the data stream. In the above-mentioned video codecs, the latter packets may be referred to as supplemental enhancement information, SEI, messages. In the mentioned video codecs, these messages may be carried in so-called as non-VCL NAL units.

For example, the predetermined portion may include a plurality of coded video packets, and optionally, one or more supplemental information messages or supplemental information packets carrying one or more supplemental information messages.

According to an embodiment, the digital signature 42 is transmitted in a supplemental enhancement information message of the data stream 14, for example, in a supplemental enhancement information message succeeding the predetermined portion 13 in the data stream 14, or being interspersed between the predetermined portion 13 in the data stream.

According to this embodiment, decoding module 63 decodes the digital signature 42 from the supplemental enhancement information message.

According to an embodiment, apparatus 16 locates the predetermined portion 13 within the data stream 14 by use of one or more SEI messages interspersed into data stream 14 and determining the predetermined portion to be a section of the data stream extending between, or extending from, the one or more SEI messages.

Figure 9A:
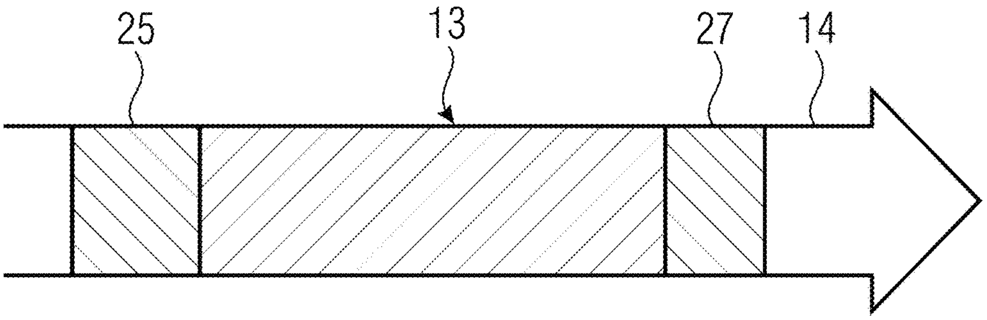
FIG. 9A-C illustrate manners of chunk location according to embodiments.

FIG. 9A illustrates a manner of locating the predetermined portion 13 according to an embodiment. According to this embodiment, apparatus 16 locates the predetermined portion 13 within the data stream by use of a first SEI message 25 and a second SEI message 27 interspersed into data stream. For example, apparatus 26 determines the predetermined portion to be a section of the data stream extending between, or located between, the first and the second SEI messages. In other words, the predetermined portion 13 may be a section of the data stream 14 extending from the first SEI message 25 to the second SEI message 27. Alternatively, the predetermined portion 13 may be a portion of this section, i.e., a contiguous portion, or a composition of multiple sub-portions.

For example, according to the embodiment of FIG. 9A, the first SEI message 25 may be a prefix SEI message and the second SEI message 27 may be a suffix SEI message. For example, a prefix SEI message may be an SEI message preceding a coded video packet, and a suffix SEI message may be an SEI message appended to a coded video packet. In other words, a suffix SEI message may be used for indicating an end of a section of the data stream 14, within which section the predetermined portion 13 is located.

For example, the second SEI message carries the digital signature 43 and/or the first SEI message may carry the indication of the hash function and/or the indication of the public key. For example, the first SEI message may be the initialization SEI message and the second SEI message may be the content verification SEI message described below.

Figure 9B:
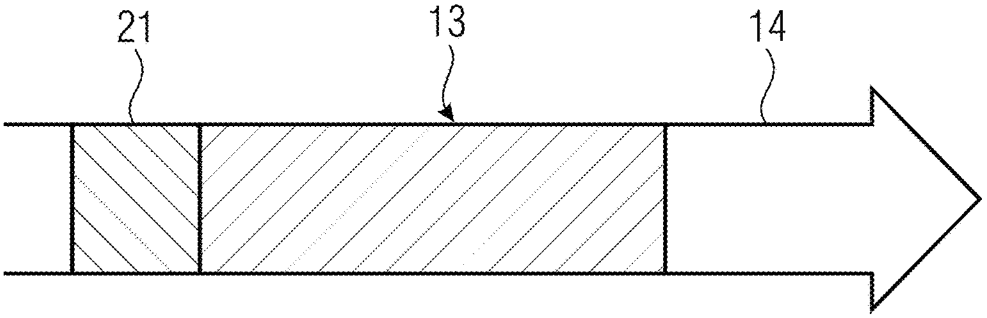

FIG. 9B illustrates another manner of locating the predetermined portion 13 according to an embodiment. According to this embodiment, the predetermined portion 13 is determined using one SEI message 21 as being a portion or section of the data stream 14 extending from the SEI message 21.

For example, according to this embodiment, a section of the data stream 14 in which the predetermined portion 13 is located extends up to an end the data stream 14, or an end of a coded video sequence of the data stream 14. For example, a coded video sequence is an independently decodable section of the data stream. Alternatively, the section ends at another occurrence of the SEI message 21.

Alternatively, the end of the predetermined portion 13 may be determined based on a length of the section.

Figure 9C:
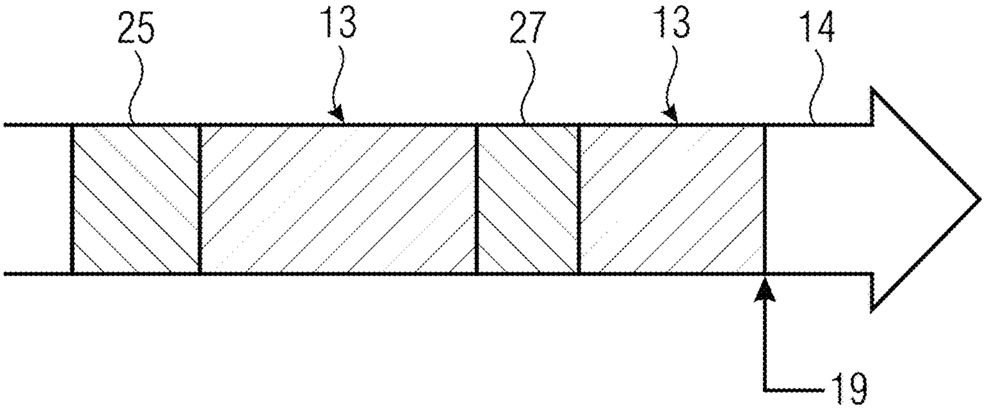

FIG. 9C illustrates another manner of locating the predetermined portion 13 according to an embodiment, which is an alternative to the embodiment of FIG. 9A. According to this embodiment, apparatus 16 locates the predetermined portion 13 within the data stream by use of the first SEI message 25 and the second SEI message 27 interspersed into data stream. According to this embodiment, apparatus 16 may determine the predetermined portion to be a section of the data stream extending between, or located between, the first SEI message 25 and a point 19 in the data stream which is located downstream the second SEI message 23.

In other words, according to this embodiment, the section in which the predetermined portion is located may extend beyond the second SEI message. For example, this embodiment may be used for codecs, which do not envisage suffix SEI messages as explained above.

According to an embodiment, apparatus 16 determines the point 19 in the data stream 14 which is located downstream the second SEI message 23 as being located at an end of video coding layer portion with an access unit of the data stream into which the second SEI message falls. For example, the point 19 is the end of coded video data, or VCL data within the access unit comprising the second SEI message.

For example, the second SEI message carries the digital signature 43 and/or the first SEI message may carry the indication of the hash function and/or the indication of the public key. For example, the first SEI message may be the initialization SEI message and the second SEI message may be the content verification SEI message described below.

In other words, the above-described variants for locating the predetermined portion 13 within the data stream 14 may be used for determining a section of the data stream 14, in which the predetermined portion 13 is located. Optionally, one or more further criteria may be applied for selecting the data to be included into the predetermined portion out of the section indicated by the one or more supplemental information messages.

For example, packets to be included into the predetermined portion may be selected by package type.

A further selection criterion may be the temporal layer to which coded video data belongs. For example, each frame of a video may be associated with one out of one or more temporal layers defined within the data stream. For example, frames of a first temporal layer may be temporally interspersed with frames of a second temporal layer, e.g., such that a substream consisting of the first temporal layer has a lower frame rate than a substream comprising the first and the second temporal layer.

Figure 10A:
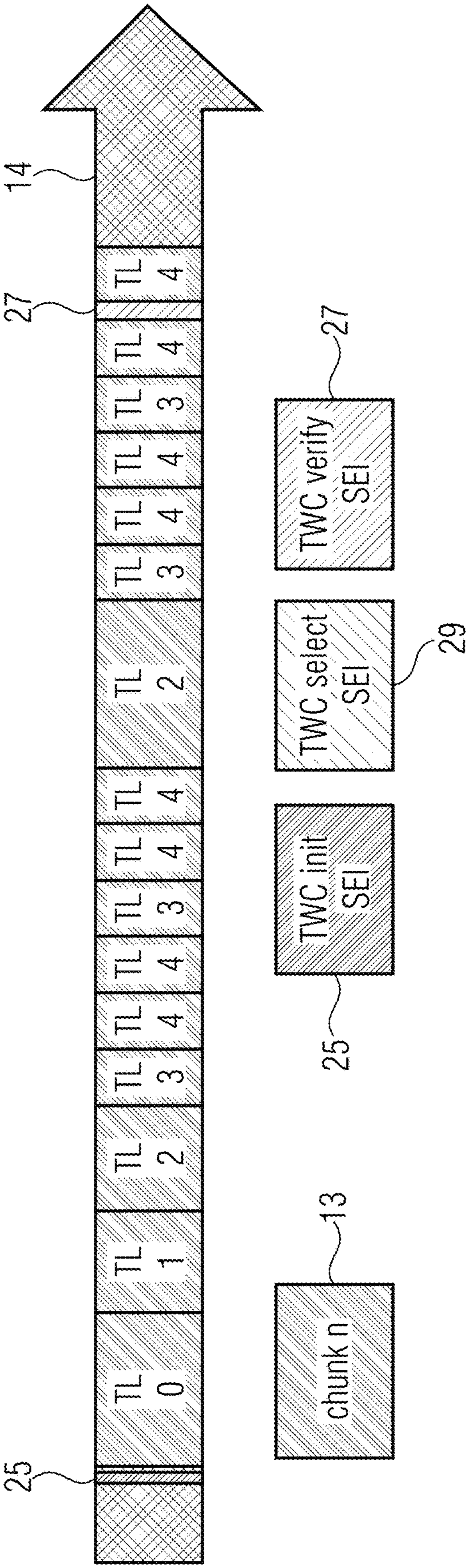
FIG. 10A illustrates a chunk composition packet selection via marker with chunk composition GOP into single chunk, e.g., H.264, according to an embodiment.

FIG. 10A illustrates a composition of the predetermined portion 13 according to an embodiment, in which a group of pictures, GOP, is assigned to the predetermined portion 13. For example, the group of pictures may include multiple pictures, which may be assigned to different temporal layers of the data stream, indicated as TL0 to TL4 in FIG. 10A. According to this embodiment, the check on trustworthiness may be performed jointly for all pictures of the GOP in that the pictures are all part of the predetermined portion, which is subject to the hash function 31. According to the embodiment of FIG. 10A, the predetermined portion 13 may be located as described with respect to FIG. 9C, using the first SEI message 25 and the second SEI message 27, the predetermined portion extending from the first SEI message to a video coding layer end of the access unit, in which the second SEI message is located.

In FIGS. 10A to 12, each of the sections assigned to one of TL0 to TL4 may represent data, e.g. coded video (layer) data, of one access unit or picture unit. For example, the shown SEI messages may belong to the same access unit or picture unit as the subsequent coded video data, except for the second SEI messages 27 in case of FIGS. 10B, 11B, and 12, where the second SEI messages 27 may belong to their preceding access unit or picture unit.

For example, the embodiment of FIG. 10A may be an example of a simple GOP signature as it may be implemented in H.264.

Figure 10B:
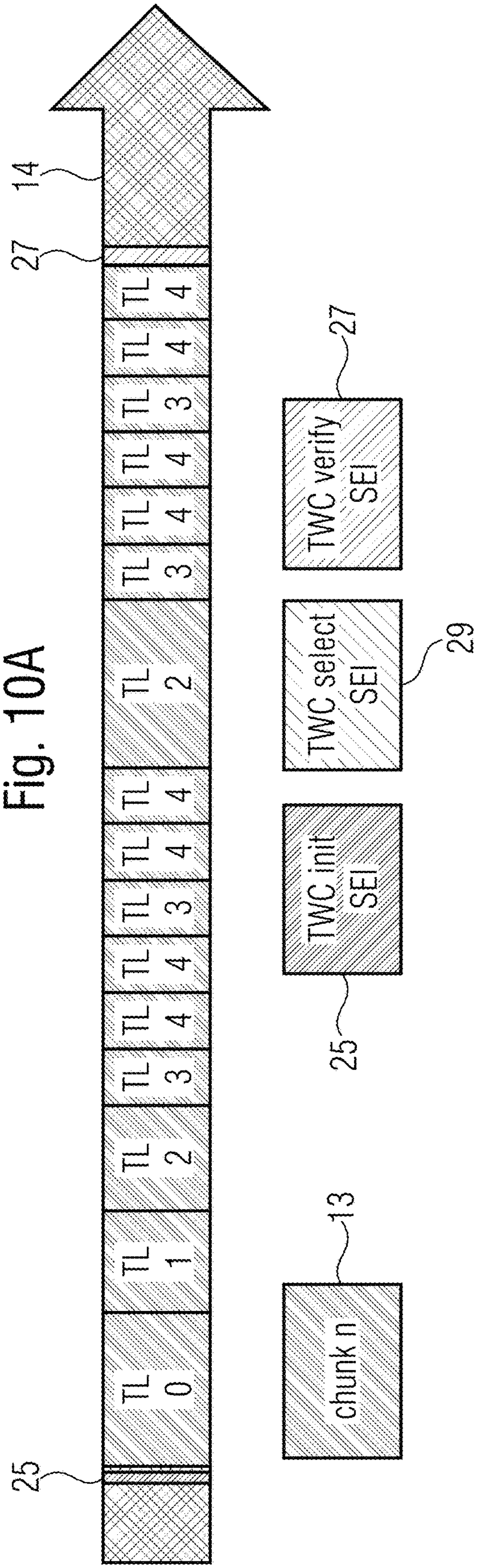
FIG. 10B illustrates a chunk composition packet selection via marker with chunk composition GOP into single chunk, e.g., H.265/H.266, according to an embodiment.

FIG. 10B illustrates an alternative to the embodiment of FIG. 10A in that the predetermined portion 13 ends at the second SEI message 27. According to the embodiment of FIG. 10B, the predetermined portion 13 may be located as described with respect to FIG. 9A. For example, the embodiment of FIG. 10B may be an example of a simple GOP signature as it may be implemented in H.265 or H.266.

In the following, embodiments are described, according to which the check on trustworthiness is performed with respect to one or more substreams of the data stream. These substreams may be referred to as verification substreams. For example, the concept of verification substreams may allow to assign different portions, e.g., packets, out of one section of the data stream, to different verification substreams. For example, the verification substreams may be checked on trustworthiness separately, or independently from each other. However, in examples, there might be a hierarchy defined among the substreams, such that the verification of a substream of lower order may need data, e.g. the hash value, of a higher order substream to be verified. Still, for example, at least a substream of a highest order might be verified independently from other substreams, so that such a substream may still be verifiable after being extracted from the data stream without the further substreams without updating the digital signature. Thus, for example, the definition of the verification substreams may correspond to the definition of independently decodable substreams of the data stream 14.

For example, the verification substreams, e.g., a number or count thereof, may be indicated in an SEI message, e.g., in the first SEI message 25, e.g., the initialization SEI message.

For example, the concept of substreams may be combined with the concept of defining a start and an end of a portion, with respect to which the trustworthiness check may be performed, such as the predetermined portion 13. In other words, the predetermined portion 13, may be a portion of one of the substreams.

Figure 11A:
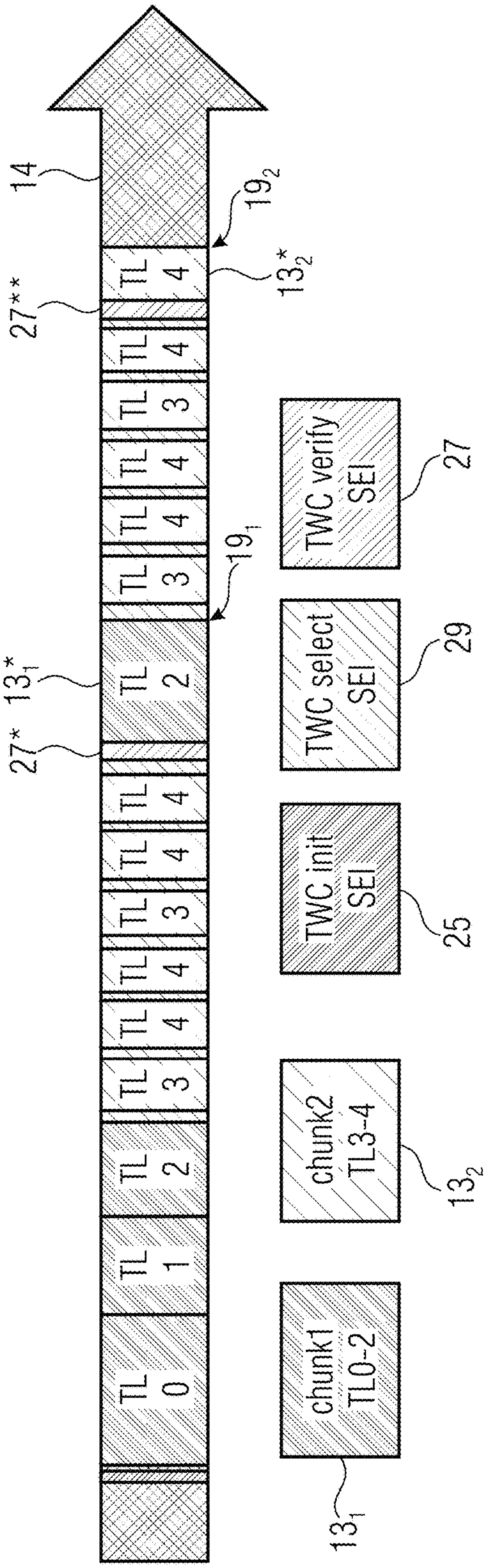
FIG. 11A illustrates a chunk composition packet selection via marker with chunk composition GOP splitting temporal layer into two chunks, e.g., H.264, according to an embodiment.

FIG. 11A illustrates a composition of respective portions for an exemplary number of two substreams according to an embodiment. In particular, in FIG. 11A, a first portion $\mathbf{13}_1$ of the data stream is assigned to a first substream, and a second portion $\mathbf{13}_2$ is assigned to a second substream. In FIG. 11A, the assignment of pictures, or access units, to substreams is done in accordance with temporal layers, assigning access units of temporal layers 0 to 2 to the first portion, and assigning access units of temporal layers 3 to 4 to the second portion. This aspect, however, is to be understood as an example, and other assignments based on temporal layers or based on other criteria may be used. In other words, the separation by temporal layers shall not be understood limiting on the mechanism for signaling the assignment of packets, pictures, access units, or in general, units, of the data stream to substreams.

According to an embodiment, apparatus 16 locates a portion of the data stream 14, see portion $\mathbf{13}_2$ of FIG. 11A, for checking a predetermined one of the substreams, e.g., the second substream in the example of FIG. 11A, on trustworthiness using one or more third SEI messages 29. According to this embodiment, apparatus 16 determines the portion $\mathbf{13}_2$ to be a portion of the data stream 14 formed by subsections of the data stream, or portions of these subsections, following each of the one or more third SEI messages 29 and extending up to a coded video layer end of the access unit, or picture unit, in which the respective third SEI message is located. See, e.g., FIG. 11A, where each of the pictures assigned to the second portion $\mathbf{13}_2$ is preceded by one of the third SEI messages 29.

In other words, for example, the assignment of sections of the data stream to the one or more substreams may be performed at a granularity of picture units or access units.

For example, a picture unit carries the coded video data of one picture and optionally supplemental information for decoding the picture, and an access unit carries one or more picture units belonging to one common time frame, e.g., pictures of different layers, e.g., of base and enhancement layers, and optionally supplemental information for the access unit.

For example, the third SEI message 29 is the TWC select SEI message as described below, with the substream_id having a predetermined value associated with the predetermined substream.

The first substream of FIG. 11A is another example for a mechanism, according to which the portion for checking a further predetermined one of the substream, here portion $\mathbf{13}_1$ for checking the first substream on trustworthiness, may be located. According to an embodiment, apparatus 16 determines the portion of the further predetermined substream by checking, for each of picture units, or access units, within a section of the data stream (e.g., the section is determined as described previously, e.g., FIGS. 9A to 10B) whether the picture unit, or access unit, includes an SEI message of a predetermined type, and if not, the picture unit or access unit, or a portion thereof, is assigned to the portion. If the picture unit or access unit includes an SEI message of the predetermined type, apparatus 16 may check whether the SEI message indicates that the picture unit or access unit belongs to the further predetermined substream. If so, the picture unit or access unit, or a portion thereof, is assigned to the portion, and if not, the picture unit or access unit, or a portion thereof, is not assigned to the portion.

In more general terms, according to an embodiment, apparatus 16 is configured for deriving an overview SEI message from the data stream, the overview SEI message indicating one or more substreams of the data stream with respect to each of which the checking the data stream on trustworthiness is possible based on one or more portions in the respective substream. According to this embodiment, apparatus 16 may perform the checking the data stream on trustworthiness with respect to a subset of one or more substreams of the one or more substreams.

According to an embodiment, apparatus 16 performs the checking on trustworthiness, for a predetermined substream out of the subset of one or more substreams by locating a portion $\mathbf{13}_2$ of the predetermined substream of the data stream by use of one or more third SEI messages 29 interspersed into data stream. According to this embodiment, apparatus 16 determines the portion of the predetermined substream to be a section of the data stream formed by concatenating subsections of the data stream following each of the one or more third SEI messages and extending up to a video coding layer end of an access unit the respective third SEI message is contained in. According to this embodiment, optionally, the apparatus 16 may additionally use a second SEI message 27 (e.g., the second SEI message described above) for locating the portion $\mathbf{13}_2$ by forming the section by additionally concatenating a subsection preceding the second SEI message and extending up to a video coding layer begin of the access unit the second SEI message in contained in, or following the second SEI message and extending up to a video coding layer end of the access unit the second SEI message in contained in.

As already mentioned, for each of the substreams, the checking on trustworthiness may be performed in units of one or more portions, e.g., temporally subsequent portions of the data stream 14. For example, e.g., as in the example of FIG. 11A, the start and the end of the portions of the substreams are determined in the manner described with respect to FIG. 9C or FIG. 10A. See, for example the first second SEI message 27*, e.g., a TWC verification SEI message, signaled ahead of sub-portion $\mathbf{13}_1$*. For example, the first second SEI message 27* may be part of the same access unit or picture unit as sub-portion $\mathbf{13}_1$*. As described, above, the end point 191 of a section of the data stream 14, within which the first portion $\mathbf{13}_1$ is located, may end at a video coding layer end of the access unit or picture unit in which the first second SEI message 27* is located. Similarly, for the second portion $\mathbf{13}_2$, the end point $\mathbf{19}_2$ of a section of the data stream 14, within which the second portion $\mathbf{13}_2$ is located, may end at a video coding layer end of the access unit or picture unit in which the second SEI message 27** is located. For example, the second SEI message 27** may be part of the same access unit or picture unit as sub-portion $\mathbf{13}_2$*.

For example, the embodiment of FIG. 11A may be an example of grouped temporal layer signatures as it may be implemented in H.264.

Figure 11B:
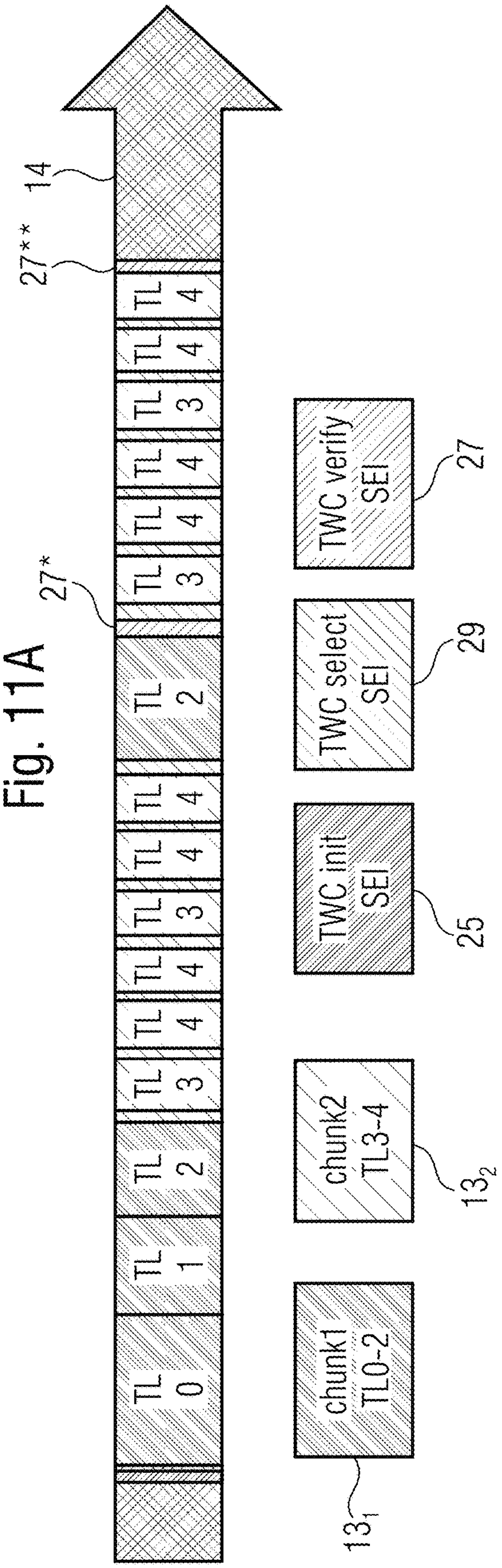
FIG. 11B illustrates a chunk composition packet selection via marker with chunk composition GOP splitting temporal layer into two chunks, e.g., H.265/H.266, according to an embodiment.

FIG. 11B illustrates an alternative to the embodiment of FIG. 11A in that the end of the portions is determined according to the embodiment of FIG. 9A or 10B. For example, a section of the data stream 14, within which the first portion $\mathbf{13}_1$ is located, may end at the first second SEI message 27*, and a section of the data stream 14, within which the second portion $\mathbf{13}_2$ is located, may end at the second SEI message 27**.

For example, the embodiment of FIG. 11B may be an example of grouped temporal layer signatures as it may be implemented in H.265 or H.266.

In the following, an optional concept for verifying trustworthiness across borders of the portions, in units of which the digital signatures are signaled, for the case of multiple verification substreams is presented.

Figure 12:
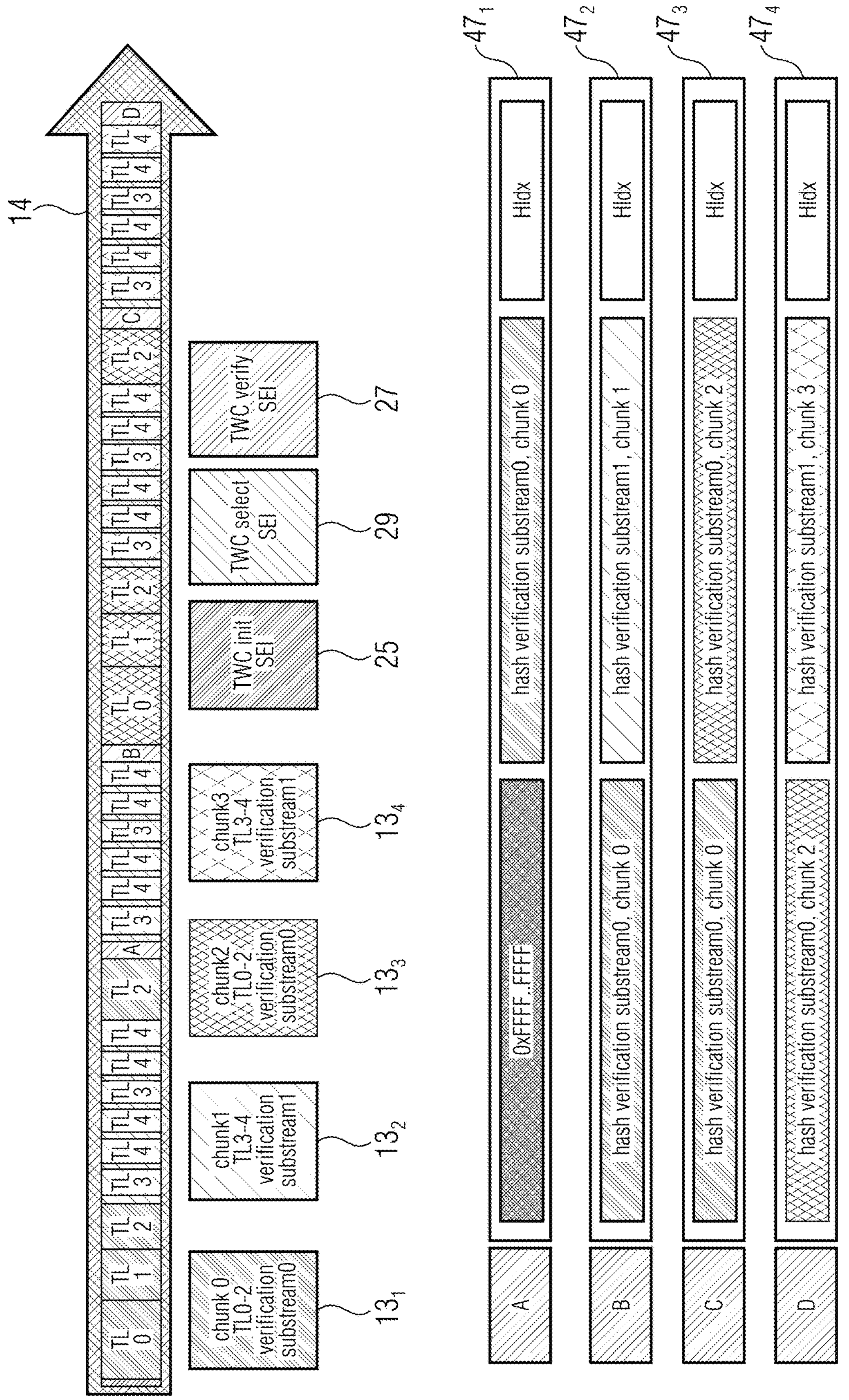
FIG. 12 shows recommended hash dependencies in two layer protection with chunk Composition and bitstream-packets to chunks, and recommended chunk dependencies according to an embodiment.

FIG. 12 illustrates an example of a verification dependency for portions of two substreams. The data stream 14 of FIG. 12 may follow the scheme of FIG. 11B, but shows two subsequent temporal segments. In other words, in FIG. 12 shows, for each of the two substreams, two portions, in units of which the respective substream is checkable on trustworthiness, portions $\mathbf{13}_1$ and $\mathbf{13}_3$ of the first substream, and portions $\mathbf{13}_2$ and $\mathbf{13}_4$ of the second substream, wherein the first portion $\mathbf{13}_1$ and the second portion $\mathbf{13}_2$ belong to a first segment of the data stream 14, which precedes a second segment of the data stream 14, e.g., in transmission order or stream order, to which the third portion $\mathbf{13}_3$ and the fourth portion $\mathbf{13}_4$ belong.

For example, the substreams may have dependencies o defined among them. For example, the second substream may depend on the second substream for verification. For example, the substreams may have an hierarchical order defined among them, where substreams of lower rank in the hierarchical order depend on substreams of higher rank in the hierarchical order.

FIG. 12 further shows check values $\mathbf{47}_1$ to $\mathbf{47}_4$ for the four portions, to which the description of check value 47 described above may optionally apply. For the substream of the highest rank, e.g. the first substream, Verification Substream0 in FIG. 12, cross-border verification may be performed as described above, namely in using the hash value of the preceding portion, i.e. the portion of the same substream, which portion belongs to the preceding segment, for verification. See, e.g., the third portion $\mathbf{13}_3$, for which the hash value of the first portion $\mathbf{13}_1$ is included in the check value 473.

The check value $\mathbf{47}_1$ for the first portion $\mathbf{13}_1$ may include a default value instead of the hash value of the previous segment, e.g., as described above, as no previous segment is available.

For the second substream, which depends on the first substream, instead of using the hash value of the previous portion of the same substream, the hash value of the first substream, e.g., of the same segment of the data stream, may be included in the check value, see check values $\mathbf{47}_2$ and 47 4 for the second portion $\mathbf{13}_2$ and the fourth portion $\mathbf{13}_4$.

The scheme explained with respect to FIG. 12 allows the first substream to be verified independently of the second substream, e.g., after having extracted the first stream from data stream 14 without the second substream, or dropping the second substream from data stream 14. Furthermore, for the second substream it can be verified that the first substream, on which it depends, was not manipulated.

In the following, syntax and semantics according to an embodiment are described. The syntax and semantics described in the following may optionally be amended or extended according to any of the previously described embodiments. The previously described embodiments may be combined with any of the details and features of the syntax and semantics described in the following.

Trustworthy Content Initialization SEI Message

Trustworthy Content Initialization SEI Message Syntax

| | Descriptor |
|---|---|
| trustworthy_content_initialization( payloadSize ) { | |
| twci_hash_method_type | u(8) |
| twci_num_verification_substreams_minus1 | ue(v) |
| twci_use_key_register_idx_flag | u(1) |
| twci_key_source_uri | st(v) |
| if( twci_use_key_register_idx_flag ) | |
| twci_key_register_idx | ue(v) |
| } | |

Trustworthy Content Initialization SEI Message Semantics

The trustworthy content initialization SEI message, trustworthy content selection SEI message, and trustworthy content verification SEI message provide a mechanism for verifying that the coded video has been produced by a trustworthy content provider. The trustworthy content initialization SEI message provides information about the secure hash algorithm used for calculating message digests, which are used together with the digital signature present in trustworthy content verification SEI messages to verify the trustworthiness of the VCL NAL units present in the coded video sequence. It further provides information about the digital signature algorithm used and the public key of the content provider.

If any trustworthy content initialization SEI message, trustworthy content selection SEI message, or trustworthy content verification SEI message is present in a coded video sequence, it is a requirement of bitstream conformance that a trustworthy content initialization SEI message is present in the IDR access unit and all access units of the coded video sequence that contain a CRA picture. It is a requirement of bitstream conformance that any trustworthy content selection and trustworthy content verification SEI message in an access unit is preceded by a trustworthy content initialization SEI message.

The trustworthy content initialization SEI message applies to the current coded picture and all following coded pictures until one or more of the following conditions are true:

The bitstream ends.

A new coded video sequence begins.

A new trustworthy content initialization SEI message is received.

twci_hash_method_type indicates the secure hash algorithm that is used to calculate message digests for subsets of VCL NAL units of the coded video sequence. Based on these message digests and the digital signatures present in trustworthy content verification SEI messages, a decoder can verify that the coded video was produced by the content originator indicated by the syntax elements twci_use_key_register_idx_flag, twci_key_source_uri, and, if twci_key_register_idx flag is equal to 1, twci_key_register_idx. The supported values for the syntax element twci_ hash_ method_type, the block size used for calculating the message digest, and the size of the calculated message digests are specified in Table 1. Values of twci_hash_method_type that are not listed in the table are reserved for future use by ITU-T|ISO/IEC and shall not be present in payload data conforming to this version of this Specification. Decoders shall ignore trustworthy initialization SEI messages that contain reserved values for twci_hash_method_type. The secure hash algorithms listed in Table 1 are specified in the "Secure Hash Standard" FIPS PUB 180-4.

TABLE 1

Supported values of twci_has_method_type

| twci_hash_method_type | Hash method | Block size (bits) | Message digest size (bits) |
|---|---|---|---|
| 0 | SHA-1 | 512 | 160 |
| 1 | SHA-224 | 512 | 224 |
| 2 | SHA-256 | 512 | 256 |
| 3 | SHA-384 | 1024 | 384 |
| 4 | SHA-512 | 1024 | 512 |
| 5 | SHA-512/224 | 1024 | 224 |
| 6 | SHA-512/256 | 1024 | 256 |

twci_num_verification_substreams_minus1 plus 1 indicates the number of substreams for which message digests are calculated and signatures may be present in following trustworthy content verification SEI messages.

The Variable NumVerificationSubstream is Derived as:

$$NumVerificationSubstream = \text{twci\_num\_verification\_substreams\_minus1} + 1.$$

twci_use_key_register_idx_flag equal to 1 indicates that the URI contained in twci_key_source_uri specifies a register of certificates and the syntax element twci_key_ register_idx is present in the SEI message. twci_use_key_register_idx_flag equal to 0 indicates that the URI contained in twci_key_source_uri specifies a certificate and the syntax element twci_key_register_idx is not present in the SEI message.

twci_key_source_uri contain a URI with syntax and semantics as specified in IETF Internet Standard 66. If twci_use_key_register_idx_flag is equal to 0, the URI identifies the certificate of the content provider that can be used for verifying the signatures present in following trustworthy verification SEI messages; otherwise (if twci_use_key_register_idx_flag is equal to 1), the URI identifies a register of certificates and the certificate of the content provider that can be used for verifying the signatures present in following trustworthy verification SEI messages is indicated by twci_key_ register_idx.

twci_key_register_idx contains an index that specifies the certificate of the content provider, in the certificate register indicated by twci_key_source_uri, which can be used for verifying the signatures present in following trustworthy verification SEI messages.

The certificate indicated by the syntax elements twci_use_key_register_idx_flag, twci_key_source_uri, and, if twci_use_key_register_idx_flag is equal to 1, twci_key_ register_idx shall specify a digital signature method, with associated parameters (if applicable), and the public key of the content provider. The format in which this information is provided is outside the scope of this specification. It is suggested that a digital signature algorithm conforming to the "Digital Signature Standard" FIPS 186-5 is used.

When a trustworthy content initialization SEI message is received, the calculation of NumVerificationSubstream message digests is initialized according to the specification in FIPS PUB 180-4 for the specified twci_hash_method_type. Each VCL NAL unit following the trustworthy content initialization SEI message is associated to one of the NumVerificationSubstream message digests; the verification substream id is either indicated by the trustworthy content selection SEI message or, if no trustworthy content selection SEI message is present for a coded picture, inferred to be equal to 0. The message used for calculating the k-th message digest, with k being in the range from 0 to twci_num_verification_substreams_minus1, inclusive, is obtained by concatenating all VCL NAL units associated with the k-th verification substream. The calculation of the message digests is conducted based on blocks, where the block size is specified in Table 1 depending on the value of twci_hash_method_type. For each VCL NAL unit, the associated message digest is updated according to the algorithm specified in FIPS PUB 180-4 for the specified twci_hash_method_type. Note that, since the message digests are calculated for the concatenation of all VCL NAL units for a verification substream, some of the processing blocks typically span over two or more successive VCL NAL units.

Trustworthy Content Selection SEI Message

Trustworthy Content Selection SEI Message Syntax

| | Descriptor |
|---|---|
| trustworthy_content_selection( payloadSize ) { | |
| twcs_verification_substream_id | ue(v) |
| } | |

Trustworthy Content Selection SEI Message Semantics

The trustworthy content selection SEI message provides a mechanism for associating coded pictures with one of the verification substreams indicated in a trustworthy content initialization SEI message.

It is a requirement of bitstream conformance that any trustworthy content selection SEI message is preceded by a trustworthy content initialization SEI message in the same coded video sequence.

twcs_verification_substream_id indicates the verification substream to which the VCL NAL units of the current coded picture are assigned to. When a trustworthy content initialization SEI message was present in the current coded video sequence, but no trustworthy content selection SEI message is present for a coded picture, the value of twcs_verification_substream_id is inferred to be equal to 0. The value of twcs_verification_substream_id shall be in the range from 0 to twci_num_verification_substreams_minus1, inclusive.

As specified in section 1.1.2, the message digest for the verification substream with id equal to twcs_verification_ substream_id is updated with the VCL NAL units of the current coded picture according to the twci_hash_method_ type specified in the preceding trustworthy content initialization SEI message.

Trustworthy Content Verification SEI Message

Trustworthy Content Verification SEI Message Syntax

| | Descriptor |
|---|---|
| trustworthy_content_verification( payloadSize ) { | |
| twcv_signature_length_in_octets_minus1 | ue(v) |
| twcv_signature | u(v) |
| } | |

Trustworthy Content Verification SEI Message Semantics

The trustworthy content verification SEI message provides a mechanism for verifying the trustworthiness of video content.

It is a requirement of bitstream conformance that any trustworthy content verification SEI message is preceded by a trustworthy content initialization SEI message in the same coded video sequence.

When the coded video sequence includes a trustworthy content initialization SEI message, it is a requirement of bitstream conformance that the last coded picture of a verification substream in the coded video sequence is associated with a trustworthy content verification SEI message.

twcv_signature_length_in_octets_minus1 plus 1 specifies the length of the syntax element twcv_signature in octets (one octet consists of 8 bits).

twcv_signature contains the digital signature for the verification substream indicated by twcs_verification_substream_id, which is either transmitted in a trustworthy content selection SEI message preceding the trustworthy content verification SEI message in the same access unit or inferred to be equal to 0.

Figure 13:
FIG. 13 shows a possible construction of identification string IdString according to an embodiment.

With VerificationSubstreamId being the value of twcs_verification_substream_id associated with the trustworthy content verification SEI message, the verification consists of the following ordered steps:

1. The calculation of the message digest referred to as CurrDigest is finalized as follows:
   The concatenation of the VCL NAL units for the verification substream with id equal to VerificationSubstreamId is padded according to the specification in FIPS PUB 180-4. Note that it is sufficient to pad the last VCL NAL unit of the verification substream.
   The calculation of the message digest CurrDigest is finalized according to the specification in FIPS PUB 180-4. The length (in bits) of the message digest is given in Table 1.
2. The reference message digest RefDigest is determined as follows:
   If VerificationSubstreamId is greater than 0, the reference message digest RefDigest is the last calculated message digest for the verification substream with id equal to VerificationSubstreamId−1. It is a requirement of bitstream conformance that any trustworthy content verification SEI associated with verification substream id equal to VerificationSubstreamId−1 is present before the trustworthy content verification SEI message with verification substream id equal to VerificationSubstreamId.
   Otherwise, if the current trustworthy content verification SEI message is the first trustworthy content verification SEI with verification id equal to 0 in the coded video sequence and the preceding coded video sequence did not contain any trustworthy content initialization SEI message (this includes the case that the current coded video sequence is the first coded video sequence in the bitstream), the RefDigest is set equal to a bitstring that consists of DigestSize bits equal to 1, where DigestSize is the size of the message digest as specified in Table 1.
   Otherwise, the reference message digest RefDigest is the last calculated message digest for the verification substream with id equal to 0.
3. The identification string IdString is constructed by concatenating the binary representations of the reference message digest RefDigest, the current message digest, and the twci_hash_method_type, as illustrated in FIG. 13.
   The number of bits for RefDigest is determined by the value of twci_hash_method_type which was valid when calculating the value of RefDigest, the number of bits for CurrDigest is determined by the current value of twci_hash_method_type, and the value of twci_hash_method_type is represented with 8 bits
4. The identification string IdString represents the message used for verifying the signature. The signature verification algorithm and the public key used for verifying the signature are indicated by the syntax elements twci_use_key_register_idx_flag, twci_key_source_uri, and, if twci_use_key_register_idx_flag is equal to 1, twci_key_register_idx.

NOTE 1—Since the bitstring used for signature verification includes the RefDigest, it cannot only be verified that the VCL NAL units used for calculated the current message digest are correct, but it can additionally be verified that neither additional VCL NAL units were added to the bitstream nor VCL NAL units were removed from the bitstream.

NOTE 2—When a decoder tunes into a bitstream, the IdString constructed for the first trustworthy content verification SEI message cannot be verified, because the value of RefDigest cannot be calculated correctly. But starting from the second trustworthy content verification SEI message, the signatures can be verified.

After verification, the message digest for the verification substream with id equal to VerificationSubstreamId is reinitialized according to the specification in FIPS PUB 180-4 for the specified twci_hash_method_type.

Video Coding Schemes

In the following, embodiments of video coding schemes are described, which are examples of video codecs that may be used in combination with which the above-described scheme for a trustworthiness check. In other words, apparatus 15 may be a video encoder, e.g., encoder 10 described below, and apparatus 16 may be a video decoder, e.g., decoder 20 described below.

The coding codec used for coding the video into the video data stream may be anyone of the above-mentioned ones, e.g., H.264, H.265 or H.266, but may generally any kind of video codec. Embodiments for such codec are now presented. Here, it is block-based predictive coding with block-based transform coding, but, as said, it may also be a different one.

Figure 14:
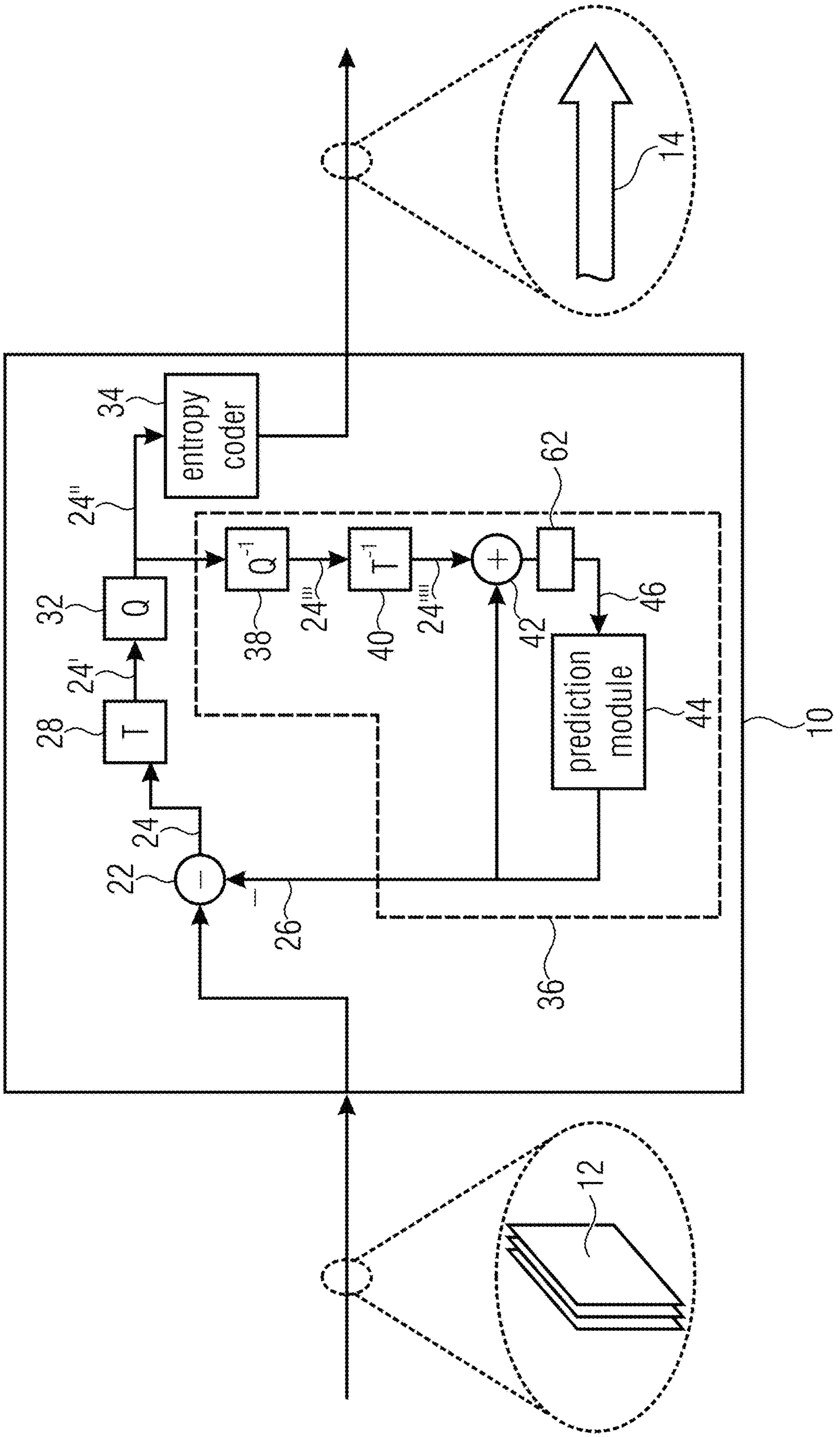
FIG. 14 shows an apparatus for predictively coding a picture into a data stream exemplarily using transform-based residual coding according to an embodiment.
Figure 15:
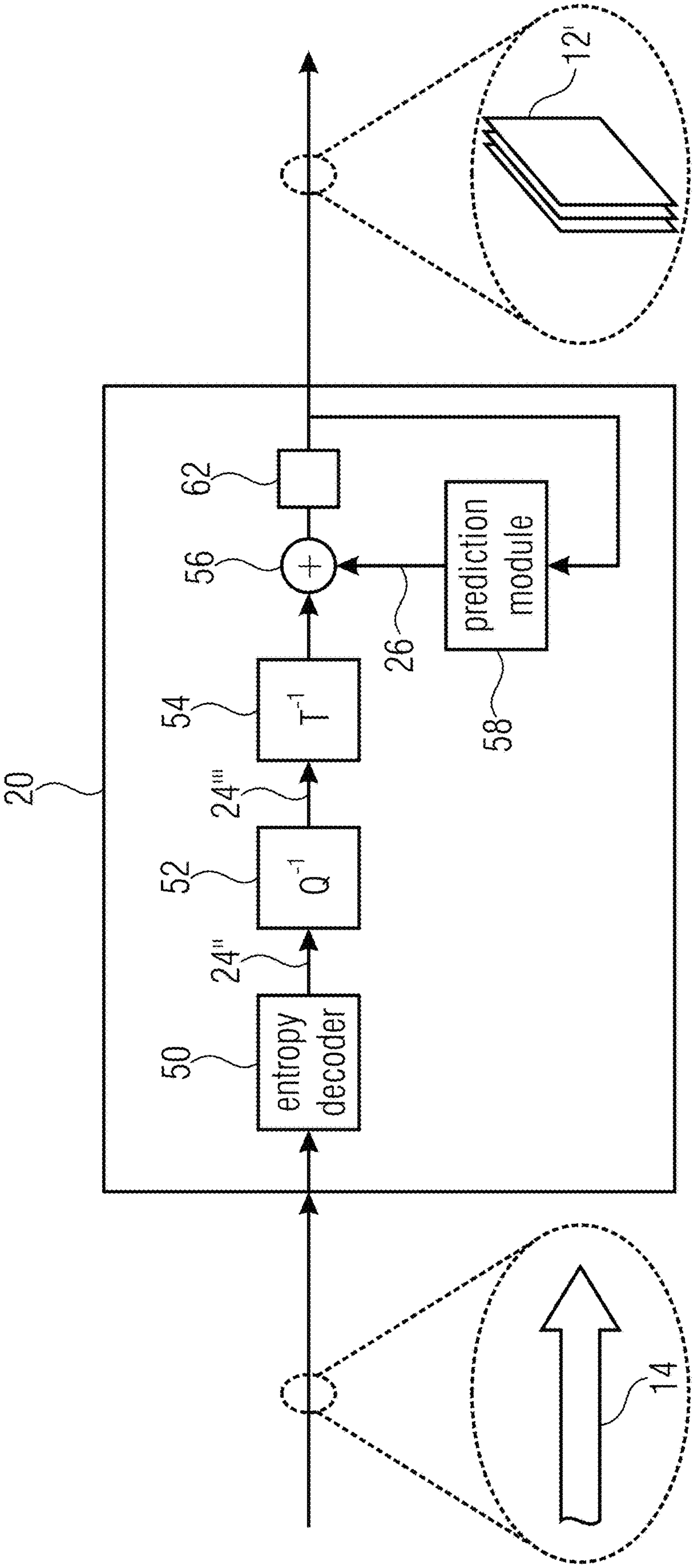
FIG. 15 shows a corresponding decoder configured to predictively decode the picture from the data stream also using transform-based residual decoding according to an embodiment.

FIG. 14 shows an apparatus for predictively coding a picture 12 into a data stream 14 exemplarily using transform-based residual coding. The apparatus, or encoder, is indicated using reference sign 10. FIG. 15 shows a corresponding decoder 20, i.e. an apparatus 20 configured to predictively decode the picture 12' from the data stream 14 also using transform-based residual decoding, wherein the apostrophe has been used to indicate that the picture 12' as reconstructed by the decoder 20 deviates from picture 12 originally encoded by apparatus 10 in terms of coding loss introduced by a quantization of the prediction residual signal.

The encoder 10 is configured to subject the prediction residual signal to spatial-to-spectral transformation and to encode the prediction residual signal, thus obtained, into the data stream 14. Likewise, the decoder 20 is configured to decode the prediction residual signal from the data stream 14 and subject the prediction residual signal thus obtained to spectral-to-spatial transformation.

Internally, the encoder 10 may comprise a prediction residual signal former 22 which generates a prediction residual 24 so as to measure a deviation of a prediction signal 26 from the original signal, i.e. from the picture 12. The prediction residual signal former 22 may, for instance, be a subtractor which subtracts the prediction signal from the original signal, i.e. from the picture 12. The encoder 10 then further comprises a transformer 28 which subjects the prediction residual signal 24 to a spatial-to-spectral transformation to obtain a spectral-domain prediction residual signal 24' which is then subject to quantization by a quantizer 32, also comprised by the encoder 10. The thus quantized prediction residual signal 24" is coded into bitstream 14. To this end, encoder 10 may optionally comprise an entropy coder 34 which entropy codes the prediction residual signal as transformed and quantized into data stream 14. The prediction signal 26 is generated by a prediction stage 36 of encoder 10 on the basis of the prediction residual signal 24" encoded into, and decodable from, data stream 14. To this end, the prediction stage 36 may internally, as is shown in FIG. 14, comprise a dequantizer 38 which dequantizes prediction residual signal 24" so as to gain spectral-domain prediction residual signal 24", which corresponds to signal 24' except for quantization loss, followed by an inverse transformer 40 which subjects the latter prediction residual signal 24" to an inverse transformation, i.e. a spectral-to-spatial transformation, to obtain prediction residual signal 24", which corresponds to the original prediction residual signal 24 except for quantization loss. A combiner 42 of the prediction stage 36 then recombines, such as by addition, the prediction signal 26 and the prediction residual signal 24"' so as to obtain a reconstructed signal 46, i.e. a reconstruction of the original signal 12. Reconstructed signal 46 may correspond to signal 12'. A prediction module 44 of prediction stage 36 then generates the prediction signal 26 on the basis of signal 46 by using, for instance, spatial prediction, i.e. intra-picture prediction, and/or temporal prediction, i.e. inter-picture prediction.

Likewise, decoder 20, as shown in FIG. 15, may be internally composed of components corresponding to, and interconnected in a manner corresponding to, prediction stage 36. In particular, entropy decoder 50 of decoder 20 may entropy decode the quantized spectral-domain prediction residual signal 24" from the data stream, whereupon dequantizer 52, inverse transformer 54, combiner 56 and prediction module 58, interconnected and cooperating in the manner described above with respect to the modules of prediction stage 36, recover the reconstructed signal on the basis of prediction residual signal 24" so that, as shown in FIG. 15, the output of combiner 56 results in the reconstructed signal, namely picture 12'.

Although not specifically described above, it is readily clear that the encoder 10 may set some coding parameters including, for instance, prediction modes, motion parameters and the like, according to some optimization scheme such as, for instance, in a manner optimizing some rate and distortion related criterion, i.e. coding cost. For example, encoder 10 and decoder 20 and the corresponding modules 44, 58, respectively, may support different prediction modes such as intra-coding modes and inter-coding modes. The granularity at which encoder and decoder switch between these prediction mode types may correspond to a subdivision of picture 12 and 12', respectively, into coding segments or coding blocks. In units of these coding segments, for instance, the picture may be subdivided into blocks being intra-coded and blocks being inter-coded. Intra-coded blocks are predicted on the basis of a spatial, already coded/decoded neighborhood of the respective block as is outlined in more detail below. Several intra-coding modes may exist and be selected for a respective intra-coded segment including directional or angular intra-coding modes according to which the respective segment is filled by extrapolating the sample values of the neighborhood along a certain direction which is specific for the respective directional intra-coding mode, into the respective intra-coded segment. The intra-coding modes may, for instance, also comprise one or more further modes such as a DC coding mode, according to which the prediction for the respective intra-coded block assigns a DC value to all samples within the respective intra-coded segment, and/or a planar intra-coding mode according to which the prediction of the respective block is approximated or determined to be a spatial distribution of sample values described by a two-dimensional linear function over the sample positions of the respective intra-coded block with driving tilt and offset of the plane defined by the two-dimensional linear function on the basis of the neighboring samples. Compared thereto, inter-coded blocks may be predicted, for instance, temporally. For inter-coded blocks, motion vectors may be signaled within the data stream, the motion vectors indicating the spatial displacement of the portion of a previously coded picture of the video to which picture 12 belongs, at which the previously coded/decoded picture is sampled in order to obtain the prediction signal for the respective inter-coded block. This means, in addition to the residual signal coding comprised by data stream 14, such as the entropy-coded transform coefficient levels representing the quantized spectral-domain prediction residual signal 24", data stream 14 may have encoded thereinto coding mode parameters for assigning the coding modes to the various blocks, prediction parameters for some of the blocks, such as motion parameters for inter-coded segments, and optional further parameters such as parameters for controlling and signaling the subdivision of picture 12 and 12', respectively, into the segments. The decoder 20 uses these parameters to subdivide the picture in the same manner as the encoder did, to assign the same prediction modes to the segments, and to perform the same prediction to result in the same prediction signal.

Figure 16:
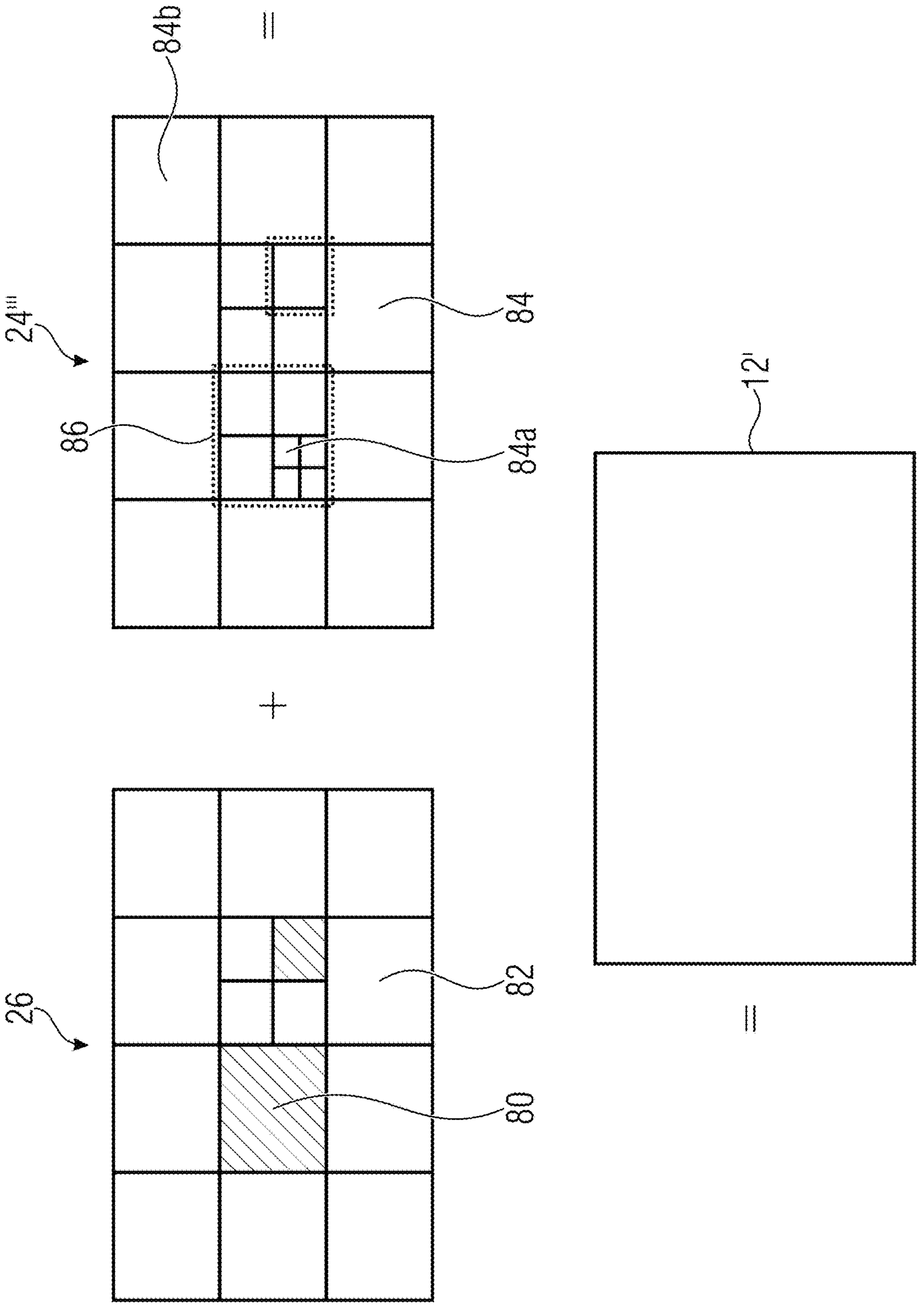
FIG. 16 illustrates the relationship between the reconstructed signal, on the one hand, and the combination of the prediction residual signal as signaled in the data stream, and the prediction signal, on the other hand, according to an embodiment.

FIG. 16 illustrates the relationship between the reconstructed signal, i.e. the reconstructed picture 12', on the one hand, and the combination of the prediction residual signal 24" as signaled in the data stream 14, and the prediction signal 26, on the other hand. As already denoted above, the combination may be an addition. The prediction signal 26 is illustrated in FIG. 16 as a subdivision of the picture area into intra-coded blocks which are illustratively indicated using hatching, and inter-coded blocks which are illustratively indicated not-hatched. The subdivision may be any subdivision, such as a regular subdivision of the picture area into rows and columns of square blocks or non-square blocks, or a multi-tree subdivision of picture 12 from a tree root block into a plurality of leaf blocks of varying size, such as a quadtree subdivision or the like, wherein a mixture thereof is illustrated in FIG. 16 in which the picture area is first subdivided into rows and columns of tree root blocks which are then further subdivided in accordance with a recursive multi-tree subdivisioning into one or more leaf blocks.

Again, data stream 14 may have an intra-coding mode coded thereinto for intra-coded blocks 80, which assigns one of several supported intra-coding modes to the respective intra-coded block 80. For inter-coded blocks 82, the data stream 14 may have one or more motion parameters coded thereinto. Generally speaking, inter-coded blocks 82 are not restricted to being temporally coded. Alternatively, inter-coded blocks 82 may be any block predicted from previously coded portions beyond the current picture 12 itself, such as previously coded pictures of a video to which picture 12 belongs, or picture of another view or an hierarchically lower layer in the case of encoder and decoder being scalable encoders and decoders, respectively.

The prediction residual signal 24" in FIG. 16 is also illustrated as a subdivision of the picture area into blocks 84. These blocks might be called transform blocks in order to distinguish same from the coding blocks 80 and 82. In effect, FIG. 16 illustrates that encoder 10 and decoder 20 may use two different subdivisions of picture 12 and picture 12', respectively, into blocks, namely one subdivisioning into coding blocks 80 and 82, respectively, and another subdivision into transform blocks 84. Both subdivisions might be the same, i.e. each coding block 80 and 82, may concurrently form a transform block 84, but FIG. 16 illustrates the case where, for instance, a subdivision into transform blocks 84 forms an extension of the subdivision into coding blocks 80, 82 so that any border between two blocks of blocks 80 and 82 overlays a border between two blocks 84, or alternatively speaking each block 80, 82 either coincides with one of the transform blocks 84 or coincides with a cluster of transform blocks 84. However, the subdivisions may also be determined or selected independent from each other so that transform blocks 84 could alternatively cross block borders between blocks 80, 82. As far as the subdivision into transform blocks 84 is concerned, similar statements are thus true as those brought forward with respect to the subdivision into blocks 80, 82, i.e. the blocks 84 may be the result of a regular subdivision of picture area into blocks (with or without arrangement into rows and columns), the result of a recursive multi-tree subdivisioning of the picture area, or a combination thereof or any other sort of blockation. Just as an aside, it is noted that blocks 80, 82 and 84 are not restricted to being of quadratic, rectangular or any other shape.

FIG. 16 further illustrates that the combination of the prediction signal 26 and the prediction residual signal 24" directly results in the reconstructed signal 12'. However, it should be noted that more than one prediction signal 26 may be combined with the prediction residual signal 24" to result into picture 12' in accordance with alternative embodiments.

In FIG. 16, the transform blocks 84 shall have the following significance. Transformer 28 and inverse transformer 54 perform their transformations in units of these transform blocks 84. For instance, many codecs use some sort of DST or DCT for all transform blocks 84. Some codecs allow for skipping the transformation so that, for some of the transform blocks 84, the prediction residual signal is coded in the spatial domain directly. However, in accordance with embodiments described below, encoder 10 and decoder 20 are configured in such a manner that they support several transforms. For example, the transforms supported by encoder 10 and decoder 20 could comprise:

DCT-II (or DCT-III), where DCT stands for Discrete Cosine Transform

DST-IV, where DST stands for Discrete Sine Transform

DCT-IV

DST-VII

Identity Transformation (IT)

Naturally, while transformer 28 would support all of the forward transform versions of these transforms, the decoder 20 or inverse transformer 54 would support the corresponding backward or inverse versions thereof:

Inverse DCT-II (or inverse DCT-III)

Inverse DST-IV

Inverse DCT-IV

Inverse DST-VII

Identity Transformation (IT)

Different examples for coding residual blocks and their transform blocks, respectively, which represent the spatial residual blocks in transform domain, are presented below. The codec may support merely one of them, but it may also be that the video data stream contains entropy coding mode indicator indicating whether a prediction residual data of a residual block is to be decoded from the video data stream using a context adaptive variable length coding mode, or using a context adaptive binary arithmetic coding mode with examples of these modes being derivable from the subsequent description.

Context-Based Adaptive Variable Length Coding (CAVLC)

This is the method used to encode residual, zig-zag ordered 4×4 (and 2×2) blocks of transform coefficients. CAVLC is designed to take advantage of several characteristics of quantized 4×4 blocks:

1. After prediction, transformation and quantization, blocks are typically sparse (containing mostly zeros). CAVLC uses run-level coding to compactly represent strings of zeros.
2. The highest non-zero coefficients after the zig-zag scan are often sequences of +/−1. CAVLC signals the number of high-frequency+/−1 coefficients ("Trailing 1s" or "T1s") in a compact way.
3. The number of non-zero coefficients in neighbouring blocks is correlated. The number of coefficients is encoded using a look-up table; the choice of look-up table depends on the number of non-zero coefficients in neighbouring blocks.
4. The level (magnitude) of non-zero coefficients tends to be higher at the start of the reordered array (near the DC coefficient) and lower towards the higher frequencies. CAVLC takes advantage of this by adapting the choice of VLC look-up table for the "level" parameter depending on recently-coded level magnitudes.

CAVLC encoding of a block of transform coefficients proceeds as follows.

1. Code the Number of Coefficients and Trailing Ones (Coeff_Token).

The first VLC, coeff_token, encodes both the total number of non-zero coefficients (TotalCoeffs) and the number of trailing+/−1 values (T1). TotalCoeffs can be anything from 0 (no coefficients in the 4×4 block) 1 to 16 (16 non-zero coefficients). T1 can be anything from 0 to 3; if there are more than 3 trailing+/−1s, only the last 3 are treated as "special cases" and any others are coded as normal coefficients. Note: coded_block_pattern (described earlier) indicates which 8×8 blocks in the macroblock contain nonzero coefficients; however, within a coded 8×8 block, there may be 4×4 sub-blocks that do not contain any coefficients, hence TotalCoeff may be 0 in any 4×4 sub-block. In fact, this value of TotalCoeff occurs most often and is assigned the shortest VLC.

There are 4 choices of look-up table to use for encoding coeff_token, described as Num-VLC0, Num-VLC1, Num- VLC2 and Num-FLC (3 variable-length code tables and a fixed-length code). The choice of table depends on the number of non-zero coefficients in upper and left-hand previously coded blocks Nu and NL. A parameter N is calculated as follows: If blocks U and L are available (i.e. in the same coded slice), N=(Nu+NL)/2 If only block U is available, N=NU; if only block L is available, N-NL; if neither is available, N=0.

N selects the look-up table (Table 34) and in this way the choice of VLC adapts depending on the number of coded coefficients in neighbouring blocks (context adaptive). Num-VLC0 is "biased" towards small numbers of coefficients; low values of TotalCoeffs (0 and 1) are assigned particularly short codes and high values of TotalCoeff particularly long codes. Num-VLC1 is biased towards medium numbers of coefficients (TotalCoeff values around 2-4 are assigned relatively short codes), Num-VLC2 is biased towards higher numbers of coefficients and FLC assigns a fixed 6-bit code to every value of TotalCoeff.

TABLE 34

Choice of lookup table for coeff_token

| N | Table for coeff_token |
|---|---|
| 0, 1 | Num-VLC0 |
| 2, 3 | Num-VLC1 |
| 4, 5, 6, 7 | Num-VLC2 |
| 8 or above | FLC |

2. Code the Sign of Each T1.

For each T1 (trailing+/−1) signalled by coeff_token, a single bit encodes the sign (0=+, 1=−). These are encoded in reverse order, starting with the highest-frequency T1.

3. Code the Levels of the Remaining Non-Zero Coefficients.

The level (sign and magnitude) of each remaining non-zero coefficient in the block is encoded in reverse order, starting with the highest frequency and working back towards the DC coefficient. The choice of VLC table to encode each level adapts depending on the magnitude of each successive coded level (context adaptive). There are 7 VLC tables to choose from, Level_VLC0 to Level_VLC6. Level_VLC0 is biased towards lower magnitudes; Level_VLC1 is biased towards slightly higher magnitudes and so on. The choice of table is adapted in the following way:

(a) Initialise the table to Level_VLC0 (unless there are more than 10 non-zero coefficients and less than 3 trailing ones, in which case start with Level_VLC1).

(b) Encode the highest-frequency non zero coefficient.

(c) If the magnitude of this coefficient is larger than a pre-defined threshold, move up to the next VLC table.

In this way, the choice of level is matched to the magnitude of the recently-encoded coefficients. The thresholds are listed in Table 35; the first threshold is zero which means that the table is incremented after the first coefficient level has been encoded.

TABLE 35

Thresholds for determining whether to increment level table number

| Current VLC Table | Threshold to increment table |
|---|---|
| VLC0 | 0 |
| VLC1 | 3 |
| VLC2 | 6 |
| VLC3 | 12 |

TABLE 35-continued

Thresholds for determining whether to increment level table number

| Current VLC Table | Threshold to increment table |
|---|---|
| VLC4 | 24 |
| VLC5 | 48 |
| VLC6 | N/A (highest table) |

4. Code the Total Number of Zeros Before the Last Coefficient.

TotalZeros is the sum of all zeros preceding the highest non-zero coefficient in the reordered array. This is coded with a VLC. The reason for sending a separate VLC t indicate TotalZeros is that many blocks contain a number of non-zero coefficients at the start of the array and (as will be seen later) this approach means that zero-runs at the start of the array need not be encoded.

5. Code Each Run of Zeros.

The number of zeros preceding each non-zero coefficient (run_before) is encoded in reverse order. A run_before parameter is encoded for each non-zero coefficient, starting with the highest frequency, with two exceptions:

(a) If there are no more zeros left to encode (i.e. Σ[run_before]=TotalZeros), it is not necessary to encode any more run_before values.

(b) It is not necessary to encode run_before for the final (lowest frequency) non-zero coefficient.

The VLC for each run of zeros is chosen depending on (a) the number of zeros that have not yet been encoded (ZerosLeft) and (b) run_before. For example, if there are only 2 zeros left to encode, run_before can only take 3 values (0, 1 or 2) and so the VLC need not be more than 2 bits long; if there are 6 zeros still to encode then run_before can take 7 values (0 to 6) and the VLC table needs to be correspondingly larger.

CAVLC EXAMPLES

In all the following examples, we assume that table Num-VLC0 is used to encode coeff_token.

Example 1

4×4 Block:

| | | | |
|---|---|---|---|
| 0 | 3 | −1 | 0 |
| 0 | −1 | 1 | 0 |
| 1 | 0 | 0 | 0 |
| 0 | 0 | 0 | 0 |

Reordered Block:

0, 3, 0, 1, −1, −1, 0, 1, 0 . . . .

TotalCoeff=5 (indexed from highest frequency [4] to lowest frequency [0]) TotalZeros=3

T1s=3 (in fact there are 4 trailing ones but only 3 can be encoded as a "special case")

Encoding:

| Element | Value | Code |
|---|---|---|
| Coeff_token | TotalCoeffs = 5, T1 = 3 | 0000100 |
| T1 sign (4) | + | 0 |
| T1 sign (3) | − | 1 |
| T1 sign (2) | − | 1 |

-continued

| Element | Value | Code |
|---|---|---|
| Level (1) | +1 (use Level_VLC0) | 1 |
| Level (0) | +3 (use Level_VLC1) | 0010 |
| TotalZeros | 3 | 111 |
| run_before(4) | ZerosLeft = 3; run_before = 1 | 10 |
| run_before(3) | ZerosLeft = 2; run_before = 0 | 1 |
| run_before(2) | ZerosLeft = 2; run_before = 0 | 1 |
| run_before(1) | ZerosLeft = 2; run_before = 1 | 01 |
| run_before(0) | ZerosLeft = 1; run_before = 1 | No code needed; last coefficient. |

The transmitted bitstream for this block is 000010001110010111101101.

Decoding:

The output array is "built up" from the decoded values as shown below. Values added to the output array at each stage are underlined.

| Code | Element | Value | Output array |
|---|---|---|---|
| 0000100 | coeff_taken | TotalCoeffs = 5, T1s = 3 | Empty |
| 0 | T1 sign | + | 1 |
| 1 | T1 sign | − | −1, 1 |
| 1 | T1 sign | − | −1, −1, 1 |
| 1 | Level | +1 | 1, −1, −1, 1 |
| 0010 | Level | +3 | 3, 1, −1, −1, 1 |
| 111 | TotalZeros | 3 | 3, 1, −1, −1, 1 |
| 10 | run_before | 1 | 3, 1, −1, −1, 0, 1 |
| 1 | run_before | 0 | 3, 1, −1, −1, 0, 1 |
| 1 | run_before | 0 | 3, 1, −1, −1, 0, 1 |
| 01 | run_before | 1 | 3, 0, 1, −1, −1, 0, 1 |

The decoder has inserted two zeros; however, TotalZeros is equal to 3 and so another 1 zero is inserted before the lowest coefficient, making the final output array:

0, 3, 0, 1, −1, −1, 0, 1

Example 2

4×4 Block:

| | | | |
|---|---|---|---|
| −2 | 4 | 0 | −1 |
| 3 | 0 | 0 | 0 |
| −3 | 0 | 0 | 0 |
| 0 | 0 | 0 | 0 |

Reordered Block:

−2, 4, 3, −3, 0, 0, −1, . . . .

TotalCoeffs=5 (indexed from highest frequency [4] to lowest frequency [0])

TotalZeros=2

T1s=1

Encoding:

| Element | Value | Code |
|---|---|---|
| Coeff_token | TotalCoeffs = 5, T1 = 3 | 0000000110 |
| T1 sign (4) | − | 1 |
| Level (3) | Sent as −2 (see note 1) (use Level_VLC0) | 0001 |
| Level (2) | 3 (use Level_VLC1) | 0010 |
| Level (1) | 4 (use Level_VLC1) | 00010 |

-continued

| Element | Value | Code |
|---|---|---|
| Level (0) | −2 (use Level_VLC2) | 111 |
| TotalZeros | 2 | 0011 |
| run_before(4) | ZerosLeft = 2; run_before = 2 | 00 |
| run_before(3 . . . 0) | 0 | No code Required |

Note 1:
Level (3), with a value of −3, is encoded as a special case. If there are less than 3 T1s, then the first non-T1 level will not have a value of +/−1 (otherwise it would have been encoded as a T1). To save bits, this level is incremented if negative (decremented if positive) so that +/−2 maps to +/−1, +/−3 maps to +/−2, and so on. In this way, shorter VLCs are used.
Note 2:
After encoding level (3), the level_VLC table is incremented because the magnitude of this level is greater than the first threshold (which is 0). After encoding level (1), with a magnitude of 4, the table number is incremented again because level (1) is greater than the second threshold (which is 3). Note that the final level (−2) uses a different code from the first encoded level (also −2).

The transmitted bitstream for this block is 000000011010001001000010111001100.

Decoding:

| Code | Element | Value | Output array |
|---|---|---|---|
| 0000000110 | coeff_taken | TotalCoeffs = 5, T1s = 3 | Empty |
| 1 | T1 sign | − | 1 |
| 0001 | Level | −2 decoded as −3 | −3, 1 |
| 0010 | Level | +3 | +3, −3, −1 |
| 00010 | Level | +4 | +4, 3, −3, −1 |
| 111 | Level | −2 | −2, 4, 3, −3, −1 |
| 0011 | TotalZeros | 2 | −2, 4, 3, −3, −1 |
| 00 | run_before | 2 | −2, 4, 3, −3, 0, 0, −1 |

All zeros have now been decoded and so the output array is:

−2, 4, 3, −3, 0, 0, −1

(This example illustrates how bits are saved by encoding Total Zeros: only a single run needs to be coded even though there are 5 non-zero coefficients).

CABAC

In CABAC, the Coding and Decoding May Done as Follows:

1) the position of the non-zero transform coefficient encountered first when traversing the transform coefficients along a predetermined scan order is coded/decoded.
2) Transform coefficients following, in the scan order, and including the non-zero transform coefficient at the coded/decoded position are coded/decoded from the data stream.

In CABAC, Alternatively, the Coding and Decoding May Done as Follows:

1) a significance map is coded/decoded which indicates the positions of the non-zero transform coefficients by use of significance flags and last-significance flags: in a forward scan traversing the positions of the transform coefficients, a significance flag is coded/decoded which indicates whether a non-zero transform coefficient is positioned at the respective position, and, if so, and if the position is not the last in the forward scan, a last-significance flag is coded/decoded which indicates whether the non-zero transform coefficient positioned at the respective position is the last non-zero transform coefficient in the forward scan order, and
2) The non-zero transform coefficients values are sequentially coded/decoded in a reverse scan order, reversing the forward scan order.

In CABAC, Even Alternatively, the Coding and Decoding May Done as Follows:

1) Coding/decoding coordinates of a position in a transform block representing the prediction residual data at which a last non-zero transform coefficient is encountered when traversing transform coefficients of the transform block along a predetermined scan order, and
2) sequentially coding/decoding values of transform coefficients including and ranked, along the predetermined scan order, between the last non-zero transform coefficient and a firstly scanned transform coefficient, and
3) selecting the predetermined scan order among a diagonal scan order, a horizontal scan order, and a vertical scan order depending on an intra prediction mode of the intra predicted block by use of a mapping which maps each of a plurality, e.g., 33, supported intra prediction modes onto a corresponding one of the diagonal scan order, the horizontal scan order, and the vertical scan order.

In CABAC, Even Alternatively, the Coding and Decoding May Done as Follows:

Coding/Decoding the Prediction Residual Data of a Residual Block from the Video Data Stream 1) by use of context-adaptive binary arithmetic coding/decoding of quantization indices of transform coefficients of a transform block representing the residual block and
2) sequential quantization to yield the quantization indices according to which a value of a current transform coefficient is quantized depends on a parity of quantization indices of previous quantization indices or sequential dequantization of the quantization indices according to which a value of a current transform coefficient depends on a parity of quantization indices of previous quantization indices.

Figure 17:
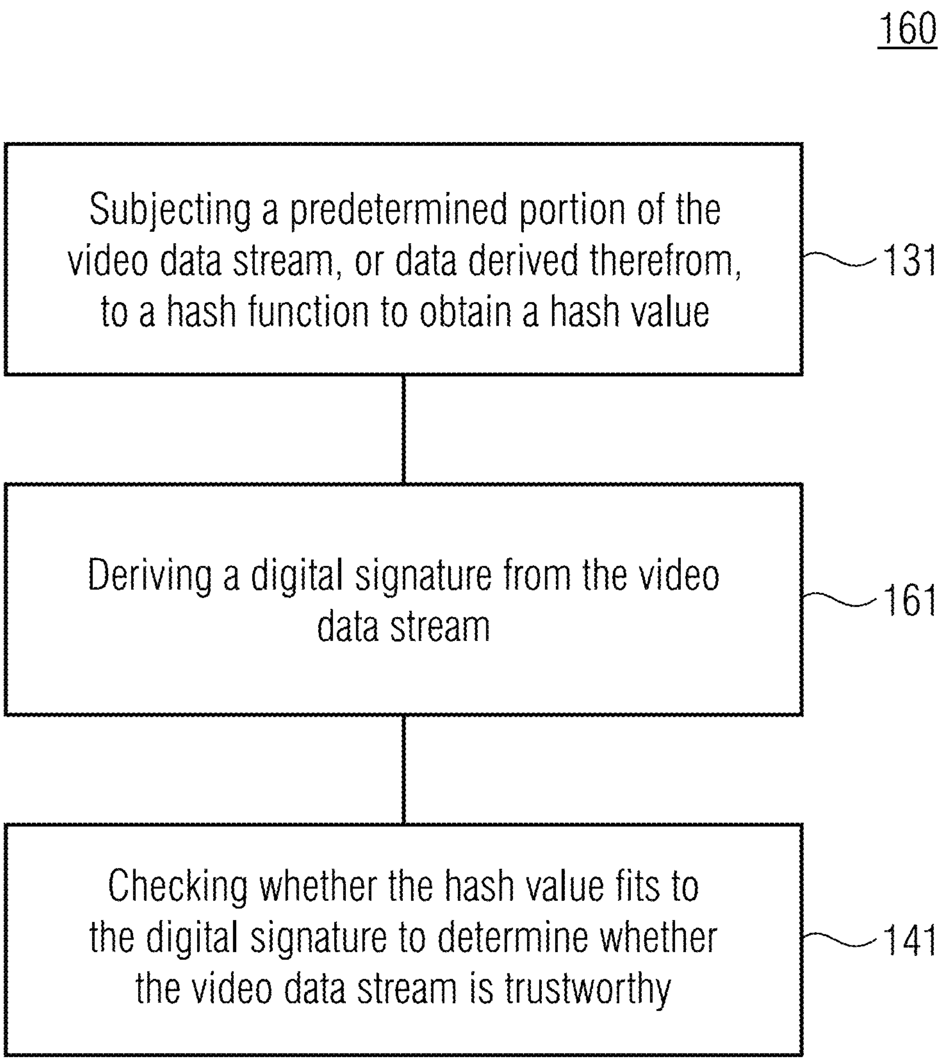
FIG. 17 illustrates a method for checking a data stream on trustworthiness according to an embodiment.

FIG. 17 shows a flow-chart of a method 160 for checking a video data stream having a video encoded thereinto on trustworthiness according to an embodiment, e.g., as performed by apparatus 16. The method comprises: subjecting 131 a predetermined portion of the video data stream, or data derived therefrom, to a hash function to obtain a hash value; deriving 161 a digital signature from the video data stream; and checking 141 whether the hash value fits to the digital signature to determine whether the video data stream is trustworthy.

Figure 18:
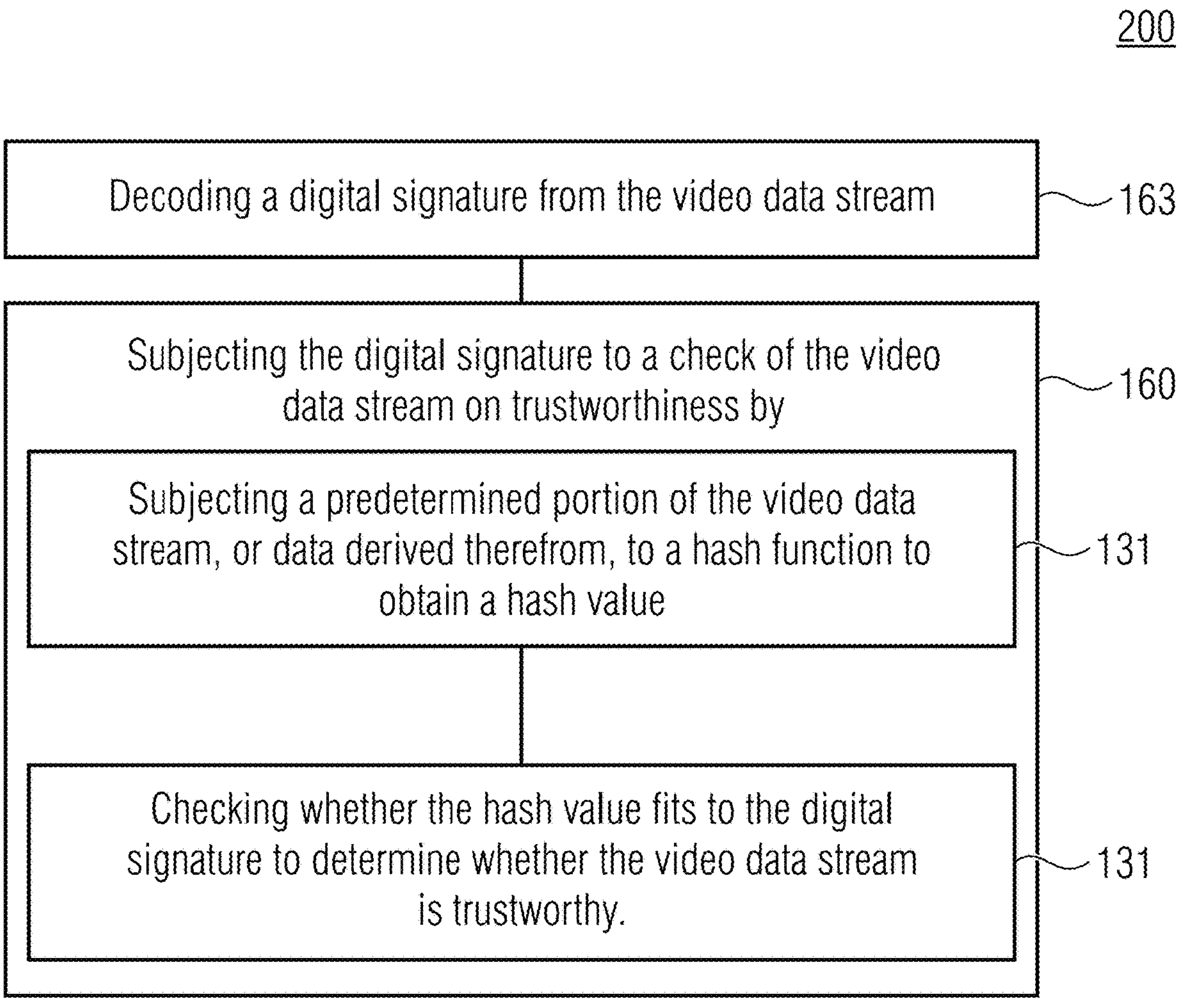
FIG. 18 illustrates a method for decoding a video according to an embodiment.

FIG. 18 shows a flow-chart of a method 200 for decoding a video from a video data stream according to an embodiment, e.g., as performed by apparatus 20. The method comprises decoding 163 a digital signature from the video data stream. The method further comprises subjecting the digital signature to a check 160 of the video data stream on trustworthiness by: subjecting 131 a predetermined portion of the video data stream, or data derived therefrom, to a hash function to obtain a hash value; and checking 141 whether the hash value fits to the digital signature to determine whether the video data stream is trustworthy.

Figure 19:
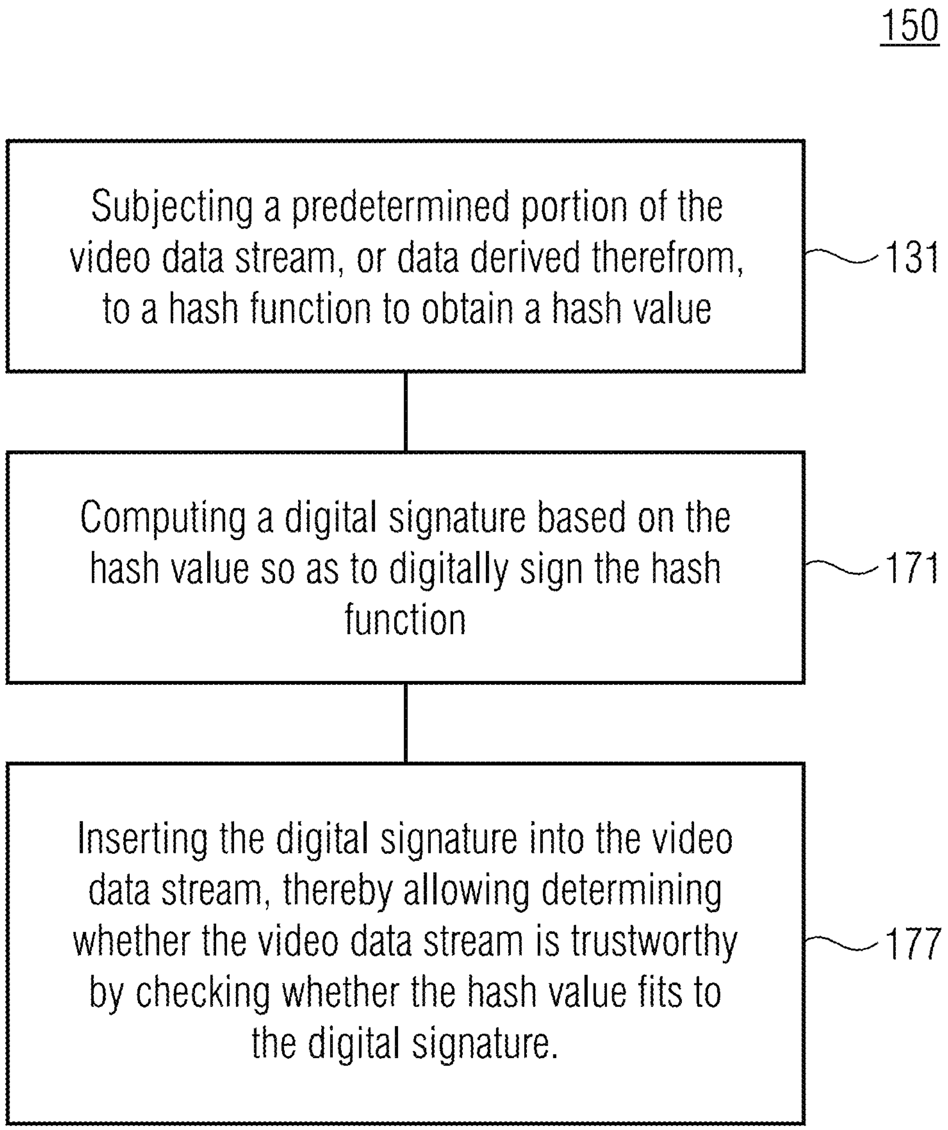
FIG. 19 illustrates a method for rendering a data stream checkable on trustworthiness according to an embodiment.

FIG. 19 shows a flow-chart of a method 150 for rendering a video data stream having a video encoded thereinto on checkable on trustworthiness, e.g., as performed by apparatus 15. The method comprises: subjecting 131 a predetermined portion of the video data stream, or data derived therefrom, to a hash function to obtain a hash value; computing 171 a digital signature based on the hash value so as to digitally sign the hash function; and inserting 177 the digital signature into the video data stream, thereby allowing determining whether the video data stream is trustworthy by checking whether the hash value fits to the digital signature.

Further Embodiments

In the following, embodiments are described in general terms, which may optionally be combined with any of the features described above.

1. Apparatus 16 for checking a video data stream 14 having a video encoded thereinto on trustworthiness, wherein the apparatus is configured for subjecting a predetermined portion 13 of the video data stream, or data derived therefrom, to a hash function 31 to obtain a hash value 33;

deriving a digital signature 43 from the video data stream; and checking 41 whether the hash value 33 fits to the digital signature 43 to determine whether the video data stream is trustworthy, wherein the video data stream has the video encoded thereinto by encoding the video into the video data stream by block based predictive coding and transform based residual coding by encoding the prediction residual data of the residual block into the video data stream by use of context adaptive variable length coding by using a first syntax element indicating a total number of non-zero transform coefficients in a transform block representing the residual block, and a trailing-one number, indicating a number of non-zero transform coefficients having an absolute value of one when traversing the coefficients along a scan order, one or more second syntax elements indicating a sign of the non-zero transform coefficients having an absolute value of one when traversing the coefficients along the scan order, one or more third syntax elements indicating a value of the non-zero transform coefficients except for the number of non-zero transform coefficients having an absolute value of one when traversing the coefficients along the scan order, a fourth syntax element indicating a total number of zero-valued transform coefficient levels in the transform block from a firstly-encountered non-zero transform coefficient in the scan order onwards, and one or more fifth syntax elements indicting positions of the non-zero transform coefficients along the scan order by indicating a number of consecutive zero-valued transform coefficients in the scan order between in the scan order consecutively encountered non-zero transform coefficients.

2. Apparatus according to embodiment 1, wherein the digital signature is transmitted in an supplemental enhancement information message of the video data stream.
3. Apparatus according to embodiment 1 or 2, configured for, in checking 41 whether the hash value fits to the digital signature to determine whether the video data stream is trustworthy, decrypting 45 the digital signature to obtain a check value 47; and checking 49 whether the hash value 33 matches the check value 47.

4. Apparatus according to any of embodiments 1 to 3, configured for, in subjecting the predetermined portion 22 of the video data stream, or data derived therefrom, to the hash function to obtain the hash value, reconstructing the video with respect to the predetermined portion to obtain a reconstructed portion of the video, and subjecting the reconstructed portion to the hash function.

5. Apparatus according to any of embodiments 1 to 4, the apparatus being a decoder configured for decoding the video from the video data stream, and decoding the digital signature from the video data stream.

6. Apparatus according to embodiment 5, configured for decoding the digital signature from an supplemental enhancement information message of the video data stream.

7. Apparatus according to embodiment 5 or 6, configured for locating the predetermined portion within the video data stream by use of one or more SEI messages 21, 25, 27 interspersed into video data stream and determining the predetermined portion to be a section of the video data stream extending between, or extending from, the one or more SEI messages.

8. Apparatus according to embodiment 7, configured for decoding the digital signature from one of the one or more SEI messages of the video data stream.

9. Apparatus according to embodiment 5 or 6, configured for locating the predetermined portion 13 within the video data stream by use of a prefix SEI message 25 and a suffix SEI message 25 interspersed into video data stream and determining the predetermined portion to be a section of the video data stream extending between, or located between, the prefix and suffix SEI messages.

10. Apparatus according to embodiment 5 or 6, configured for locating the predetermined portion 13 within the video data stream by use of a prefix SEI message 25 and a suffix SEI message 25 interspersed into video data stream and determining the predetermined portion to be located between the prefix and suffix SEI messages.

11. Apparatus according to embodiment 9 or 10, configured for decoding the digital signature from the suffix SEI message.

12. Apparatus according to embodiment 5 or 6, configured for locating the predetermined portion 13 within the video data stream by use of a first SEI message 25 and a second SEI message 27 interspersed into video data stream and determining the predetermined portion to be a section of the video data stream extending between, or located between, the first and the second SEI messages or as a section of the video data stream extending between the first SEI message and a point in the data stream which is located downstream the second SEI message.

13. Apparatus according to embodiment 5 or 6, configured for locating the predetermined portion 13 within the video data stream by use of a first SEI message 25 and a second SEI message 27 interspersed into video data stream and determining the predetermined portion to be located between the first and the second SEI messages, or located between the first SEI message and a point in the data stream which is located downstream the second SEI message.

14. Apparatus according to embodiment 12 or 13, configured for determining the point in the data stream which is located downstream the second SEI message based on a length of the section or as being located at an end of video coding layer portion with a access unit of the video data stream into which the second SEI message falls.

15. Apparatus according to any of embodiments 12 to 14, configured for decoding the digital signature from the second SEI message.

16. Apparatus according to embodiment 5 or 6, configured for deriving an overview SEI message from the video data stream, the overview SEI message indicating one or more substreams of the video data stream with respect to each of which the checking the video data stream on trustworthiness is possible based on one or more portions in the respective substream; and performing the checking the video data stream on trustworthiness with respect to a subset of one or more substreams of the one or more substreams by, for a predetermined substream out of the subset, locating a portion of the predetermined substream of the video data stream by use of one or more first SEI messages and a second SEI message interspersed into video data stream and determining the portion of the predetermined substream to be a section of the video data stream formed by concatenating subsections of the video data stream following each of the one or more first SEI messages and extending up to a video coding layer end of an access unit the respective first SEI message is contained in, and a subsection preceding the second SEI message and extending up to a video coding layer begin of the access unit the second SEI message in contained in, or following the second SEI message and extending up to a video coding layer end of the access unit the second SEI message is contained in.

17. Apparatus according to embodiment 5 or 6, configured for deriving an overview SEI message from the video data stream, the overview SEI message indicating one or more substreams of the video data stream with respect to each of which the checking the video data stream on trustworthiness is possible based on one or more portions in the respective substream; and performing the checking the video data stream on trustworthiness with respect to a subset of one or more substreams of the one or more substreams by, for a predetermined substream out of the subset, locating a portion of the predetermined substream of the video data stream by use of one or more first SEI messages interspersed into video data stream and determining the portion of the predetermined substream to be a section of the video data stream formed by concatenating subsections of the video data stream following each of the one or more first SEI messages and extending up to a video coding layer end of an access unit the respective first SEI message is contained in.

18. Apparatus according to embodiment 5 or 6, configured for deriving an overview SEI message from the video data stream, the overview SEI message indicating one or more substreams of the video data stream with respect to each of which the checking the video data stream on trustworthiness is possible based on one or more portions in the respective substream; and performing the checking the video data stream on trustworthiness with respect to a subset of one or more substreams of the one or more substreams by determining respective portions of the video data stream for the one or more substreams by checking, for a picture unit of the video data stream, whether the video data stream includes a substream selection SEI message for the picture unit, and assigning video coded layer payload packets of the picture unit to a first substream of the one or more substreams, if the video data stream does not include a substream selection SEI message for the picture unit, and f the video data stream includes a substream selection SEI message for the picture unit, assigning video coded layer payload packets of the picture unit to a substream of the one or more substreams, which substream is indicated by the substream selection SEI message.

19. Apparatus according to any of embodiments 16 to 18, configured for performing the checking the video data stream on trustworthiness with respect to the subset of one or more substreams further by subjecting the portions determined for the one or more substreams of the subset of one or more substreams to the hash function to derive respective hash values.

20. Apparatus according to any of embodiments 16 to 19, further configured for determining the respective portions for the substreams of the subset of one or more substreams by use of a first SEI message 25 and a second SEI message 27 interspersed into video data stream and determining the portions to be located between the first and the second SEI messages, or located between the first SEI message and a point in the data stream which is located downstream the second SEI message.

21. Apparatus according to any of embodiments 16 to 20, further configured for determining the respective portions for the substreams of the subset of one or more substreams to end at or before an end of a coded video sequence.

22. Apparatus according to any of embodiments 17 to 20, wherein the one or more substreams have an order defined among them, and wherein the apparatus is configured for determining the predetermined portion to be part of a predetermined substream out of the subset of one or more substreams, and configured for performing the checking the video data stream on trustworthiness sequentially with respect to respective portions of the video data stream derived for the one or more substreams by checking whether the hash value and a further hash value obtained by subjecting a previous portion of the predetermined portion, or further data derived therefrom, to the hash function, fit to the digital signature, or whether a combined hash value derived by hashing the predetermined portion and a further hash value obtained by subjecting a previous portion of the video data stream, or further data derived therefrom, to the hash function, fits to the digital signature, wherein the previous portion precedes the predetermined portion in the sequential order defined among the portions.

23. Apparatus according to any of embodiments 1 to 21, configured for performing the checking the video data stream on trustworthiness sequentially with respect to a plurality of portions of the video data stream, and further by checking whether the hash value and a further hash value obtained by subjecting a previous portion of the video data stream, or further data derived therefrom, to the hash function, fit to the digital signature, or whether a combined hash value derived by hashing the predetermined portion and a further hash value obtained by subjecting a previous portion of the video data stream, or further data derived therefrom, to the hash function, fits to the digital signature.

24. Apparatus of embodiment 22 or 23, configured for subjecting the hash value and the further hash value to a combination to obtain a combined hash value and checking whether the combined hash value fits to the digital signature, or the predetermined portion and the further hash value obtained by subjecting a previous portion of the video data stream, or further data derived therefrom, to the hash function, to a combination to obtain a combined hash value and checking whether the combined hash value fits to the digital signature.

25. Apparatus according to embodiment 24, wherein the combination is a concatenation.

26. Apparatus according to embodiment 22, 23, 24 or 25, configured for further checking whether a parameter of, or identifier of the hash function fits to the digital signature to determine whether the video data stream is trustworthy.

27. Apparatus according to any of embodiments 1 to 26, wherein two different digital signatures are transmitted in the video data stream for the predetermined portion, and wherein the apparatus is configured for performing the checking the video data stream on trustworthiness sequentially with respect to a plurality of portions of the video data stream, and by if the video data stream comprises a previous portion with respect to the predetermined portion, checking whether the hash value and a further hash value obtained by subjecting a previous portion of the video data stream, or further data derived therefrom, to the hash function, fit to a first one of the two different digital signatures, or whether a combined hash value derived by hashing the predetermined portion and a further hash value obtained by subjecting a previous portion of the video data stream, or further data derived therefrom, to the hash function, fits to the first one of the two different digital signatures, and if the video data stream comprises no previous portion with respect to the predetermined portion, checking whether the hash value fits to a second one of the two different digital signatures to determine whether the video data stream is trustworthy.

28. Apparatus according to any of embodiments 1 to 26, wherein the apparatus is configured for performing the checking the video data stream on trustworthiness sequentially with respect to a plurality of portions of the video data stream, and by if the video data stream comprises a previous portion with respect to the predetermined portion, checking whether the hash value and a further hash value obtained by subjecting a previous portion of the video data stream, or further data derived therefrom, to the hash function, fit to the digital signature, or whether the hash value and an even further hash value transmitted in the video data stream for the predetermined portion fit to the digital signature and the even further hash value equals a further hash value obtained by subjecting a previous portion of the video data stream, or further data derived therefrom, to the hash function, and whether a combined hash value derived by hashing the predetermined portion on the one hand and a further hash value obtained by subjecting a previous portion of the video data stream, or further data derived therefrom, to the hash function, on the other hand fits to the first one of the two different digital signatures, or whether a combined hash value derived by hashing the hash value and an even further hash value transmitted in the video data stream for the predetermined portion fit to the digital signature and the even further hash value equals a further hash value obtained by subjecting a previous portion of the video data stream, or further data derived therefrom, to the hash function, and if the video data stream comprises no previous portion with respect to the predetermined portion, checking whether the hash value fits to the digital signature to determine whether the video data stream is trustworthy.

29. Apparatus according to embodiment 28, wherein the apparatus is configured for if the video data stream comprises no previous portion with respect to the predetermined portion, checking whether the hash value fits to the digital signature to determine whether the video data stream is trustworthy by checking whether the hash value and the even further hash value transmitted in the video data stream for the predetermined portion fit to the digital signature.

30. Apparatus according to any of embodiments 1 to 29, wherein the digital signature is fitted to by a predetermined value in case of an equality of the predetermined value with a check value obtained by decrypting the digital signature, or a predetermined portion of the check value associated with the predetermined value, or an equality with the check value in a further hashed domain, reached by a further hash function applied onto the predetermined value or a concatenation of value including the predetermined value.

31. Apparatus according to any of embodiments 1 to 30, configured for performing the checking by use of an asymmetric decryption scheme using a public key.

32. Apparatus according to embodiment 31, configured for deriving the asymmetric decryption scheme using a first information derived from the data stream.

33. Apparatus according to embodiment 32, wherein the first information comprises a decryption scheme indicator or a first pointer to a first location from which the asymmetric decryption scheme may be determined, or an identifier of the entity having encoded the video into the video data stream.

34. Apparatus according to any of embodiments 31 to 33, configured for deriving the public key using a second information derived from the data stream.

35. Apparatus according to embodiment 34, wherein the second information comprises a second pointer to a second location from which the public key may be retrieved, or an identifier of the entity having encoded the video into the video data stream.

36. Apparatus according to any of embodiments 31 to 35, configured for deriving the public key by deriving a first syntax element and a second syntax element from the video data stream, and wherein the second syntax element is indicative of a pointer to a location, from which the public key is derivable, and wherein the apparatus is configured for, if the first syntax element has a first state, inferring that the location identifies exactly one public key, and deriving the exactly one public key from the location; and if the first syntax element has the second state, inferring that the location is indicative of a list of keys, and deriving a third syntax element from the video data stream, the third syntax element indicating a pointer to an entry in the list of keys, and deriving the public key from the entry in the list of keys indicated by the pointer.

37. Apparatus according to any of embodiments 1 to 36, configured for deriving the hash function using a third information derived from the data stream.

38. Apparatus according to embodiment 37, wherein the third information comprises a hash function indicator or a third pointer to a third location from which the hash function may be determined, or an identifier of the entity having encoded the video into the video data stream.

39. Apparatus according to any of embodiments 1 to 38, wherein the hash value depends on every bit of the predetermined portion of the video data stream.

40. Apparatus according to any of embodiments 1 to 39, wherein the hash value depends on every bit of the predetermined portion of the video data stream in an entropy coded domain.

41. Apparatus according to any of embodiments 1 to 40, wherein the predetermined portion of the video data stream extends over more than one access unit of the video data stream so that the hash value depends on bits of the more than one access unit.

42. Apparatus according to any of embodiments 1 to 41, configured for checking the video data stream on trustworthiness further by checking the hash function is correct by checking whether a parametrization of, or an identifier of the hash function fits to the digital signature.

43. Apparatus according to any of embodiments 1 to 42, wherein the predetermined portion is composed of one or more video coding layer portions of the video data stream which have encoded thereinto motion vectors and intra prediction modes for prediction blocks and transform coefficients for residual blocks.

44. Apparatus according to any of the previous embodiments, providing the hash value for being subject, along with a further hash value obtained by subjecting a portion of a media stream accompanying the video data stream, or further data derived therefrom, to the hash function or a different hash function, to a trustworthiness check of the video data stream combined with the media stream.

45. Apparatus according to any of embodiments 1 to 44, being a decoder configured for decoding the video from the video data stream by block based predictive decoding and transform based residual decoding by decoding the prediction residual data of the residual block from the video data stream by use of context adaptive variable length decoding by using a first syntax element indicating a total number of non-zero transform coefficients in a transform block representing the residual block, and a trailing-one number, indicating a number of non-zero transform coefficients having an absolute value of one when traversing the coefficients along a scan order, one or more second syntax elements indicating a sign of the non-zero transform coefficients having an absolute value of one when traversing the coefficients along the scan order, one or more third syntax elements indicating a value of the non-zero transform coefficients except for the number of non-zero transform coefficients having an absolute value of one when traversing the coefficients along the scan order, a fourth syntax element indicating a total number of zero-valued transform coefficient levels in the transform block from a firstly-encountered non-zero transform coefficient in the scan order onwards, and one or more fifth syntax elements indicting positions of the non-zero transform coefficients along the scan order by indicating a number of consecutive zero-valued transform coefficients in the scan order between in the scan order consecutively encountered non-zero transform coefficients, or by use of context-adaptive binary arithmetic decoding by decoding a significance map which indicates positions of non-zero transform coefficients in a transform block representing the residual block by, in a forward scan traversing transform coefficients of the transform block, decoding a significance flag which indicates whether a non-zero transform coefficient is positioned at a current position, and, if so, and if the current position is not the last in the forward scan, decoding a last-significance flag which indicates whether the non-zero transform coefficient positioned at the current position is the last non-zero transform coefficient in the forward scan order, and decoding the non-zero transform coefficients' values sequentially in a reverse scan order, reversing the forward scan order.

46. Apparatus according to any of embodiments 1 to 44, being a decoder configured for decoding the video from the video data stream by block based predictive decoding and transform based residual decoding by decoding the prediction residual data of an intra predicted block from the video data stream by use of context-adaptive binary arithmetic decoding by decoding a coordinate of a position in a transform block representing the prediction residual data at which a last non-zero transform coefficient is encountered when traversing transform coefficients of the transform block along a predetermined scan order, and sequentially decoding values of transform coefficients including and ranked, along the predetermined scan order, between the last non-zero transform coefficient and a firstly scanned transform coefficient, and selecting the predetermined scan order among a diagonal scan order, a horizontal scan order, and a vertical scan order depending on an intra prediction mode of the intra predicted block by use of a mapping which maps each of 33 supported intra prediction modes onto a corresponding one of the diagonal scan order, the horizontal scan order, and the vertical scan order.

47. Apparatus according to any of embodiments 1 to 44, being a decoder configured for decoding the video from the video data stream by block based predictive decoding and transform based residual decoding by decoding the prediction residual data of a residual block from the video data stream by use of context-adaptive binary arithmetic decoding of quantization indices of transform coefficients of a transform block representing the residual block and sequential dequantization of the quantizations indices according to which a value of a current transform coefficient depends on a parity of quantization indices of previous quantization indices.

48. Decoder 20 for decoding a video from a video data stream 14, wherein the decoder is configured for decoding 63 a digital signature 43 from the video data stream;

subjecting the digital signature to a check of the video data stream on trustworthiness by subjecting a predetermined portion 13 of the video data stream, or data 62 derived therefrom, to a hash function 31 to obtain a hash value 33; and checking 41 whether the hash value fits to the digital signature to determine whether the video data stream is trustworthy, wherein the decoder is configured for decoding the video from the video data stream by block based predictive and transform based residual decoding by decoding the prediction residual data of the residual block from the video data stream by use of context adaptive variable length decoding by using a first syntax element indicating a total number of non-zero transform coefficients in a transform block representing the residual block, and a trailing-one number, indicating a number of non-zero transform coefficients having an absolute value of one when traversing the coefficients along a scan order, one or more second syntax elements indicating a sign of the non-zero transform coefficients having an absolute value of one when traversing the coefficients along the scan order, one or more third syntax elements indicating a value of the non-zero transform coefficients except for the number of non-zero transform coefficients having an absolute value of one when traversing the coefficients along the scan order, a fourth syntax element indicating a total number of zero-valued transform coefficient levels in the transform block from a firstly-encountered non-zero transform coefficient in the scan order onwards, and one or more fifth syntax elements indicting positions of the non-zero transform coefficients along the scan order by indicating a number of consecutive zero-valued transform coefficients in the scan order between in the scan order consecutively encountered non-zero transform coefficients.

49. Decoder according to embodiment 48, wherein the digital signature is transmitted in an supplemental enhancement information message of the video data stream.

50. Decoder according to embodiment 48 or 49, wherein the check of the video data stream on trustworthiness includes decrypting the digital signature to obtain a check value; and checking whether the hash value matches the check value.

51. Decoder according to any of embodiments 48 to 50, wherein the subjecting the predetermined portion of the video data stream, or data derived therefrom, to a hash function to obtain the hash value includes reconstructing the video with respect to the predetermined portion to obtain a reconstructed portion of the video, and subjecting the reconstructed portion to the hash function.

52. Decoder according to any of embodiments 48 to 51, configured for decoding the digital signature from an supplemental enhancement information message of the video data stream.

53. Decoder according to any of embodiments 48 to 52, wherein the check of the video data stream on trustworthiness includes locating the predetermined portion within the video data stream by use of one or more SEI messages interspersed into video data stream and determining the predetermined portion to be a section of the video data stream extending between, or extending from, the one or more SEI messages.

54. Decoder according to embodiment 53, configured for decoding the digital signature from one of the one or more SEI messages of the video data stream.

55. Decoder according to any of embodiments 48 to 52, wherein the check of the video data stream on trustworthiness includes locating the predetermined portion within the video data stream by use of a prefix SEI message and a suffix SEI message interspersed into video data stream and determining the predetermined portion to be a section of the video data stream extending between, or located between, the prefix and suffix SEI messages.

56. Decoder according to any of embodiments 48 to 52, wherein the check of the video data stream on trustworthiness includes locating the predetermined portion 13 within the video data stream by use of a prefix SEI message 25 and a suffix SEI message 25 interspersed into video data stream and determining the predetermined portion to be located between the prefix and suffix SEI messages.

57. Decoder according to embodiment 55 or 56, configured for decoding the digital signature from the suffix SEI message.

58. Decoder according to embodiment 54 or 55, configured for locating the predetermined portion within the video data stream by use of a first SEI message and a second SEI message interspersed into video data stream and determining the predetermined portion to be a section of the video data stream extending between, or located between, the first and the second SEI messages or as a section of the video data stream extending between the first SEI message and a point in the data stream which is located downstream the second SEI message.

59. Decoder according to embodiment 54 or 55, configured for locating the predetermined portion 13 within the video data stream by use of a first SEI message 25 and a second SEI message 27 interspersed into video data stream and determining the predetermined portion to be located between the first and the second SEI messages, or located between the first SEI message and a point in the data stream which is located downstream the second SEI message.

60. Decoder according to embodiment 58 or 59, wherein the point in the data stream which is located downstream the second SEI message is determined based on a length of the section or as being located at an end of video coding layer portion with a access unit of the video data stream into which the second SEI message falls.

61. Decoder according to any of embodiments 58 to 60, configured for decoding the digital signature from the second SEI message.

62. Decoder according to any of embodiments 48 to 55, configured for deriving from an overview SEI message of the video data stream, the overview SEI message indicating one or more substreams of the video data stream with respect to each of which the checking the video data stream on trustworthiness is possible based on one or more portions in the respective substream; and wherein the check of the video data stream on trustworthiness includes performing the checking the video data stream on trustworthiness with respect to a subset of one or more substreams of the one or more substreams by, for a predetermined substream out of the subset, locating the one or more portions within the predetermined substream of the video data stream by use of one or more first SEI messages and a second SEI message interspersed into video data stream and determining the predetermined portion to be a section of the video data stream formed by concatenating subsections of the video data stream following each of the one or more first SEI messages and extending up to a video coding layer end of an access unit the respective first SEI message is contained in, and a subsection preceding the second SEI message and extending up to a video coding layer begin of the access unit the second SEI message in contained in, or following the second SEI message and extending up to a video coding layer end of the access unit the second SEI message in contained in.

63. Decoder according to any of embodiments 48 to 55, configured for deriving from an overview SEI message of the video data stream, the overview SEI message indicating one or more substreams of the video data stream with respect to each of which the checking the video data stream on trustworthiness is possible based on one or more portions in the respective substream; and wherein the check of the video data stream on trustworthiness includes performing the checking the video data stream on trustworthiness with respect to a subset of one or more substreams of the one or more substreams by, for a predetermined substream out of the subset, locating a portion of the predetermined substream of the video data stream by use of one or more first SEI messages interspersed into video data stream and determining the portion of the predetermined substream to be a section of the video data stream formed by concatenating subsections of the video data stream following each of the one or more first SEI messages and extending up to a video coding layer end of an access unit the respective first SEI message is contained in.

64. Decoder according to any of embodiments 48 to 55, configured for deriving an overview SEI message from the video data stream, the overview SEI message indicating one or more substreams of the video data stream with respect to each of which the checking the video data stream on trustworthiness is possible based on one or more portions in the respective substream; and wherein the check of the video data stream on trustworthiness includes performing the checking the video data stream on trustworthiness with respect to a subset of one or more substreams of the one or more substreams by determining respective portions of the video data stream for the one or more substreams by checking, for a picture unit of the video data stream, whether the video data stream includes a substream selection SEI message for the picture unit, and assigning video coded layer payload packets of the picture unit to a first substream of the one or more substreams, if the video data stream does not include a substream selection SEI message for the picture unit, and if the video data stream includes a substream selection SEI message for the picture unit, assigning video coded layer payload packets of the picture unit to a substream of the one or more substreams, which substream is indicated by the substream selection SEI message.

65. Decoder according to any of embodiments 62 to 64, wherein the check of the video data stream on trustworthiness includes performing the checking the video data stream on trustworthiness with respect to the subset of one or more substreams further by subjecting the portions determined for the one or more substreams of the subset of one or more substreams to the hash function to derive respective hash values.

66. Decoder according to any of embodiments 62 to 65, further configured for determining the respective portions for the substreams of the subset of one or more substreams by use of a first SEI message 25 and a second SEI message 27 interspersed into video data stream and determining the portions to be located between the first and the second SEI messages, or located between the first SEI message and a point in the data stream which is located downstream the second SEI message.

67. Decoder according to any of embodiments 62 to 66, further configured for determining the respective portions for the substreams of the subset of one or more substreams to end at or before an end of a coded video sequence.

68. Decoder according to any of embodiments 63 to 66, wherein the one or more substreams have an order defined among them, and wherein the decoder is configured for determining the predetermined portion to be part of a predetermined substream out of the subset of one or more substreams, and wherein the check of the video data stream on trustworthiness includes performing the checking the video data stream on trustworthiness sequentially with respect to respective portions of the video data stream derived for the one or more substreams by checking whether the hash value and a further hash value obtained by subjecting a previous portion of the predetermined portion, or further data derived therefrom, to the hash function, fit to the digital signature, or whether a combined hash value derived by hashing the predetermined portion and a further hash value obtained by subjecting a previous portion of the video data stream, or further data derived therefrom, to the hash function, fits to the digital signature, wherein the previous portion precedes the predetermined portion in the sequential order defined among the portions.

69. Decoder according to any of embodiments 48 to 67, wherein the check of the video data stream on trustworthiness includes performing the checking the video data stream on trustworthiness sequentially with respect to a plurality of portions of the video data stream, and further by checking whether the hash value and a further hash value obtained by subjecting a previous portion of the video data stream, or further data derived therefrom, to the hash function, fit to the digital signature, or whether a combined hash value derived by hashing the predetermined portion and a further hash value obtained by subjecting a previous portion of the video data stream, or further data derived therefrom, to the hash function, fits to the digital signature.

70. Decoder of embodiment 68 or 69, wherein the check of the video data stream on trustworthiness includes subjecting the hash value and the further hash value to a combination to obtain a combined hash value and checking whether the combined hash value fits to the digital signature, or the predetermined portion and the further hash value obtained by subjecting a previous portion of the video data stream, or further data derived therefrom, to the hash function, to a combination to obtain a combined hash value and checking whether the combined hash value fits to the digital signature.

71. Decoder according to embodiment 70, wherein the combination is a concatenation.

72. Decoder according to any of embodiments 68 to 71, wherein the check of the video data stream on trustworthiness includes further checking whether an identifier of the hash function fits to the digital signature to determine whether the video data stream is trustworthy.

73. Decoder according to any of embodiments 48 to 72, wherein two different digital signatures are transmitted in the video data stream for the predetermined portion, and wherein the check of the video data stream on trustworthiness includes performing the checking the video data stream on trustworthiness sequentially with respect to a plurality of portions of the video data stream, and by if the video data stream comprises a previous portion with respect to the predetermined portion, checking whether the hash value and a further hash value obtained by subjecting a previous portion of the video data stream, or further data derived therefrom, to the hash function, fit to a first one of the two different digital signatures, or whether a combined hash value derived by hashing the predetermined portion and a further hash value obtained by subjecting a previous portion of the video data stream, or further data derived therefrom, to the hash function, fits to the first one of the two different digital signatures, and if the video data stream comprises no previous portion with respect to the predetermined portion, checking whether the hash value fits to a second one of the two different digital signatures to determine whether the video data stream is trustworthy.

74. Decoder according to any of embodiments 48 to 72, wherein the check of the video data stream on trustworthiness includes performing the checking the video data stream on trustworthiness sequentially with respect to a plurality of portions of the video data stream, and by if the video data stream comprises a previous portion with respect to the predetermined portion, checking whether the hash value and a further hash value obtained by subjecting a previous portion of the video data stream, or further data derived therefrom, to the hash function, fit to the digital signature, or whether the hash value and an even further hash value transmitted in the video data stream for the predetermined portion fit to the digital signature and the even further hash value equals a further hash value obtained by subjecting a previous portion of the video data stream, or further data derived therefrom, to the hash function, and whether a combined hash value derived by hashing the predetermined portion on the one hand and a further hash value obtained by subjecting a previous portion of the video data stream, or further data derived therefrom, to the hash function, on the other hand fits to the first one of the two different digital signatures, or whether a combined hash value derived by hashing the hash value and an even further hash value transmitted in the video data stream for the predetermined portion fit to the digital signature and the even further hash value equals a further hash value obtained by subjecting a previous portion of the video data stream, or further data derived therefrom, to the hash function, and if the video data stream comprises no previous portion with respect to the predetermined portion, checking whether the hash value fits to the digital signature to determine whether the video data stream is trustworthy.

75. Decoder according to embodiment 74, wherein the check of the video data stream on trustworthiness includes if the video data stream comprises no previous portion with respect to the predetermined portion, checking whether the hash value fits to the digital signature to determine whether the video data stream is trustworthy by checking whether the hash value and the even further hash value transmitted in the video data stream for the predetermined portion fit to the digital signature.

76. Decoder according to any of embodiments 48 to 75, wherein the digital signature is fitted to by a predetermined value in case of an equality of the predetermined value with a check value obtained by decrypting the digital signature, or a predetermined portion of the check value associated with the predetermined value, or an equality with the check value in a further hashed domain, reached by a further hash function applied onto the predetermined value or a concatenation of value including the predetermined value.

77. Decoder according to any of embodiments 48 to 76, wherein the check of the video data stream on trustworthiness includes a use of an asymmetric decryption scheme using a public key.

78. Decoder according to embodiment 77, configured for deriving the asymmetric decryption scheme using a first information derived from the data stream.

79. Decoder according to embodiment 78, wherein the first information comprises a decryption scheme indicator or a first pointer to a first location from which the asymmetric decryption scheme may be determined, or an identifier of the entity having encoded the video into the video data stream.

80. Decoder according to any of embodiments 48 to 79, configured for deriving the public key using a second information derived from the data stream.

81. Decoder according to embodiment 80, wherein the second information comprises a second pointer to a second location from which the public key may be retrieved, or an identifier of the entity having encoded the video into the video data stream.

82. Decoder according to any of embodiments 77 to 81, configured for deriving the public key by deriving a first syntax element and a second syntax element from the video data stream, wherein the second syntax element is indicative of a pointer to a location, from which the public key is derivable, and wherein the decoder is configured for, if the first syntax element has a first state, inferring that the location identifies exactly one public key, and deriving the exactly one public key from the location; and if the first syntax element has the second state, inferring that the location is indicative of a list of keys, and deriving a third syntax element from the video data stream, the third syntax element indicating a pointer to an entry in the list of keys.

83. Decoder according to any of embodiments 48 to 82, configured for deriving the hash function using a third information derived from the data stream.

84. Decoder according to embodiment 83, wherein the third information comprises a hash function indicator or a third pointer to a third location from which the hash function may be determined, or an identifier of the entity having encoded the video into the video data stream.

85. Decoder according to any of embodiments 48 to 84, wherein the hash value depends on every bit of the predetermined portion of the video data stream.

86. Decoder according to any of embodiments 48 to 85, wherein the hash value depends on every bit of the predetermined portion of the video data stream in an entropy coded domain.

87. Decoder according to any of embodiments 48 to 86, wherein the predetermined portion of the video data stream extends over more than one access unit of the video data stream so that the hash value depends on bits of the more than one access unit.

88. Decoder according to any of embodiments 48 to 87, wherein the check of the video data stream on trustworthiness includes checking the hash function is correct by checking whether a parametrization of, or an identifier of the hash function fits to the digital signature.

89. Decoder according to any of embodiments 48 to 88, wherein the predetermined portion is composed of one or more video coding layer portions of the video data stream which have encoded thereinto motion vectors and intra prediction modes for prediction blocks and transform coefficients for residual blocks.

90. Decoder according to any of embodiments 48 to 89, providing the hash value for being subject, along with a further hash value obtained by subjecting a portion of a media stream accompanying the video data stream, or further data derived therefrom, to the hash function or a different hash function, to a trustworthiness check of the video data stream combined with the media stream.

91. Decoder according to any of embodiments 48 to 90, wherein the decoder is configured for decoding the video from the video data stream by block based predictive and transform based residual decoding by decoding the prediction residual data of the residual block from the video data stream by use of context adaptive variable length decoding by using a first syntax element indicating a total number of non-zero transform coefficients in a transform block representing the residual block, and a trailing-one number, indicating a number of non-zero transform coefficients having an absolute value of one when traversing the coefficients along a scan order, one or more second syntax elements indicating a sign of the non-zero transform coefficients having an absolute value of one when traversing the coefficients along the scan order, one or more third syntax elements indicating a value of the non-zero transform coefficients except for the number of non-zero transform coefficients having an absolute value of one when traversing the coefficients along the scan order, a fourth syntax element indicating a total number of zero-valued transform coefficient levels in the transform block from a firstly-encountered non-zero transform coefficient in the scan order onwards, and one or more fifth syntax elements indicting positions of the non-zero transform coefficients along the scan order by indicating a number of consecutive zero-valued transform coefficients in the scan order between in the scan order consecutively encountered non-zero transform coefficients, or by use of context-adaptive binary arithmetic decoding by decoding a significance map which indicates positions of non-zero transform coefficients in a transform block representing the residual block by, in a forward scan traversing transform coefficients of the transform block, decoding a significance flag which indicates whether a non-zero transform coefficient is positioned at a current position, and, if so, and if the current position is not the last in the forward scan, decoding a last-significance flag which indicates whether the non-zero transform coefficient positioned at the current position is the last non-zero transform coefficient in the forward scan order, and decoding the non-zero transform coefficients' values sequentially in a reverse scan order, reversing the forward scan order.

92. Decoder according to any of embodiments 48 to 90, configured for decoding the video from the video data stream by block based predictive decoding and transform based residual decoding by decoding the prediction residual data of an intra predicted block from the video data stream by use of context-adaptive binary arithmetic decoding by decoding a coordinate of a position in a transform block representing the prediction residual data at which a last non-zero transform coefficient is encountered when traversing transform coefficients of the transform block along a predetermined scan order, and sequentially decoding values of transform coefficients including and ranked, along the predetermined scan order, between the last non-zero transform coefficient and a firstly scanned transform coefficient, and selecting the predetermined scan order among a diagonal scan order, a horizontal scan order, and a vertical scan order depending on an intra prediction mode of the intra predicted block by use of a mapping which maps each of 33 supported intra prediction modes onto a corresponding one of the diagonal scan order, the horizontal scan order, and the vertical scan order.

93. Decoder according to any of embodiments 48 to 90, configured for decoding the video from the video data stream by block based predictive decoding and transform based residual decoding by decoding the prediction residual data of a residual block from the video data stream by use of context-adaptive binary arithmetic decoding of quantization indices of transform coefficients of a transform block representing the residual block and sequential dequantization of the quantization indices according to which a value of a current transform coefficient depends on a parity of quantization indices of previous quantization indices.

94. Apparatus 15 for rendering a video data stream 14 having a video encoded thereinto checkable on trustworthiness, wherein the apparatus is configured for subjecting a predetermined portion 13 of the video data stream, or data derived therefrom, to a hash function 31 to obtain a hash value 33;

computing a digital signature 43 based on the hash value 33 so as to digitally sign the hash value 33, and inserting 77 the digital signature 43 into the video data stream 14, thereby allowing determining whether the video data stream is trustworthy by checking whether the hash value 33 fits to the digital signature 43, wherein the video data stream has the video encoded thereinto by encoding the video into the video data stream by block based predictive coding and transform based residual coding by encoding the prediction residual data of the residual block into the video data stream by use of context adaptive variable length coding by using a first syntax element indicating a total number of non-zero transform coefficients in a transform block representing the residual block, and a trailing-one number, indicating a number of non-zero transform coefficients having an absolute value of one when traversing the coefficients along a scan order, one or more second syntax elements indicating a sign of the non-zero transform coefficients having an absolute value of one when traversing the coefficients along the scan order, one or more third syntax elements indicating a value of the non-zero transform coefficients except for the number of non-zero transform coefficients having an absolute value of one when traversing the coefficients along the scan order, a fourth syntax element indicating a total number of zero-valued transform coefficient levels in the transform block from a firstly-encountered non-zero transform coefficient in the scan order onwards, and one or more fifth syntax elements indicting positions of the non-zero transform coefficients along the scan order by indicating a number of consecutive zero-valued transform coefficients in the scan order between in the scan order consecutively encountered non-zero transform coefficients.

95. Apparatus according to embodiment 94, configured for inserting the digital signature into an supplemental enhancement information message of the video data stream.

96. Apparatus according to embodiment 94 or 95, configured for computing the digital signature based on the hash value by forming a check value based on the hash value, encrypting the check value to obtain the digital signature.

97. Apparatus according to any of embodiments 94 to 96, wherein the subjecting the predetermined portion of the video data stream, or data derived therefrom, to a hash function to obtain the hash value comprises reconstructing the video with respect to the predetermined portion to obtain a reconstructed portion of the video, and subjecting the reconstructed portion to the hash function.

98. Apparatus according to any of embodiments 94 to 97, the apparatus being an encoder configured for encoding the video into the video data stream, and encoding the digital signature into the video data stream.

99. Apparatus according to embodiment 98, configured for encoding the digital signature into a supplemental enhancement information message of the video data stream.

100. Apparatus according to embodiment 98 or 99, wherein the predetermined portion is to be located within the video data stream by use of one or more SEI messages interspersed into video data stream and determining the predetermined portion to be a section of the video data stream extending between, or extending from, the one or more SEI messages.

101. Apparatus according to embodiment 100, configured for encoding the digital signature into one of the one or more SEI messages of the video data stream.

102. Apparatus according to embodiment 98 or 99, wherein the predetermined portion is to be located within the video data stream by use of a prefix SEI message and a suffix SEI message interspersed into video data stream and determining the predetermined portion to be a section of the video data stream extending between, or located between, the prefix and suffix SEI messages.

103. Apparatus according to embodiment 98 or 99, wherein the predetermined portion is to be located within the video data stream by use of a prefix SEI message 25 and a suffix SEI message 25 interspersed into video data stream and determining the predetermined portion to be located between the prefix and suffix SEI messages.

104. Apparatus according to embodiment 102 or 103, configured for encoding the digital signature into the suffix SEI message.

105. Apparatus according to embodiment 98 or 99, wherein the predetermined portion is to be located within the video data stream by use of a first SEI message and a second SEI message interspersed into video data stream and determining the predetermined portion to be a section of the video data stream extending between, or located between, the first and the second SEI messages or as a section of the video data stream extending between the first SEI message and a point in the data stream which is located downstream the second SEI message.

106. Apparatus according to embodiment 98 or 99, wherein the predetermined portion is to be located within the video data stream by use of a first SEI message 25 and a second SEI message 27 interspersed into video data stream and determining the predetermined portion to be located between the first and the second SEI messages, or located between the first SEI message and a point in the data stream which is located downstream the second SEI message.

107. Apparatus according to embodiment 106, wherein the point in the data stream which is located downstream the second SEI message is to be determined based on a length of the section or as being located at an end of video coding layer portion with an access unit of the video data stream into which the second SEI message falls.

108. Apparatus according to embodiment 106 or 107, configured for encoding the digital signature into the second SEI message.

109. Apparatus according to embodiment 98 or 99, inserting an overview SEI message into the video data stream, the overview SEI message indicating one or more substreams of the video data stream with respect to each of which the checking the video data stream on trustworthiness is possible based on one or more portions in the respective substream; and wherein, for a predetermined substream out of the subset, a portion of the predetermined substream is to be located by use of one or more first SEI messages and a second SEI message interspersed into video data stream and by determining the portion of the predetermined substream to be a section of the video data stream formed by concatenating subsections of the video data stream following each of the one or more first SEI messages and extending up to a video coding layer end of an access unit the respective first SEI message is contained in, and a subsection preceding the second SEI message and extending up to a video coding layer begin of the access unit the second SEI message in contained in, or following the second SEI message and extending up to a video coding layer end of the access unit the second SEI message in contained in, and inserting the digital signature into the second SEI message.

110. Apparatus according to embodiment 98 or 99, inserting an overview SEI message into the video data stream, the overview SEI message indicating one or more substreams of the video data stream with respect to each of which the checking the video data stream on trustworthiness is possible based on one or more portions in the respective substream; and wherein, for a predetermined substream out of the subset, a portion of the predetermined substream is to be located by use of one or more first SEI messages interspersed into video data stream and by determining the portion of the predetermined substream to be a section of the video data stream formed by concatenating subsections of the video data stream following each of the one or more first SEI messages and extending up to a video coding layer end of an access unit the respective first SEI message is contained in.

111. Apparatus according to any of embodiments 94 to 110, wherein the check of the video data stream on trustworthiness is enabled to be performed sequentially with respect to a plurality of portions of the video data stream, and further by digitally sign using, and computing the digital signature based on, the hash value and a further hash value obtained by subjecting a previous portion of the video data stream, or further data derived therefrom, to the hash function, or digitally sign using, and computing the digital signature based on, a combined hash value derived by hashing the predetermined portion and a further hash value obtained by subjecting a previous portion of the video data stream, or further data derived therefrom, to the hash function.

112. Apparatus of embodiment 111, configured for subjecting the hash value and the further hash value to a combination to obtain a combined hash value and computing the digital signature to digitally sign the combined hash value, or the predetermined value and the further hash value obtained by subjecting a previous portion of the video data stream, or further data derived therefrom, to the hash function, to a combination to obtain a combined hash value and computing the digital signature to digitally sign the combined hash value.

113. Apparatus according to embodiment 112, wherein the combination is a concatenation.

114. Apparatus according to any one of embodiments 111 to 113, configured for further digitally sign using, and computing the digital signature based on an identifier of the hash function.

115. Apparatus according to any of embodiments 94 to 114, configured for inserting two different digital signatures in the video data stream for the predetermined portion by computing a first one of same based on the hash value and a further hash value obtained by subjecting a previous portion of the video data stream, or further data derived therefrom, to the hash function or a combined hash value derived by hashing the predetermined portion and the further hash value so as to digitally sign a combination of the hash value and the further hash value and a first one of same by computing a second one of same based on the hash value so as to digitally sign the hash value, so that the checking the video data stream on trustworthiness is enabled by If the video data stream comprises a previous portion with respect to the predetermined portion, checking whether the hash value and the further hash value fit to the first one of the two different digital signatures, or whether a combined hash value derived by hashing the predetermined portion and a further hash value obtained by subjecting a previous portion of the video data stream, or further data derived therefrom, to the hash function, fits to the first one of the two different digital signatures, and If the video data stream comprises no previous portion with respect to the predetermined portion, checking whether the hash value fits to the second one of the two different digital signatures to determine whether the video data stream is trustworthy.

116. Apparatus according to any of embodiments 94 to 114, configured for computing the digital signature based on the hash value and a further hash value obtained by subjecting a previous portion of the video data stream, or further data derived therefrom, to the hash function or a combined hash value derived by hashing the predetermined portion and the further hash value so as to digitally sign a combination of the hash value and the further hash value and inserting the digital signature into the video data stream for the predetermined portion along with an even further hash value equaling the further hash value, so that the checking the video data stream on trustworthiness is enabled by if the video data stream comprises a previous portion with respect to the predetermined portion, checking whether the hash value and the further hash value fit to the digital signature, or whether the hash value and the even further hash value transmitted in the video data stream for the predetermined portion fit to the digital signature and the even further hash value equals a further hash value obtained by subjecting a previous portion of the video data stream, or further data derived therefrom, to the hash function, and whether a combined hash value derived by hashing the predetermined portion on the one hand and the further hash value, on the other hand fits to the first one of the two different digital signatures, or whether a combined hash value derived by hashing the hash value and the even further hash value transmitted in the video data stream for the predetermined portion fit to the digital signature and the even further hash value equals a further hash value obtained by subjecting a previous portion of the video data stream, or further data derived therefrom, to the hash function, and if the video data stream comprises no previous portion with respect to the predetermined portion, checking whether the hash value fits to the digital signature to determine whether the video data stream is trustworthy.

117. Apparatus according to embodiment 116, wherein

If the video data stream comprises no previous portion with respect to the predetermined portion, the hash value is to be checked whether same fits to the digital signature to determine whether the video data stream is trustworthy by checking whether the hash value and the even further hash value transmitted in the video data stream for the predetermined portion fit to the digital signature.

118. Apparatus according to any of embodiments 94 to 117, configured for computing the digital signature based on the hash value by forming a check value based on the hash value so that the hash value matches a predetermined portion of the check value, and encrypting the check value to obtain the digital signature, or forming a check value based on the hash value by further hashing the predetermined value or a concatenation of values including the predetermined value, and encrypting the check value to obtain the digital signature.

119. Apparatus according to any of embodiments 94 to 118, configured for computing the digital signature based on the hash value by use of an asymmetric encryption scheme using a private key, or a public key and a private key.

120. Apparatus according to embodiment 119, configured for inserting a first information derived into the data stream from which the asymmetric encryption scheme is derivable.

121. Apparatus according to embodiment 120, wherein the first information comprises an encryption scheme indicator or a first pointer to a first location from which the asymmetric encryption scheme may be determined, or an identifier of the apparatus.

122. Apparatus according to any of embodiments 94 to 121, configured for inserting a second information derived into the video data stream from which deriving the public key is derivable.

123. Apparatus according to embodiment 122, wherein the second information comprises a second pointer to a second location from which the public key may be retrieved, or an identifier of the apparatus.

124. Apparatus according to any of embodiments 119 to 123, configured for inserting a first syntax element and a second syntax element into the video data stream, wherein the second syntax element is indicative of a pointer to a location, from which the public key is derivable, and wherein the first syntax element has a first state and a second state, wherein the first state indicates that the location identifies exactly one public key, and wherein the second state indicates that the location is indicative of a list of keys, wherein the apparatus is configured for, if setting the first syntax element to the second state, inserting a third syntax element into the video data stream, the third syntax element indicating a pointer to an entry in the list of keys.

125. Apparatus according to any of embodiments 94 to 124, configured for inserting a third information into the data stream from which the hash function is derivable.

126. Apparatus according to embodiment 125, wherein the third information comprises a hash function indicator or a third pointer to a third location from which the hash function may be determined, or an identifier of the apparatus.

127. Apparatus according to any of embodiments 94 to 126, wherein the hash value depends on every bit of the predetermined portion of the video data stream.

128. Apparatus according to any of embodiments 94 to 127, wherein the hash value depends on every bit of the predetermined portion of the video data stream in an entropy coded domain.

129. Apparatus according to any of embodiments 94 to 128, wherein the predetermined portion of the video data stream extends over more than one access unit of the video data stream so that the hash value depends on bits of the more than one access unit.

130. Apparatus according to any of embodiments 94 to 129, configured for computing the digital signature further based on, and thereby digitally signing, a parametrization of, or an identifier of the hash function.

131. Apparatus according to any of embodiments 94 to 130, wherein the predetermined portion is composed of one or more video coding layer portions of the video data stream which have encoded thereinto motion vectors and intra prediction modes for prediction blocks and transform coefficients for residual blocks.

132. Apparatus according to any of embodiments 94 to 131, being an encoder configured for encoding the video into the video data stream by block based predictive coding and transform based residual coding by encoding the prediction residual data of the residual block into the video data stream by use of context adaptive variable length coding by using a first syntax element indicating a total number of non-zero transform coefficients in a transform block representing the residual block, and a trailing-one number, indicating a number of non-zero transform coefficients having an absolute value of one when traversing the coefficients along a scan order, one or more second syntax elements indicating a sign of the non-zero transform coefficients having an absolute value of one when traversing the coefficients along the scan order, one or more third syntax elements indicating a value of the non-zero transform coefficients except for the number of non-zero transform coefficients having an absolute value of one when traversing the coefficients along the scan order, a fourth syntax element indicating a total number of zero-valued transform coefficient levels in the transform block from a firstly-encountered non-zero transform coefficient in the scan order onwards, and one or more fifth syntax elements indicting positions of the non-zero transform coefficients along the scan order by indicating a number of consecutive zero-valued transform coefficients in the scan order between in the scan order consecutively encountered non-zero transform coefficients, or by use of context-adaptive binary arithmetic coding by encoding a significance map which indicates positions of non-zero transform coefficients in a transform block representing the residual block by, in a forward scan traversing transform coefficients of the transform block, encoding a significance flag which indicates whether a non-zero transform coefficient is positioned at a current position, and, if so, and if the current position is not the last in the forward scan, encoding a last-significance flag which indicates whether the non-zero transform coefficient positioned at the current position is the last non-zero transform coefficient in the forward scan order, and encoding the non-zero transform coefficients' values sequentially in a reverse scan order, reversing the forward scan order.

133. Apparatus according to any of embodiments 94 to 132, being an encoder configured for encoding the video into the video data stream by block based predictive coding and transform based residual coding by encoding the prediction residual data of an intra predicted block into the video data stream by use of context-adaptive binary arithmetic coding by encoding a coordinate of a position in a transform block representing the prediction residual data at which a last non-zero transform coefficient is encountered when traversing transform coefficients of the transform block along a predetermined scan order, and sequentially encoding values of transform coefficients including and ranked, along the predetermined scan order, between the last non-zero transform coefficient and a firstly scanned transform coefficient, and selecting the predetermined scan order among a diagonal scan order, a horizontal scan order, and a vertical scan order depending on an intra prediction mode of the intra predicted block by use of a mapping which maps each of 33 supported intra prediction modes onto a corresponding one of the diagonal scan order, the horizontal scan order, and the vertical scan order.

134. Apparatus according to any of embodiments 94 to 131, being an encoder configured for encoding the video into the video data stream by block based predictive coding and transform based residual coding by encoding the prediction residual data of a residual block into the video data stream by use of context-adaptive binary arithmetic coding of quantization indices of transform coefficients of a transform block representing the residual block and sequential quantization of the transform coefficients to obtain the quantization indices, according to which a quantizer for quantizing a current transform coefficient depends on a parity of quantization indices of previous quantization indices.

135. Method 160 for checking a video data stream 14 having a video encoded thereinto on trustworthiness, wherein the method comprises:

subjecting 131 a predetermined portion of the video data stream, or data derived therefrom, to a hash function 31 to obtain a hash value 33;

deriving 161 a digital signature 43 from the video data stream; and checking 141 whether the hash value 33 fits to the digital signature 43 to determine whether the video data stream is trustworthy, wherein the video data stream has the video encoded thereinto by encoding the video into the video data stream by block based predictive coding and transform based residual coding by encoding the prediction residual data of the residual block into the video data stream by use of context adaptive variable length coding by using a first syntax element indicating a total number of non-zero transform coefficients in a transform block representing the residual block, and a trailing-one number, indicating a number of non-zero transform coefficients having an absolute value of one when traversing the coefficients along a scan order, one or more second syntax elements indicating a sign of the non-zero transform coefficients having an absolute value of one when traversing the coefficients along the scan order, one or more third syntax elements indicating a value of the non-zero transform coefficients except for the number of non-zero transform coefficients having an absolute value of one when traversing the coefficients along the scan order, a fourth syntax element indicating a total number of zero-valued transform coefficient levels in the transform block from a firstly-encountered non-zero transform coefficient in the scan order onwards, and one or more fifth syntax elements indicting positions of the non-zero transform coefficients along the scan order by indicating a number of consecutive zero-valued transform coefficients in the scan order between in the scan order consecutively encountered non-zero transform coefficients.

136. Method 200 for decoding a video from a video data stream 14, wherein the method comprises:

decoding 163 a digital signature 43 from the video data stream;

subjecting the digital signature to a check of the video data stream on trustworthiness by subjecting 131 a predetermined portion 13 of the video data stream, or data 62 derived therefrom, to a hash function 31 to obtain a hash value 33; and checking 141 whether the hash value fits to the digital signature to determine whether the video data stream is trustworthy, wherein the method comprises decoding the video from the video data stream by block based predictive and transform based residual decoding by decoding the prediction residual data of the residual block from the video data stream by use of context adaptive variable length decoding by using a first syntax element indicating a total number of non-zero transform coefficients in a transform block representing the residual block, and a trailing-one number, indicating a number of non-zero transform coefficients having an absolute value of one when traversing the coefficients along a scan order, one or more second syntax elements indicating a sign of the non-zero transform coefficients having an absolute value of one when traversing the coefficients along the scan order, one or more third syntax elements indicating a value of the non-zero transform coefficients except for the number of non-zero transform coefficients having an absolute value of one when traversing the coefficients along the scan order, a fourth syntax element indicating a total number of zero-valued transform coefficient levels in the transform block from a firstly-encountered non-zero transform coefficient in the scan order onwards, and one or more fifth syntax elements indicting positions of the non-zero transform coefficients along the scan order by indicating a number of consecutive zero-valued transform coefficients in the scan order between in the scan order consecutively encountered non-zero transform coefficients.

137. Method 15 for rendering a video data stream 14 having a video encoded thereinto checkable on trustworthiness, wherein the method comprises:

subjecting 131 a predetermined portion 13 of the video data stream, or data derived therefrom, to a hash function 31 to obtain a hash value 33;

computing 171 a digital signature 43 based on the hash value 33 so as to digitally sign the hash value 33, and inserting 177 the digital signature 43 into the video data stream 14, thereby allowing determining whether the video data stream is trustworthy by checking whether the hash value 33 fits to the digital signature 43, wherein the video data stream has the video encoded thereinto by encoding the video into the video data stream by block based predictive coding and transform based residual coding by encoding the prediction residual data of the residual block into the video data stream by use of context adaptive variable length coding by using a first syntax element indicating a total number of non-zero transform coefficients in a transform block representing the residual block, and a trailing-one number, indicating a number of non-zero transform coefficients having an absolute value of one when traversing the coefficients along a scan order, one or more second syntax elements indicating a sign of the non-zero transform coefficients having an absolute value of one when traversing the coefficients along the scan order, one or more third syntax elements indicating a value of the non-zero transform coefficients except for the number of non-zero transform coefficients having an absolute value of one when traversing the coefficients along the scan order, a fourth syntax element indicating a total number of zero-valued transform coefficient levels in the transform block from a firstly-encountered non-zero transform coefficient in the scan order onwards, and one or more fifth syntax elements indicting positions of the non-zero transform coefficients along the scan order by indicating a number of consecutive zero-valued transform coefficients in the scan order between in the scan order consecutively encountered non-zero transform coefficients.

138. Video data stream generated by the method of embodiment 137.

IMPLEMENTATION ALTERNATIVES

Although some aspects have been described as features in the context of an apparatus it is clear that such a description may also be regarded as a description of corresponding features of a method. Although some aspects have been described as features in the context of a method, it is clear that such a description may also be regarded as a description of corresponding features concerning the functionality of an apparatus. In particular, block diagrams illustrating an apparatus may also be regarded as illustration of a respective method comprising the steps described by the blocks of the block diagram.

Some or all of the method steps may be executed by (or using) a hardware apparatus, like for example, a microprocessor, a programmable computer or an electronic circuit. In some embodiments, one or more of the most important method steps may be executed by such an apparatus.

The inventive encoded image signal can be stored on a digital storage medium or can be transmitted on a transmission medium such as a wireless transmission medium or a wired transmission medium such as the Internet. In other words, further embodiments provide a video bitstream product including the video bitstream according to any of the herein described embodiments, e.g. a digital storage medium having stored thereon the video bitstream.

Depending on certain implementation requirements, embodiments of the invention can be implemented in hardware or in software or at least partially in hardware or at least partially in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitory.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

The apparatus described herein may be implemented using a hardware apparatus, or using a computer, or using a combination of a hardware apparatus and a computer.

The methods described herein may be performed using a hardware apparatus, or using a computer, or using a combination of a hardware apparatus and a computer.

In the foregoing Detailed Description, it can be seen that various features are grouped together in examples for the purpose of streamlining the disclosure. This method of disclosure is not to be interpreted as reflecting an intention that the claimed examples need more features than are expressly recited in each claim. Rather, as the following claims reflect, subject matter may lie in less than all features of a single disclosed example. Thus the following claims are hereby incorporated into the Detailed Description, where each claim may stand on its own as a separate example. While each claim may stand on its own as a separate example, it is to be noted that, although a dependent claim may refer in the claims to a specific combination with one or more other claims, other examples may also include a combination of the dependent claim with the subject matter of each other dependent claim or a combination of each feature with other dependent or independent claims. Such combinations are proposed herein unless it is stated that a specific combination is not intended. Furthermore, it is intended to include also features of a claim to any other independent claim even if this claim is not directly made dependent to the independent claim.

While this invention has been described in terms of several advantageous embodiments, there are alterations, permutations, and equivalents, which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A decoder for decoding an audio stream from an audio data stream, wherein the decoder comprises:

one or more processors, configured for;

decoding, from the audio data stream, a digital signature to be subjected to a check of the audio data stream on trustworthiness, wherein the check of the audio data stream on trustworthiness comprises:

subjecting a predetermined portion of the audio data stream, or data derived therefrom, to a hash function to acquire a hash value; and checking whether the hash value fits to the digital signature to determine whether the audio data stream is trustworthy, decoding, from the audio data stream, a syntax element signaling a hash function identifier, which is indicative of the hash function, wherein the check of the audio data stream on trustworthiness further comprises checking whether the hash function identifier fits to the digital signature.

2. The decoder according to claim 1, wherein the digital signature is transmitted in a supplemental information message of the audio data stream.

3. The decoder according to claim 1, wherein the check of the audio data stream on trustworthiness comprises decrypting the digital signature to acquire a check value; and checking whether the hash value matches the check value.

4. The decoder according to claim 1, wherein the check of the audio data stream on trustworthiness comprises locating the predetermined portion within the audio data stream by use of one or more supplemental information messages interspersed into audio data stream and determining the predetermined portion to be a section of the audio data stream extending between, or extending from, the one or more supplemental information messages.

5. The decoder according to claim 4, configured for decoding the digital signature from one of the one or more supplemental information messages of the audio data stream.

6. The decoder according to claim 1, configured for locating the predetermined portion within the audio data stream by use of a first supplemental information message and a second supplemental information message interspersed into the audio data stream and determining the predetermined portion to be a section of the audio data stream extending between, or located between, the first and the second supplemental information messages.

7. The decoder according to claim 1, configured for locating the predetermined portion within the audio data stream by use of a first supplemental information message and a second supplemental information message interspersed into the audio data stream and determining the predetermined portion to be a section of the audio data stream extending between, or located between, the first supplemental information message and a point in the data stream which is located downstream the second supplemental information message.

8. The decoder according to claim 1, configured for deriving from an overview supplemental information message of the audio data stream, the overview supplemental information message indicating one or more substreams of the audio data stream with respect to each of which the checking the audio data stream on trustworthiness is possible based on one or more portions in the respective substream.

9. The decoder according to claim 1, wherein the check of the audio data stream on trustworthiness comprises performing the checking the audio data stream on trustworthiness sequentially with respect to a plurality of portions of the audio data stream, and further by checking whether the hash value and further data derived from subjecting a previous portion of the audio data stream to the hash function, fit to the digital signature, or whether a combined hash value derived by hashing the predetermined portion and a further hash value acquired by subjecting a previous portion of the audio data stream, or further data derived therefrom, to the hash function, fits to the digital signature.

10. The decoder of claim 9, wherein the check of the audio data stream on trustworthiness comprises subjecting the predetermined portion and the further hash value acquired by subjecting a previous portion of the audio data stream, or further data derived therefrom, to the hash function, to a combination to acquire a combined hash value and checking whether the combined hash value fits to the digital signature.

11. The decoder according to claim 1, wherein the digital signature is fitted to by a predetermined value in case of an equality of the predetermined value with a check value acquired by decrypting the digital signature, or a predetermined portion of the check value associated with the predetermined value, or an equality with the check value in a further hashed domain, reached by a further hash function applied onto the predetermined value or a concatenation of value comprising the predetermined value.

12. The decoder according to claim 1, wherein the check of the audio data stream on trustworthiness comprises a use of an asymmetric decryption scheme using a public key.

13. The decoder according to claim 12, configured for deriving the asymmetric decryption scheme using a first information derived from the data stream, wherein the first information comprises a decryption scheme indicator or a first pointer to a first location from which the asymmetric decryption scheme may be determined, or an identifier of the entity having encoded the audio into the audio data stream.

14. The decoder according to claim 12, configured for deriving the public key using a second information derived from the data stream, wherein the second information comprises a second pointer to a second location from which the public key may be retrieved, or an identifier of the entity having encoded the audio into the audio data stream.

15. The decoder according to claim 1, providing the predetermined portion for being subject, along with further data derived from a portion of a media stream accompanying the audio data stream to a trustworthiness check of the audio data stream combined with the media stream.

16. An apparatus for rendering an audio data stream having an audio stream encoded thereinto checkable on trustworthiness, wherein the apparatus comprises:

one or more processors, configured for:

subjecting a predetermined portion of the audio data stream, or data derived therefrom, to a hash function to acquire a hash value;

computing a digital signature based on the hash value so as to digitally sign the hash function; and inserting the digital signature into the audio data stream, thereby allowing determining whether the audio data stream is trustworthy by checking whether the hash value fits to the digital signature;

inserting, into the audio data stream, a syntax element signaling a hash function indicator, which is indicative of the hash function;

wherein one or more processors are configured for computing the digital signature based on the hash function identifier so that the digital signature allows determining whether the audio data stream is trustworthy by checking whether the hash function identifier fits to the digital signature.

17. A method for decoding an audio stream from an audio data stream, wherein the method comprises:

decoding, from the audio data stream, a digital signature to be subjected to a check of the audio data stream on trustworthiness, the check comprising:

subjecting a predetermined portion of the audio data stream, or data derived therefrom, to a hash function to acquire a hash value; and checking whether the hash value fits to the digital signature to determine whether the audio data stream is trustworthy decoding, from the audio data stream, a syntax element signaling a hash function identifier, which is indicative of the hash function, wherein the check of the audio data stream on trustworthiness further comprises checking whether the hash function identifier fits to the digital signature.

18. A non-transitory digital storage medium having stored thereon an audio data stream, the audio data stream being generated by a method for rendering an audio data stream having an audio stream encoded thereinto checkable on trustworthiness, wherein the method comprises:

subjecting a predetermined portion of the audio data stream, or data derived therefrom, to a hash function to acquire a hash value;

computing a digital signature based on the hash value so as to digitally sign the hash function; and inserting the digital signature into the audio data stream, thereby allowing determining whether the audio data stream is trustworthy by checking whether the hash value fits to the digital signature;

inserting, into the audio data stream, a syntax element signaling a hash function indicator, which is indicative of the hash function;

wherein the method comprises computing the digital signature based on the hash function identifier so that the digital signature allows determining whether the audio data stream is trustworthy by checking whether the hash function identifier fits to the digital signature.

* * * * *